(12) United States Patent
Kanegae et al.

(10) Patent No.: US 8,577,206 B2
(45) Date of Patent: Nov. 5, 2013

(54) INFORMATION RECORD MEDIUM, INFORMATION RECORD DEVICE AND METHOD, INFORMATION REPRODUCTION DEVICE AND METHOD, INFORMATION RECORDING/REPRODUCTION DEVICE AND METHOD, RECORDING OR REPRODUCTION CONTROL COMPUTER PROGRAM, AND DATA STRUCTURE CONTAINING CONTROL SIGNAL

(75) Inventors: Tohru Kanegae, Saitama (JP); Masanori Nakahara, Saitama (JP); Takao Sawabe, Saitama (JP); Nobuyuki Takakuwa, Saitama (JP); Yasuko Fukuda, Saitama (JP); Takeshi Koda, Saitama (JP)

(73) Assignee: Pioneer Corporation, Tokyo (JP)

( * ) Notice: Subject to any disclaimer, the term of this patent is extended or adjusted under 35 U.S.C. 154(b) by 1789 days.

(21) Appl. No.: 10/530,039

(22) PCT Filed: Oct. 1, 2003

(86) PCT No.: PCT/JP03/12580
§ 371 (c)(1),
(2), (4) Date: May 3, 2006

(87) PCT Pub. No.: WO2004/032135
PCT Pub. Date: Apr. 15, 2004

(65) Prior Publication Data
US 2006/0280075 A1   Dec. 14, 2006

(30) Foreign Application Priority Data

Oct. 1, 2002   (JP) ................................. 2002-288260

(51) Int. Cl.
*H04N 5/78*   (2006.01)

(52) U.S. Cl.
USPC ........................................................ 386/334

(58) Field of Classification Search
USPC ........................................................ 386/125
See application file for complete search history.

(56) References Cited

U.S. PATENT DOCUMENTS

| 5,691,972 A | * | 11/1997 | Tsuga et al. | ............... | 369/275.3 |
| 6,580,869 B1 | | 6/2003 | Ando et al. | | |
| 2002/0090197 A1 | * | 7/2002 | Ninomiya | ....................... | 386/52 |
| 2002/0141741 A1 | | 10/2002 | Zou et al. | | |

FOREIGN PATENT DOCUMENTS

| JP | 11-066813 | 3/1999 |
| JP | 2000-003561 | 1/2000 |

(Continued)

OTHER PUBLICATIONS

European Patent Office issued an European Search Report dated Jun. 26, 2009, Application No. 03748645.3.

*Primary Examiner* — William C Vaughn, Jr.
*Assistant Examiner* — Daniel Tekle
(74) *Attorney, Agent, or Firm* — Young & Thompson

(57) ABSTRACT

On an information record medium, there are recorded: a plurality of content informations; and a plurality of play list sets each including a plurality of play list informations defining reproduction sequence thereof. The plurality of content informations, whose reproduction sequences are defined by the plurality of play list informations in a same play list set, are different from each other in reproduction functions required for an information reproduction system to reproduce the plurality of content informations and are adapted to at least partially construct titles, each of which is a logically united information unit and which are same to each other. Required function information indicating the reproduction function required for the information reproduction system is further recorded for each of the plurality of play list informations.

21 Claims, 44 Drawing Sheets

(56) References Cited

FOREIGN PATENT DOCUMENTS

| | | |
|---|---|---|
| JP | 2000-348442 | 12/2000 |
| JP | 2000-348467 | 12/2000 |
| JP | 2001-197415 | 7/2001 |
| WO | 00/49803 | 8/2000 |

* cited by examiner

FIG. 44

AU Table (131)

| Field Name | | | | Contents |
|---|---|---|---|---|
| AU Table Comprehensive Information | | | | the Number of AUs, Pointer to Each AU, etc. |
| AU Table | AU#1 (1321) | PU#1 | ES_Table Index#1 | Index Number of ES_map table=1 |
| | | | ES_Table Index#2 | 3 |
| | | PU#2 | ES_Table Index#1 | 4 |
| | | | ES_Table Index#2 | 5 |
| | AU#2 | PU#1 | ES_Table Index#1 | 9 |
| | | | ES_Table Index#2 | 10 |
| | | PU#2 | ES_Table Index#1 | 12 |
| | | | ES_Table Index#2 | 13 |
| | AU#3 (3021) | PU#1 | ES_Table Index#1 | 14 |
| | | | ES_Table Index#2 | 15 |
| | | | ES_Table Index#3 | 16 |
| | | | ES_Table Index#4 | 17 |
| | | | ES_Table Index#5 | 18 |
| Other Info. | | | | Position of ES_Map table, etc. |

ES_Map Table (134)

| Field Name | | Contents |
|---|---|---|
| ES_Map Table | ES_Map Table Comprehensive Information | Index Number, etc. |
| | Index #1 | ES_PID Value=101 |
| | | Address Information |
| | Index #2 | ES_PID=102 |
| | | Address Information |
| | Index #3 | ES_PID=103 |
| | | Address Information |
| | Index #4 | ES_PID=201 |
| | | Address Information |
| | Index #5 | ES_PID=202 |
| | | Address Information |
| | Index #6 | ES_PID=301 |
| | | Address Information |
| | Index #7 | ES_PID=302 |
| | | Address Information |
| | Index #8 | ES_PID=303 |
| | | Address Information |
| | Index #9 | ES_PID=201 |
| | | Address Information |
| | Index #10 | ES_PID=202 |
| | | Address Information |
| | Index #11 | ES_PID=203 |
| | | Address Information |
| | Index #12 | ES_PID=101 |
| | | Address Information |
| | Index #13 | ES_PID=102 |
| | | Address Information |
| | Index #14 | ES_PID=101 |
| | | Address Information |
| | Index #15 | ES_PID=102 |
| | | Address Information |
| | Index #16 | ES_PID=103 (134d) |
| | | Address Information |
| | Index #17 | ES_PID=104 |
| | | Address Information |
| | | Index Number of ES_map table of SP Data Stream operated =16 (134e) |
| | Index #18 | ES_PID=105 (134d) |
| | | Address Information |
| | | Index Number of ES_map table of SP Data Stream operated =16 |
| | Other Info. | Other Info. |

INFORMATION RECORD MEDIUM, INFORMATION RECORD DEVICE AND METHOD, INFORMATION REPRODUCTION DEVICE AND METHOD, INFORMATION RECORDING/REPRODUCTION DEVICE AND METHOD, RECORDING OR REPRODUCTION CONTROL COMPUTER PROGRAM, AND DATA STRUCTURE CONTAINING CONTROL SIGNAL

TECHNICAL FIELD

The present invention relates to: an information record medium, such as a high density optical disc, capable of recording thereon various information such as main picture information or video information, audio information, sub-picture information, reproduction control information, and so on, at high density; an apparatus for and a method of recording the information onto the information record medium; an apparatus for and a method of reproducing the information from the information record medium; an apparatus and a method capable of both recording and reproducing the information; a computer program for controlling the recording or reproduction; and a data structure including a control signal.

BACKGROUND ART

DVDs become common as optical discs onto which various information such as main picture information, audio information, sub-picture information, reproduction control information and so on is recorded. According to a DVD standard, the main picture information (video data), the audio information (audio data) and the sub-picture information (sub-picture data) are packetized each with the reproduction control information (navigation data) and are multi-recorded onto a disc in a program stream format of MPEG 2 (Moving Picture Experts Group phase 2), which is a high performance encoding technology. Among them, the main picture information has data, which is compressed in a MPEG video format (ISO 13818-2), for one stream in one program stream. On the other hand, the audio information is recorded in a plurality of formats (i.e. linear PCM, AC-3, MPEG audio and so on) and has data for up to 8 streams in one program stream. The sub-picture information is defined by a bitmap, and is compressed and recorded in a run length method, and has data for up to 32 streams in one program stream.

On the other hand, a transport stream format of MPEG2 standard is coming to be standardized, which is suitable for data transfer. According to the transport stream format, a plurality of elementary streams are transferred at the same time. For example, a plurality of programs, such as a plurality of satellite digital broadcasting channels in one satellite radio wave, are transmitted at the same time in a TDM (Time Division Multiplex) scheme.

In an application for recording a DVD of this type, a DVD recorder is on the market. This recorder is adapted to record one play list as control information or logic information to control the reproduction, so that a record unit from a start of recording to an end of recording is reproduced as one title (e.g. one movie, one program and so on), while an inputted record signal is converted into a video recording format and is then recorded.

DISCLOSURE OF INVENTION

The conventional DVD as mentioned above, however, does not suitable for multi-recording the main picture made of a plurality of streams, because it can only multi-record the main picture made of one stream with the audio information or the sub-picture information made of a plurality of streams. That is, the DVD complying with a MPEG2 program stream format to record the information cannot basically multi-record a plurality of programs transferred at the same time in the aforementioned MPEG2 transport stream format.

Even if using a blue laser or the like presents a disc compatible with a high density recording or a large volume recording and having a high transfer rate allowing to record a high vision broadcasting for an order of 2 hours, an information reproduction system environment varies depending on the user. For example, with regard to the video reproduction function, some users have high vision monitors, while some users have just standard TV receiver. Otherwise, with regard to the audio reproduction function for example, some users have surround speaker systems of 5.1 channels or more, while some users have just stereo systems of 2 channels or even monaural channel. For this, the contents maker is forced to limit the contents quality so that any information reproduction system, which varies depending on the user, can reproduce the contents, otherwise, the user is forced to purchase the information reproduction system compatible with the contents reproduction quality. Otherwise, in the case that the user purchases a disc on which the high vision content information is already recorded or records high vision content information as it is with the aid of a high performance disc recorder, and then reproduces it, some information reproduction systems of the user may fail to reproduce it in practice, or may fail to reproduce it with full efficiency of the video reproduction function and the audio reproduction function thereof.

The present invention has been accomplished in view of the above problems for example. It is therefore an object of the present invention to provide an information record medium, an information record apparatus and method, an information reproduction apparatus and method, an information record reproduction apparatus and method, a computer program for a record or reproduction control, and a data structure including a control signal, which enable the reproduction of all or part of the content information, such as the video information or the audio information, in conformity with the information reproduction function of the user, out of the content information recorded on the information record medium, such as a DVD.

The above object of the present invention is achieved by an information record medium on which there are recorded: a plurality of content informations; and a plurality of play list sets each including a plurality of play list informations defining reproduction sequence of the plurality of content informations, wherein the plurality of content informations, whose reproduction sequences are defined by the plurality of play list informations in a same play list set, are different from each other in reproduction functions required for an information reproduction system to reproduce the plurality of content informations and are adapted to at least partially construct titles, each of which is a logically united information unit and which are same to each other, and required function information indicating the reproduction function is further recorded for each of the plurality of play list informations.

According to the information record medium of the invention, a plurality of content informations may be stored as object data in an object data file, for example. Here, the "content information" may be made of main picture information (video data), audio information (audio data), sub-picture information (sub-picture data) and the like. Various content informations as such may be multiplexed in a transport stream such as the MPEG2 as mentioned above. Alternatively, it may be multiplexed in a program stream of the MPEG2, or may not be multiplexed.

A plurality of play list sets may be stored in a play list information file, in a table form for each play list set, for example. Each of a plurality of play list informations composing the play list set is an information unit logically accessible by the information reproduction apparatus. The play list information may include pointer information indicating a logically accessible item for example. Alternatively, it may include pointer information indicating a collection or assembly of items. Here, a plurality of play list informations define the reproduction sequence or sequences for a plurality of content informations. For example, each play list information defines a reproduction sequence for one content information corresponding to said each play list information, from among a plurality of content informations.

Particularly in the information record medium of the invention, the plurality of content informations, whose reproduction sequences are defined by the plurality of play list informations in the same play list set, are different from each other in reproduction functions required for the information reproduction system to reproduce them. Furthermore, these content informations are adapted to at least partially construct the same title. For example, the reproduction sequences of: content information having a data structure in a high vision format; content information having a data structure in an NTSC (National Television System Committee) format; content information having a data structure in a surround speaker system format; content information having a data structure in a monochrome format; content information having a data structure in a stereo speaker format, content information having a data structure in a monaural speaker format and so on, all of which compose the same movie as an example of the same title, are defined by the play list informations included in the same play list set.

The required function information indicates the reproduction function (e.g. a video resolution, an audio channel number, and so on) different from each other and requested for the information reproduction system to reproduce a plurality of content informations composing the same title as such, and is recorded for each of a plurality of play list informations. The required function information as such may be recorded in the play list set. More specifically, the required function information may be recorded as a part of attribute information, which indicates attribute inherent to each play list information and is added to each play list information, in the play list set. Alternatively, the required function information may be recorded as a list or table arranged for each play list information, separately from each play list information, in the play list set. Furthermore, for example, the required function information may be recorded as a part of reproduction control information such as title information and the like stored in a disc information file as mentioned later. Alternatively, the required function information as such may be stored in an object information file as mentioned later. In any case, the record position or record format of the required function information may be arbitrary, insofar as the information reproduction system can obtain the required function information as such, before the content information is reproduced in accordance with the reproduction sequence defined by the play list information.

At the recording of the information record medium, a plurality of content informations composing the same title such as the same TV program streamed into the same transfer signal or the same transfer wave and requiring different reproduction functions may be recorded as a transport stream, a program stream or the like, for example in a DVD recorder application. Alternatively, a plurality of content informations composing the same title such as the same movie and requiring different reproduction functions may be recorded as a transport stream, a program stream or the like for example in a DVD-ROM application.

Therefore, at the reproduction of the information record medium, the required function information is firstly reproduced. Then, by comparing the reproduction function indicated by this required function information with a reproduction function of the information reproduction apparatus indicated by a set function information set for the information reproduction apparatus owned by the user for example, it is possible to select one play list information, which defines the reproduction sequence of the content information reproducible by the information reproduction apparatus, from among a plurality of play list informations included in the same play list set recorded in the information record medium. Incidentally, the set function information may be made of one or more system parameters inputted by the user or predetermined for the information reproduction apparatus or the information reproduction system owned by the user for example.

In this manner, since the play list information is selected, with taking into account the reproduction functions such as the video reproduction function or the video performance, the audio reproduction function or the audio performance of the information reproduction apparatus, other reproduction functions relating to the reproduction of the content information, control information or the data information and so on, the content information reproducible by the information reproduction apparatus is reproduced appropriately. For example, even in the case that the same title recorded in the information record medium is reproduced, if it is reproduced by the information reproduction system including a high vision television, the play list information defining the reproduction sequence of the content information compatible with the high vision is selected from the play list set, and thereby the content information compatible with the high vision is reproduced. On the other hand, if it is reproduced by the information reproduction system including no high vision, the play list information defining the reproduction sequence of the content information compatible with a normal (television) that is not a high vision is selected from the play list set, and thereby the content information compatible with the normal (television) is reproduced.

As the result, according to the information record medium of the invention, the content information matched to the reproduction function of the information reproduction system of the user can be reproduced, from among the content informations such as the video information, the audio information and the like recorded on the information record medium such as a DVD for example.

In an aspect of the information record medium of the invention, the plurality of content informations include video information and audio information, the reproduction function is a video reproduction performance and an audio reproduction performance required for the information reproduction system, the required function information is of information, which indicates the video reproduction performance and the audio reproduction performance and is recorded for each of the plurality of play list informations.

According to this aspect, the required function information indicates the video reproduction performance (e.g. a video resolution) different from each other or the audio performance (e.g. audio channel number) different from each other, required for the information reproduction system to reproduce a plurality of content informations composing the same title, and is recorded for each of the plurality of play list informations. Therefore, at the reproduction of the information record medium, by comparing the video reproduction performance and audio reproduction performance indicated by the reproduced required function information with video reproduction performance and audio reproduction performance of the information reproduction system indicated by the set function information, it is possible to select one play list information defining the reproduction sequence of the content information reproducible by the information reproduction apparatus. In this manner, since the play list information is selected, with taking into account the video reproduction performance and the audio reproduction performance of the information reproduction apparatus, the content information reproducible by the information reproduction apparatus is appropriately reproduced.

In this aspect relating to the video reproduction performance and the audio reproduction performance, priority information indicating which of the video reproduction performance and the audio reproduction performance is to be prioritized may be further recorded.

In this arrangement, at the reproduction of the information record medium, the priority information is reproduced before the play list information is selected. Then, by comparing the video reproduction performance and the audio reproduction performance indicated by the reproduced required function information with the video reproduction performance and the audio reproduction performance of the information reproduction apparatus indicated by the set function information, it is possible to select any one play list information, in accordance with the reproduced priority information, in the case that a plurality of play list informations defining the reproduction sequence of the content information reproducible by the information reproduction apparatus exist in the same play list.

Here, for example, it is assumed that both content informations, one of which is (i) a combination of the video information reproducible with a relatively high quality video reproduction performance (e.g. the video information compatible with the high vision) and the audio information reproducible with a relatively low quality audio performance (e.g. 2-channel audio information compatible with a stereo speaker) and the other of which is (ii) a combination of the video information reproducible by the information reproduction apparatus with a relatively low quality video performance (e.g. the video information compatible with a normal television) and the audio information reproducible with a relatively high quality audio performance (e.g. the audio information compatible with surround speakers), are recorded in the information record medium, and that the information reproduction apparatus has a function capable of reproducing both of them. (Incidentally, in this case, even if (iii) other content information which is a combination of the video information reproducible with a relatively high quality video performance and the audio information reproducible with a relatively high quality audio performance is recorded on the information record medium, it is assumed that the information reproduction apparatus cannot reproduce this content information because of the transfer rate or the like.) In this case, if the video reproduction performance is to be prioritized in accordance with the priority information, the play list information designating the reproduction sequence in the former case (i) is selected, or if the audio performance is to be prioritized, the play list information designating the reproduction sequence in the latter case (ii) is selected. That is, if a plurality of reproducible content informations exist, the content information to be reproduced is selected automatically, by putting the priority on them, in accordance with the priority information. Such a priority may be preset or predetermined by an author of the content informations.

Incidentally, the priority indicated by such priority information may be set by default for the reproduction, and may be changed by the user input for the information reproduction apparatus before or after the reproduction of the priority information.

In this aspect relating to the video information and the audio information, the required function information may comprise a required function information table in which information indicating whether or not different video reproduction performances are required for each of predetermined ranks and information indicating whether or not different audio reproduction performances are required for each of predetermined ranks are arranged vertically and horizontally as a matrix.

In such an arrangement, at the reproduction of the information record medium, the required function information table is reproduced, before the play list information is selected. Then, by comparing the video reproduction performance and the audio reproduction performance indicated by the reproduced required function information table, with the video reproduction performance and the audio reproduction performance of the information reproduction apparatus indicated by the set function information set for the information reproduction apparatus, it is possible to select one play list information defining the reproduction sequence of the content information obtained by combining the video information and the audio information.

Furthermore, since the required function information is listed up in a table format in which functions are classified by predetermined ranks, the reference processing or comparison processing can be performed promptly. Here, the "functions of predetermined ranks" means, as for the video reproduction performance, the functions ranked depending on the picture quality from higher to lower, for example, in an order from the top, 720p, 1080i, 480p, 480i . . . of the resolution, and as for the audio reproduction performance, the functions ranked depending on the sound quality from higher to lower, for example, in an order from the top, 7.1ch, 5.1ch, 2ch and 1ch of the channel number.

Incidentally, with regard to the set function information set for the information reproduction apparatus also, the information indicating whether or not it has video reproduction performances for each of predetermined ranks and the information indicating whether or not it has audio reproduction performances for each of predetermined ranks may be provided in the information reproduction apparatus, as the set function information table in which these informations are arranged vertically and horizontally as a matrix.

Furthermore in this case, priority information indicating a priority among various combinations of the video reproduction performances different for each of the predetermined ranks and the audio reproduction performances different for each of the predetermined ranks may be further recorded.

In this arrangement, at the reproduction of the information record medium, the priority information is reproduced, before the play list information is selected. Then, by comparing the video reproduction performance and the audio reproduction performance indicated by the reproduced required function information with the video performance and the audio performance of the information reproduction apparatus indicted by the set function information, it is possible to select any one play list information, in accordance with the reproduced priority information, in the case that a plurality of play list informations defining the reproduction sequences of the content informations reproducible by the information reproduction apparatus exist in the same play list. That is, if there is a plurality of reproducible content informations, these informations are ranked in accordance with the priority information, and the content information to be reproduced is selected automatically. Such a priority may be preset or predetermined by an author of the content informations.

Incidentally, with regard to the priority indicated by such priority information may be set by default for the reproduction, and may be changed by the user input for the information reproduction apparatus before or after the reproduction of the priority information.

In another aspect of the information record medium of the invention, each of the play list informations includes pointer information designating item information, which is a logically accessible reproduction unit and composes the content information.

According to this aspect, at the reproduction of the information record medium, it is possible to identify the item information corresponding to the content information to be reproduced, in accordance with the pointer information included in the play list information. Then, this identified item information is accessed to reproduce the item information recorded thereat, so that the desired content information can be reproduced as the play list element.

Incidentally, the "item information" is a minimum unit for display. For example, if the content information is still picture information, the item information is an information unit corresponding to one or more images.

Furthermore, the play list information may include one or more play list elements, and may have the pointer information to designate such item information by a unit of the play list element.

In another aspect of the information record medium of the invention, title information designating at least one play list set from among the plurality of play list sets, which corresponds to the content information to be reproduced, is further recorded to reproduce the plurality of content informations as the title.

According to this aspect, the title information may be stored as a table format for each title in the disc information file. Typically, there is a plurality of the title informations for one information record medium. For example, a plurality of title informations may be stored in the disc information file. The title information acts as a part of the reproduction control information to control the reproduction of the content information. The title information designates, so as to reproduce the plurality of content informations as the title which is the logically united information unit such as one movie or one TV program, one or more play list sets corresponding to the content informations. Therefore, at the reproduction of the information record medium, the title information is designated and thereby the desired title can be reproduced. Furthermore, in the case that the same title is reproduced, it is possible to utilize the reproduction function of the information reproduction apparatus as much as possible, with the aid of the required function information mentioned above.

In this aspect, the title information may include pointer information designating at least one play list set, which corresponds to the content informations to be reproduced.

In this arrangement, at the reproduction of the information record medium, it is possible to identify the play list set corresponding to the content information to be reproduced, in accordance with the pointer information included in the title information. Then, this identified play list set is accessed, so that one play list information to define the reproduction sequence of the content information reproducible by the information reproduction apparatus can be selected, from among a plurality of play list informations included in the play list set recorded thereat.

Incidentally, the title information includes one or more title elements and may have the pointer information to designate such a play list set by a unit of the title element.

In another aspect of the information record medium of the invention, a whole stream including a plurality of partial streams made of the plurality of content informations is multiplexed by a packet unit which is a physically accessible unit and stores pieces of the plurality of content informations, and relationship definition information defining a relationship between packets to be multiplexed and the plurality of partial streams is further recorded, as reproduction control information to control a reproduction of the plurality of content informations.

According to this aspect, the whole stream like at least a part of the transport stream of the MPEG2 includes a plurality of partial streams like the elementary stream. That is, one "partial stream" herein means one array of data or array of information, which is an elementary stream, such as a video stream, an audio stream, a sub-picture stream and so on composing a series of the content information. On the other hand, one "whole stream" herein means data arrangement or information arrangement made of bundles of a plurality of partial streams. Such a whole stream is multi-recorded onto the information record medium, by unit of packet (e.g. TS packet as mentioned later) which is a unit physically accessible by the information reproduction apparatus. The content information is made of a plurality of packets, which is a unit logically accessible by the information reproduction apparatus and each of which stores pieces of the content information. Furthermore, an ES map table (ES_Map Table) to indicate a relationship definition information (e.g. elementary stream packet ID as mentioned later (ES_PID)) are further recorded as the reproduction control information to control the reproduction of the content information.

Therefore, in the information reproduction apparatus, it is possible to reproduce the content information made of a part of the whole stream multi-recorded on the information record medium, on the basis of the relationship between a plurality of packets multiplexed at the same time and a plurality of partial streams, which may be recorded in the relationship definition information. Furthermore in this case, it is possible to utilize the reproduction function of the information reproduction apparatus as much as possible, with the aid of the required function information.

Incidentally, as for the information record medium mentioned above, the object data file in which a plurality of content informations are stored may be recorded in an area on the information record medium, differently from an area on the information record medium where the play list information file in which a plurality of play list sets are stored is recorded. From among them, the object data file may be multi-recorded in the transport stream format or the program stream format of the MPEG2. From among them, the play list information file may not be multi-recorded, in view of an easy and speedy reproduction control.

The information record apparatus according to the present invention includes: a first record device for recording a plurality of content informations; and a second record device for recording a plurality of play list sets each including a plurality of play list informations defining reproduction sequence of the plurality of content informations, wherein the plurality of content informations, whose reproduction sequences are defined by the plurality of play list informations in a same play list set, are different from each other in reproduction functions required for an information reproduction system to reproduce the plurality of content informations and are adapted to at least partially construct titles, each of which is a logically united information unit and which are same to each other, and said apparatus further comprises a third record device for further recording required function information indicating the reproduction function for each of the plurality of play list informations.

According to the information record apparatus of the invention, the first record device such as a controller, an encoder, a TS object generator mentioned later, an optical pickup, a cutting device or the like, records a plurality of content informations onto the information record medium such as a DVD. The second record device such as a controller, an encoder, an optical pickup, a cutting device or the like, records a plurality of play list sets including a plurality of content informations onto the information record medium such as a DVD. The third record device such as a controller, an encoder, an optical pickup, a cutting device or the like, records the required function information for each of a plurality of play list informations.

Therefore, the information record medium of the invention mentioned above (including various aspects thereof) can be recorded relatively efficiently.

Incidentally, the information record apparatus according to the present invention may also take various aspects, corresponding to various aspects of the information record medium according to the present invention as mentioned above.

The information record method according to the present invention includes: a first record process of recording a plurality of content informations; and a second record process of recording a plurality of play list sets each including a plurality of play list informations defining reproduction sequence of the plurality of content informations, wherein the plurality of content informations, whose reproduction sequences are defined by the plurality of play list informations in a same play list set, are different from each other in reproduction functions required for an information reproduction system to reproduce the plurality of content informations and are adapted to at least partially construct titles, each of which is a logically united information unit and which are same to each other, and said method further comprises a third record process of further recording required function information indicating the reproduction function for each of the plurality of play list informations.

According to the information record method of the invention, the first record process is for recording a plurality of content informations, the second record process is for recording a plurality of play list sets, and the third record process is for recording the required function information, onto the information record medium such as a DVD, with the aid of a controller, an encoder, a TS object generator mentioned below, an optical pickup, a cutting device or the like.

Therefore, the information record medium according to the present invention as mentioned above (including various aspects thereof) can be recorded relatively efficiently.

Incidentally, the information record method according to the present invention may also take various aspects, corresponding to various aspects of the information record medium according to the present invention.

The first information reproduction apparatus according to the present invention is for reproducing the information record medium according to the present invention as mentioned above (including various aspects thereof), the apparatus includes: a reproduction device capable of reproducing the plurality of content informations, the plurality of play list sets and the required function information; and a control device for selecting one play list information defining the reproduction sequence of the content information reproducible by the information reproduction apparatus, from among the plurality of play list informations included in the same play list set by comparing (i) the reproduction function indicated by the required function information reproduced by the reproduction device and (ii) reproduction function of the information reproduction apparatus indicated by a set function information set for the information reproduction apparatus, and controlling the reproduction device to reproduce the content information in accordance with the reproduction sequence defined by the selected play list information.

According to the first information reproduction apparatus of the invention, the reproduction device such as a controller, a decoder, a demultiplexer, an optical pickup and the like can reproduce the content information, the play list set and the required function information. Then, the control device such as a controller and the like compares (i) the reproduction function indicated by the required function information reproduced by the reproduction device with (ii) the reproduction function of the information reproduction apparatus indicated by the set function information set for the information reproduction apparatus. Then, from among a plurality of play list informations included in the same play list set, one play list information to define the reproduction sequence of the content information reproducible by the information reproduction apparatus is selected. Furthermore, the reproduction device is controlled to reproduce the content information in accordance with the reproduction sequence defined by the selected play list information.

Therefore, the information record medium according to the present invention as mentioned above (including various aspects thereof) can be reproduced relatively efficiently.

In an aspect of the first reproduction apparatus according to the present invention, the plurality of content informations includes video information and audio information, the reproduction function is a video reproduction performance and an audio reproduction performance required for the information reproduction system, the required function information is of information indicating the video reproduction performance and the audio reproduction performance recorded for each of the plurality of play list informations, the set function information indicates the video reproduction performance and the audio reproduction performance of the information reproduction apparatus, and the set function information includes information indicating whether or not the information reproduction apparatus has different video reproduction performances for each of predetermined ranks and information indicating whether or not the information reproduction apparatus has different audio reproduction performances for each of predetermined ranks.

According to this aspect, at the time of reproduction of the information record medium, by comparing the video reproduction performance and the audio reproduction performance indicated by the reproduced required function information table with the video reproduction performance and the audio reproduction performance of the information reproduction apparatus indicated by the set function information set for the information reproduction apparatus, before the play list information is selected, it is possible to select one play list information defining the reproduction sequence of the content information obtained by combining the video information and the audio information reproducible by the information reproduction apparatus.

In this case, the information indicating whether or not it has performances or functions for each of predetermined ranks may be made of a set function information table in which these informations are arranged vertically and horizontally as a matrix. In such an arrangement, since the set function information is listed up in a table format, in which functions or performances are ranked depending on predetermined ranks, it is possible to perform speedily the reference processing or the comparison processing after then. For example, the set function information table indicates the information for each combination of the video reproduction performance and the audio reproduction performance of various ranks (i.e. for each cell of the matrix), for example, the information (e.g. a symbol ○) showing that it has a function (reproducible), in the case that there are both functions, or the information (e.g. a symbol x) showing that is does not a function (irreproducible), in the case that any one of these functions does not exist.

Incidentally, also with regard to the required function information compared with the set function information table as such, the information indicating whether or not video performances for each of predetermined ranks are required and the information indicating whether or not audio performances for each of predetermined ranks are required may be recorded on the information record medium, as the required function information table in which these informations are arranged vertically and horizontally as a matrix.

The second information reproduction apparatus according to the present invention is for reproducing the information record medium in the above described aspect related to the priority information of the information record medium of the present invention, the apparatus comprising: a reproduction device capable of reproducing the plurality of content informations, the plurality of play list sets and the required function information; and a control device for selecting one play list information defining the reproduction sequence of the content information reproducible by the information reproduction apparatus, from among the plurality of play list informations included in the same play list set by comparing (i) the video reproduction function and the audio reproduction function indicated by the required function information reproduced by the reproduction device and (ii) video reproduction function and audio reproduction function of the information reproduction apparatus indicated by a set function information set for the information reproduction apparatus, and controlling the reproduction device to reproduce the content information in accordance with the reproduction sequence defined by the selected play list information, wherein the control device selects one play list information corresponding to the video reproduction performance or the audio reproduction performance prioritized in accordance with the priority information, from among the plurality of play list informations included in the same play list.

According to the second information reproduction apparatus of the invention, the reproduction device such as a controller, a decoder, a demultiplexer, an optical pickup and the like can reproduce the content information, the play list set and the required function information. Then, the control device such as a controller and the like compares (i) the reproduction function indicated by the required function information reproduced by the reproduction device with (ii) the reproduction function of the information reproduction apparatus indicated by the set function information set for the information reproduction apparatus. Then, from among a plurality of play list informations included in the same play list set, one play list information which defines the reproduction sequence of the content information reproducible by the information reproduction apparatus and corresponds to the video reproduction performance and the audio reproduction performance to be prioritized in accordance with the priority information, is selected. Furthermore, the reproduction device is controlled to reproduce the content information in accordance with the reproduction sequence defined by the selected play list information.

Therefore, the above described aspect related to the priority information of the information record medium of the present invention can be recorded relatively efficiently.

Incidentally, the second information reproduction apparatus according to the present invention may also take various aspects, corresponding to various aspects of the information record medium according to the present invention.

The information reproduction method according to the present invention is for reproducing the information record medium according to the present invention (including various aspects thereof), the method implemented with an information reproduction apparatus comprising a reproduction device capable of reproducing the plurality of content informations, the plurality of play list sets and the required function information, the method comprising: a first control process of selecting one play list information defining the reproduction sequence of the content information reproducible by the information reproduction apparatus, from among the plurality of play list informations included in the same play list set by comparing (i) the reproduction function indicated by the required function information reproduced by the reproduction device and (ii) reproduction function of the information reproduction apparatus indicated by a set function information set for the information reproduction apparatus, and a second controlling process of controlling the reproduction device to reproduce the content information in accordance with the reproduction sequence defined by the selected play list information.

According to the information reproduction method of the invention, the first control process is for comparing (i) the reproduction function indicated by required function information reproduced by the reproduction device with (ii) the reproduction function of the information reproduction apparatus indicated by the set function information set for the information reproduction apparatus, and thereby selecting one play list defining the reproduction sequence of content information reproducible by the information reproduction apparatus, from among a plurality of play list informations included in the same play list set, with the aid of a controller, a decoder, a demultiplexer, an optical pickup and the like. Furthermore, the second control process is for controlling the reproduction device to reproduce the content information in accordance with the reproduction sequence defined by the selected play list.

Therefore, the information record medium of the invention mentioned above (including various aspects thereof) can be reproduced relatively efficiently.

Incidentally, the information reproduction method according to the present invention may also take various aspects, corresponding to various aspects of the information record medium according to the present invention as mentioned above.

The information record reproduction apparatus according to the present invention includes: a first record device for recording a plurality of content informations; and a second record device for recording a plurality of play list sets each including a plurality of play list informations defining reproduction sequence of the plurality of content informations, wherein the plurality of content informations, whose reproduction sequences are defined by the plurality of play list informations in a same play list set, are different from each other in reproduction functions required for an information reproduction system to reproduce the plurality of content informations and are adapted to at least partially construct titles, each of which is a logically united information unit and which are same to each other, and said apparatus further comprises: a third record device for further recording required function information indicating the reproduction function for each of the plurality of play list informations; a reproduction device capable of reproducing the plurality of content informations, the plurality of play list sets and the required function information; and a control device for selecting one play list information defining the reproduction sequence of the content information reproducible by the information reproduction apparatus, from among the plurality of play list informations included in the same play list set by comparing (i) the reproduction function indicated by the required function information reproduced by the reproduction device and (ii) reproduction function of the information reproduction apparatus indicated by a set function information set for the information reproduction apparatus, and controlling the reproduction device to reproduce the content information in accordance with the reproduction sequence defined by the selected play list information.

According to the information record reproduction apparatus of the invention, since it has both of the above described information record apparatus of the present invention and the above described first information reproduction apparatus of the present invention, the information record medium of the invention (including various aspects thereof) can be recorded and reproduced relatively efficiently.

Incidentally, the information record reproduction apparatus according to the present invention may also take various aspects, corresponding to various aspects of the information record medium according to the present invention.

The information record reproduction method according to the present invention includes: a first record process of recording a plurality of content informations; and a second record process of recording a plurality of play list sets each including a plurality of play list informations defining reproduction sequence of the plurality of content informations, wherein the plurality of content informations, whose reproduction sequences are defined by the plurality of play list informations in a same play list set, are different from each other in reproduction functions required for an information reproduction system to reproduce the plurality of content informations and are adapted to at least partially construct titles, each of which is a logically united information unit and which are same to each other, and said method further comprises: a third record process of further recording required function information indicating the reproduction function for each of the plurality of play list informations; a first control process of selecting one play list information defining the reproduction sequence of the content information reproducible by the information reproduction apparatus, from among the plurality of play list informations included in the same play list set by comparing (i) the reproduction function indicated by the required function information reproduced by the reproduction device and (ii) reproduction function of the information reproduction apparatus indicated by a set function information set for the information reproduction apparatus, and a second controlling process of controlling the reproduction device to reproduce the content information in accordance with the reproduction sequence defined by the selected play list information.

According to the information record reproduction method of the invention, since it has both of the above described information record method of the present invention and the above described first information reproduction method of the present invention, the information record medium of the invention (including various aspects thereof) can be recorded and reproduced relatively efficiently.

Incidentally, the information record reproduction method according to the present invention may also take various aspects, corresponding to various aspects of the information record medium according to the present invention.

The computer program for a record control according to the present invention is to control a computer disposed at the information record apparatus according to the present invention (including various aspects thereof), the program making the computer function as at least a part of the first record device, the second record device and the third record device.

According to the computer program for a record control of the invention, the information record apparatus according to the present invention mentioned above may be realized relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a record control according to the present invention may also take various aspects, corresponding to various aspects of the information record medium according to the present invention as mentioned above.

The computer program for a reproduction control according to the present invention is to control a computer disposed at the information reproduction apparatus according to the present invention as mentioned above (including various aspects thereof), the program making the computer function as at least a part of the reproduction device and the control device.

According to the computer program for a reproduction control of the invention, the information reproduction apparatus according to the present invention mentioned above may be realized relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a reproduction control according to the present invention may also take various aspects, corresponding to various aspects of the information record medium according to the present invention as mentioned above.

The computer program for a record reproduction control according to the present invention is to control a computer disposed at the information record reproduction apparatus according to the present invention as mentioned above (including various aspects thereof), the program making the computer function as at least a part of the first record device, the second record device, the third record device, the reproduction device and the control device.

According to the computer program for a record reproduction control of the invention, the information record reproduction apparatus according to the present invention mentioned above may be embodied relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

Incidentally, the computer program for a record reproduction control according to the present invention may also take various aspects, corresponding to various aspects of the information record medium according to the present invention as mentioned above.

The data structure including a control signal according to the present invention comprising: a plurality of content informations; and a plurality of play list sets each including a plurality of play list informations defining reproduction sequence of the plurality of content informations, wherein the plurality of content informations, whose reproduction sequences are defined by the plurality of play list informations in a same play list set, are different from each other in reproduction functions required for an information reproduction system to reproduce the plurality of content informations and are adapted to at least partially construct titles, each of which is a logically united information unit and which are same to each other, and said structure further comprises required function information indicating the reproduction function for each of the plurality of play list informations.

According to the data structure including the control signal of the invention, similarly to the case of the information record medium according to the present invention as mentioned above, it is possible to reproduce the content information matched to the reproduction function of the information reproduction system of the user, from among the content informations such as the video information and the audio information recorded on the information record medium such as a DVD.

Incidentally, the data structure including the control signal according to the present invention may also take various aspects, corresponding to various aspects of the information record medium according to the present invention as mentioned above.

The above object of the present invention is achieved by a computer program product for a record control in a computer-readable medium for tangibly embodying a program of instructions executable by a computer disposed at the aforementioned information record apparatus according to the present invention (including various aspects), the program making the computer function as at least a part of the first record device, the second record device and the third record device.

The above object of the present invention is achieved by a computer program product for a reproduction control in a computer-readable medium for tangibly embodying a program of instructions executable by a computer disposed at the information reproduction apparatus according to the present invention (including various aspects), the program making the computer function as at least a part of the reproduction device and the control device.

The above object of the present invention is achieved by a computer program product for a record reproduction control in a computer-readable medium for tangibly embodying a program of instructions executable by a computer disposed at the information record reproduction apparatus according to the present invention (including various aspects), the program making the computer function as at least a part of the first record device, the second record device, the third record device, the reproduction device and the control device.

According to the computer program product for the record control, the reproduction control, or the record reproduction control of the invention, at least a part of the first record device, the second record device, the reproduction device and the control device according to the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it. More specifically, the computer program product may be made of computer readable codes (or computer readable commands) to make the computer function as at least a part of the first record device, the second record device, the third record device, the reproduction device and the control device.

These effects and other advantages of the present invention become more apparent from the following embodiments and examples.

BRIEF DESCRIPTION OF DRAWINGS

FIG. 44 is a diagram schematically showing a specific example of a data structure in an AU table constructed in the object information file and an ES map table associated with the AU table, in a specific example of the embodiment.

BEST MODE FOR CARRYING OUT THE INVENTION (Information Record Medium)

The information record medium of the present invention is discussed, with reference to its embodiments, as well as FIG. 1 to FIG. 13. In these embodiments, the information record medium of the present invention is applied to an optical disc capable of recording (writing) and reproducing (reading).

Figure 1:
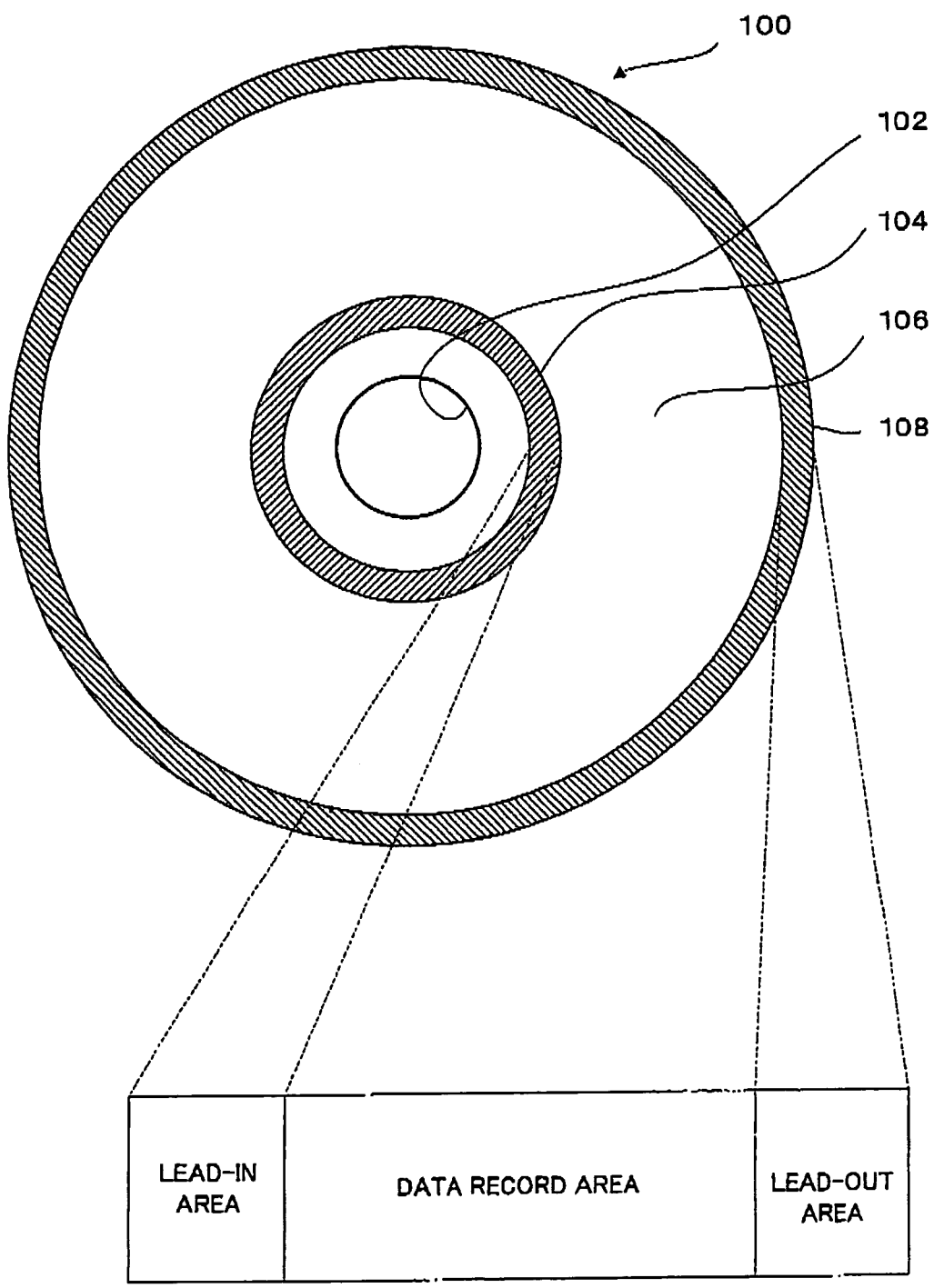
FIG. 1 illustrates, in its upper part, a general plan view of an optical disc as an embodiment of the information record medium of the present invention; and illustrates, in its lower part, a schematic conceptual diagram of an area structure in a radius direction corresponding to the general plan view in the upper part.

Firstly, with reference to FIG. 1, a fundamental structure of the optical disc in an embodiment is discussed. FIG. 1 illustrates, in its upper part, a general plan view of the optical disc structure having a plurality of areas, and illustrates conceptually, in its lower part, an area structure in the radius direction corresponding to the upper part.

As shown in FIG. 1, the optical disc 100 may be recorded by various record methods, such as a magneto-optical method, a phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the record surface of the disc body measuring about 12 cm in diameter. In each area, groove tracks and land tracks may be alternately arranged, concentrically or spirally around the center hole 102. The groove tracks may be wobbled. Furthermore, pre-pits may be formed on one or both of these tracks. Incidentally, the present invention is not exclusively limited to the optical disc having three areas mentioned above.

Figure 2:
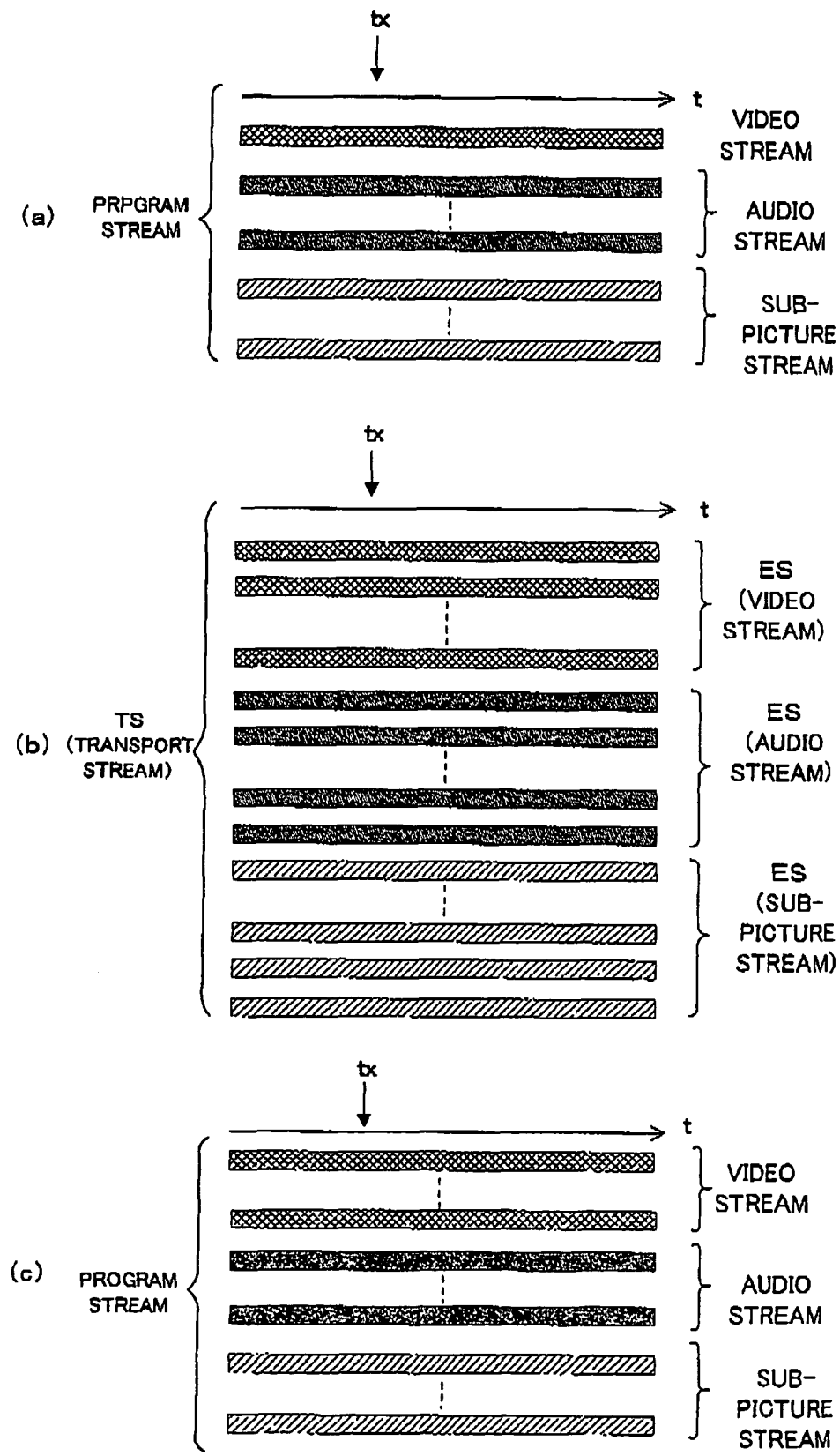
FIG. 2 illustrates a schematic conceptual diagram (FIG. 2($a$)) of a conventional program stream of MPEG2; a schematic conceptual diagram (FIG. 2($b$)) of a transport stream of MPEG2 used in the embodiment; and a schematic conceptual diagram (FIG. 2 ($c$)) of a program stream of MPEG2 used in the embodiment.

Next, with reference to FIG. 2, the structures of the transport stream (TS) and the program stream (PS) to be recorded onto the optical disc in the embodiment are discussed. FIG. 2 (a) schematically illustrates a MPEG2 program stream of a conventional DVD for a comparison, FIG. 2 (b) schematically illustrates a MPEG2 transport stream (TS) structure. Furthermore, FIG. 2(c) schematically illustrates a MPEG2 program stream structure in the present invention.

In FIG. 2(a), one program stream to be recorded in the conventional DVD includes only one video stream for video data as main picture information, along the time axis t, and further includes up to 8 audio streams of audio data as audio information, up to 32 sub-picture streams for sub-picture data as sub-picture information. That is, the video data to be multiplexed at an arbitrary time point tx relates to only one video stream. For example, a plurality of video stream corresponding to a plurality of TV programs or a plurality of movies can not be included at the same time in the program stream. It is not possible to multiplex a plurality of TV programs and transfer or record them, in a program stream format of a DVD having only one video stream, because at least one video stream is required for each TV program, in order to transfer or record the multiplexed TV program or the like involving a video image.

In FIG. 2(b), one transport stream (TS) to be recorded in the optical disc 100 of the present invention includes a plurality of video streams as elementary streams (ES) for video data as main picture information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV programs or a plurality of movies can be included at the same time in the transport stream. Thus, it is possible to multiplex a plurality of TV programs and transfer or record them, in the transport stream format having a plurality of video streams. However, the sub-picture stream is not transferred in a digital broadcasting employing the existing transport stream.

In FIG. 2(c), one program stream (PS) to be recorded onto the optical disc 100 of the present invention includes a plurality of video streams for video data as main picture information, and further includes a plurality of audio streams for audio data as audio information and a plurality of sub-picture streams for sub-picture data as sub-picture information. That is, the video data to be multiplexed at an arbitrary time point tx relates to a plurality of video streams. For example, a plurality of video streams that may correspond to a plurality of TV programs or a plurality of movies can be included at the same time in the program stream.

Incidentally, for convenience of explanation, the video stream, the audio stream and the sub-picture stream are arranged in this order from the top in FIG. 2(a) to FIG. 2(c). Nevertheless, this order or sequence does not correspond to an order or sequence for multiplexing packet by packet as mentioned below. In the transport stream, conceptually, a set of one video stream, two audio streams and two sub-picture streams corresponds to one program for example.

The optical disc 100 in the aforementioned embodiment is adapted to multi-record the transport stream (TS) as shown in FIG. 2(b), i.e. to record a plurality of programs at the same time. Furthermore, instead of or in addition to this transport stream, the program stream (PS) as shown in FIG. 2(c) can be multi-recorded onto the same optical disc 100.

Figure 3:
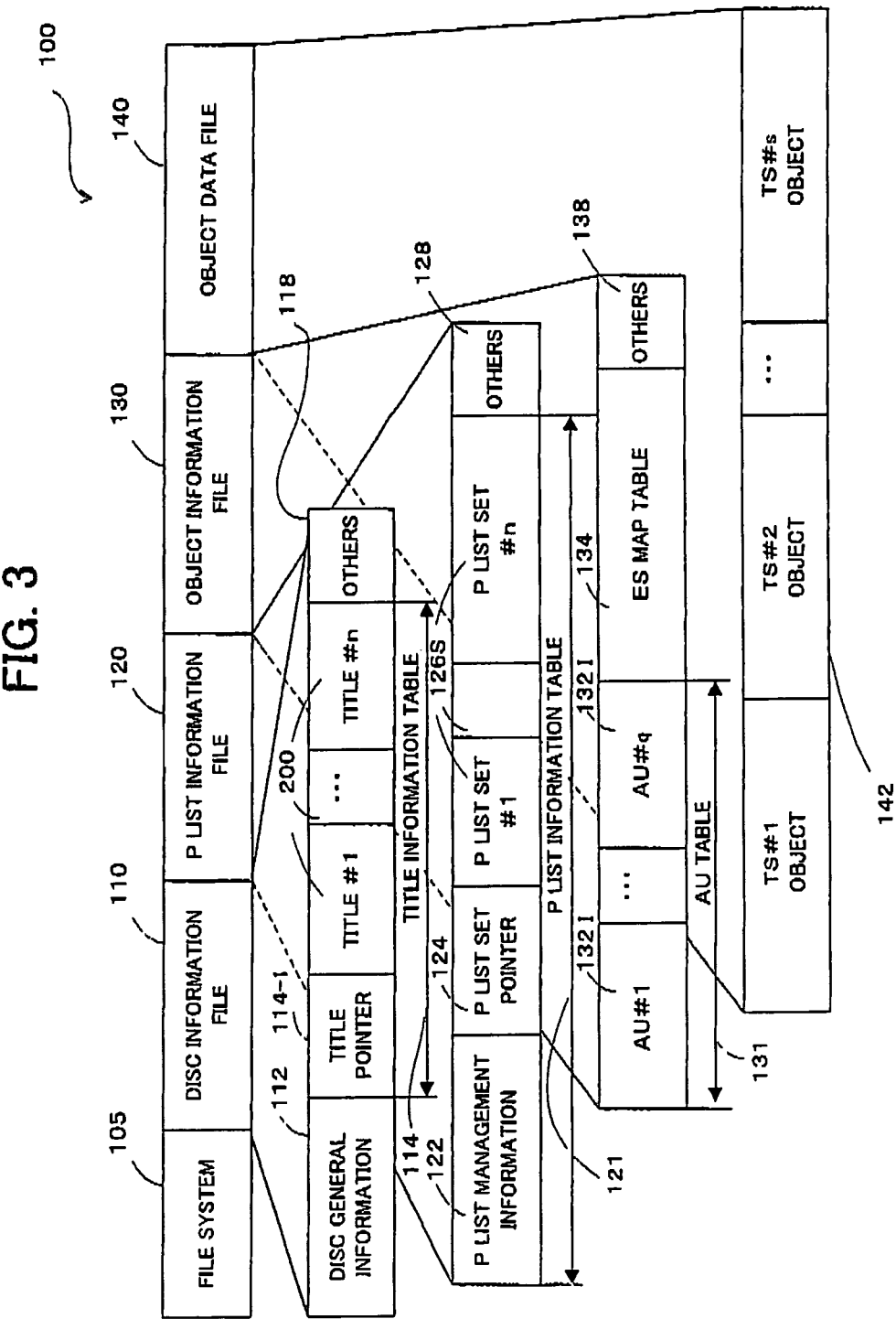
FIG. 3 is a diagram schematically illustrating a data structure recorded on the optical disc in the embodiment.
Figure 4:
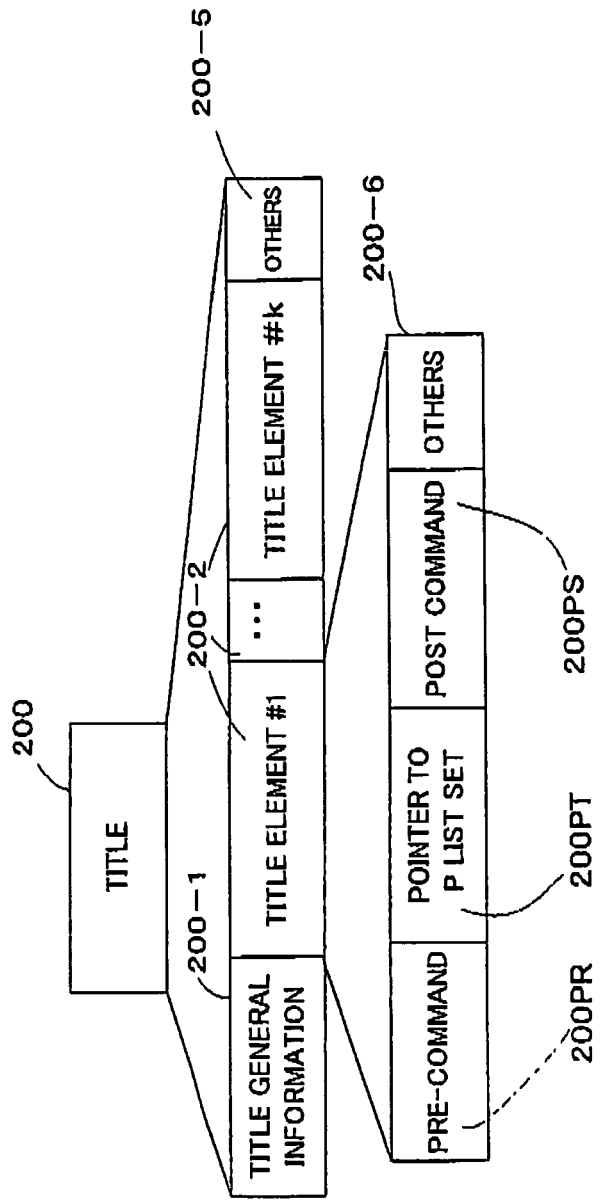
FIG. 4 is a conceptual diagram hierarchically illustrating a detail of a data structure in each title shown in FIG. 3.
Figure 5:
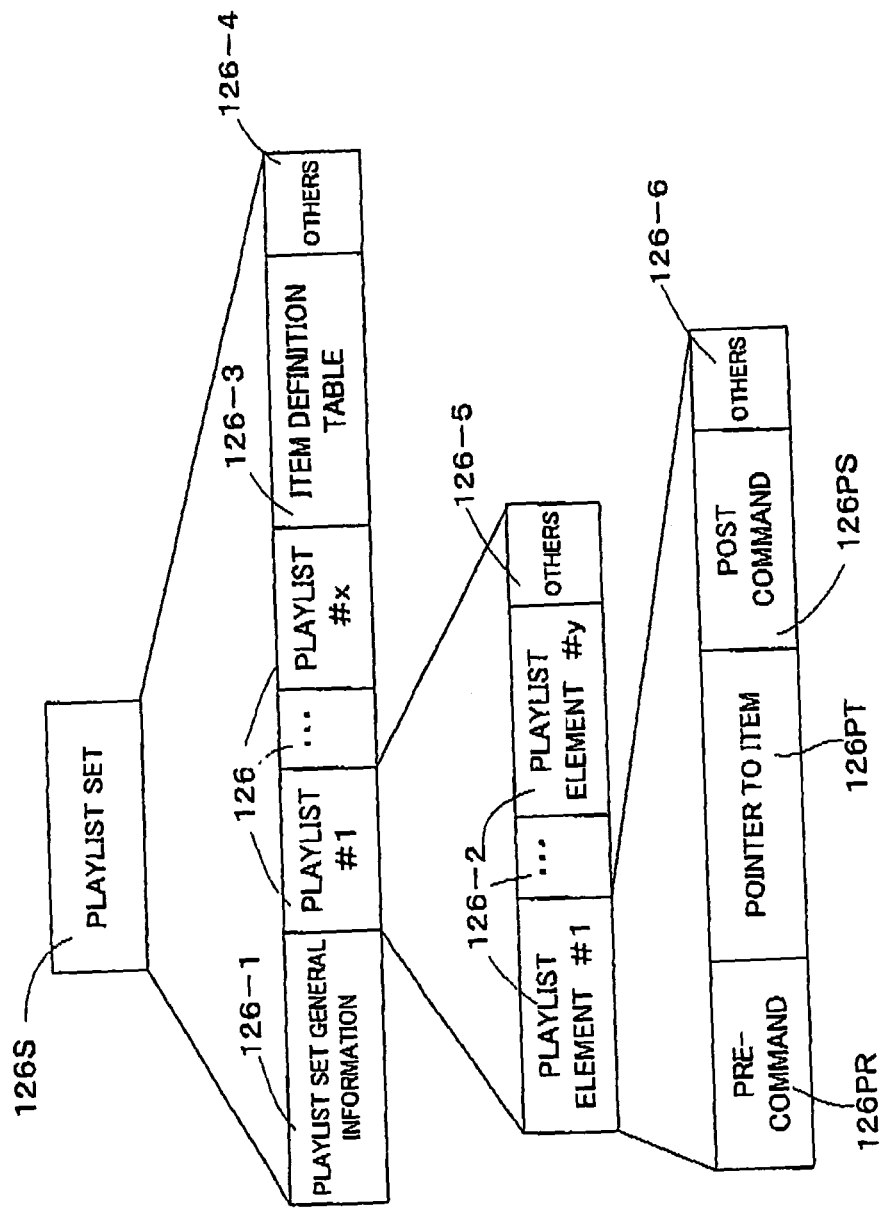
FIG. 5 is a conceptual diagram hierarchically illustrating a detail of a data structure in each play list set shown in FIG. 3
Figure 6:
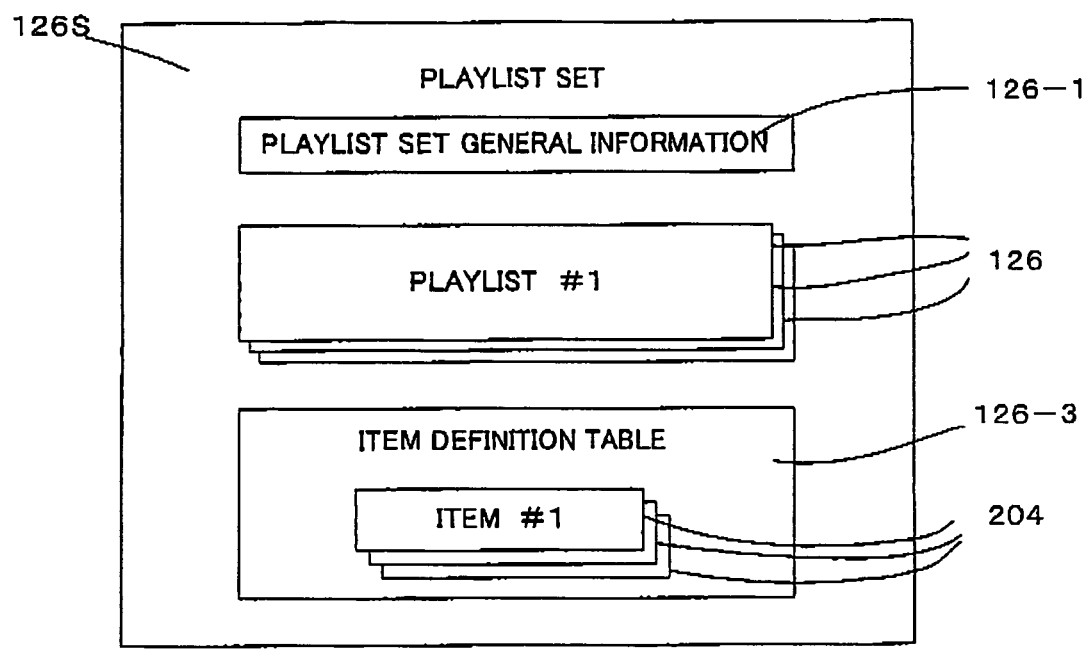
FIG. 6 is a conceptual diagram schematically illustrating a detail of a data structure in each play list set shown in FIG. 3.
Figure 7:
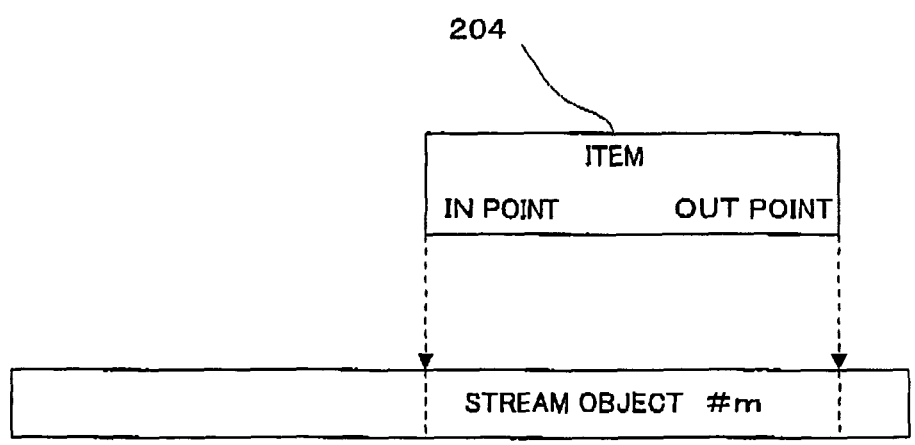
FIG. 7 is a conceptual diagram schematically illustrating a detail of a data structure of each item shown in FIG. 6.
Figure 8:
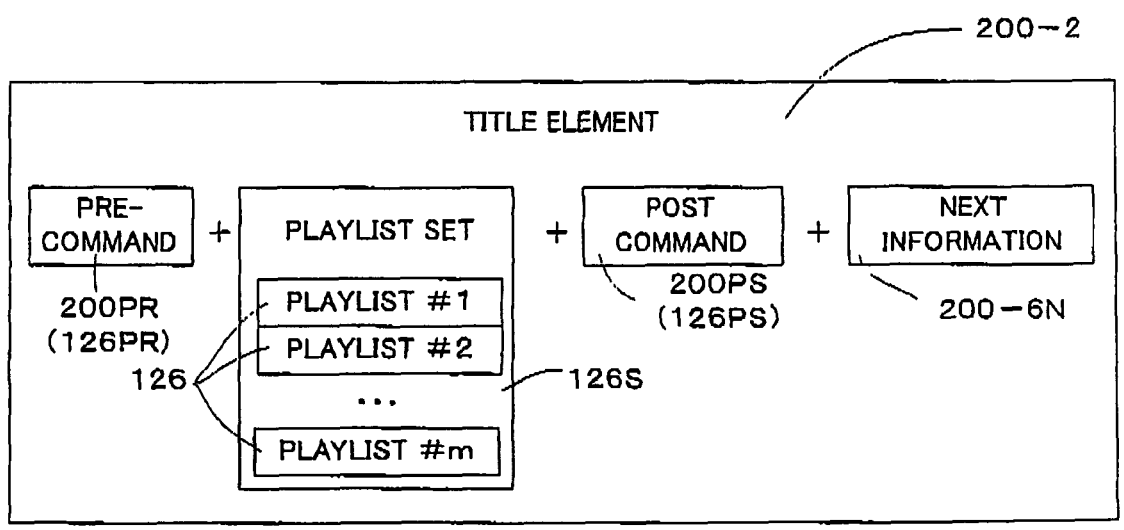
FIG. 8 is a conceptual diagram schematically illustrating a logic structure of data in each title element shown in FIG. 4.
Figure 9:
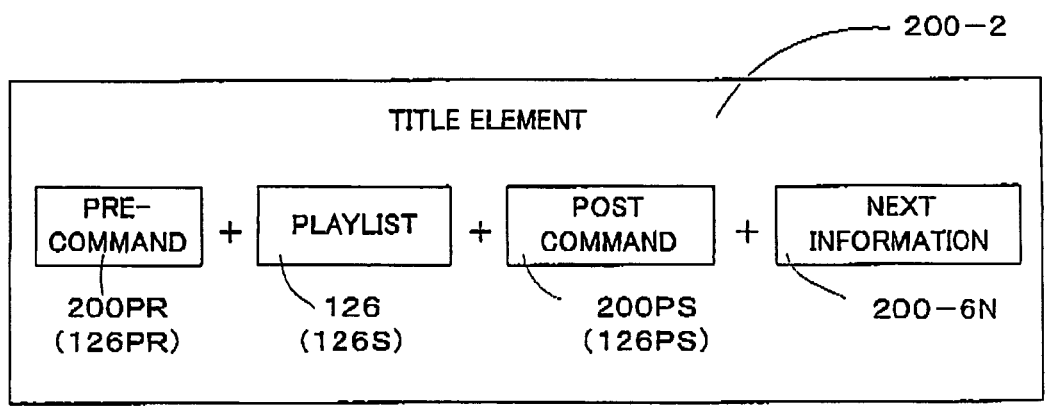
FIG. 9 is a conceptual view schematically illustrating a logic structure of data in each title element shown in FIG. 4, in a case that each play list set is composed of one play list.
Figure 10:
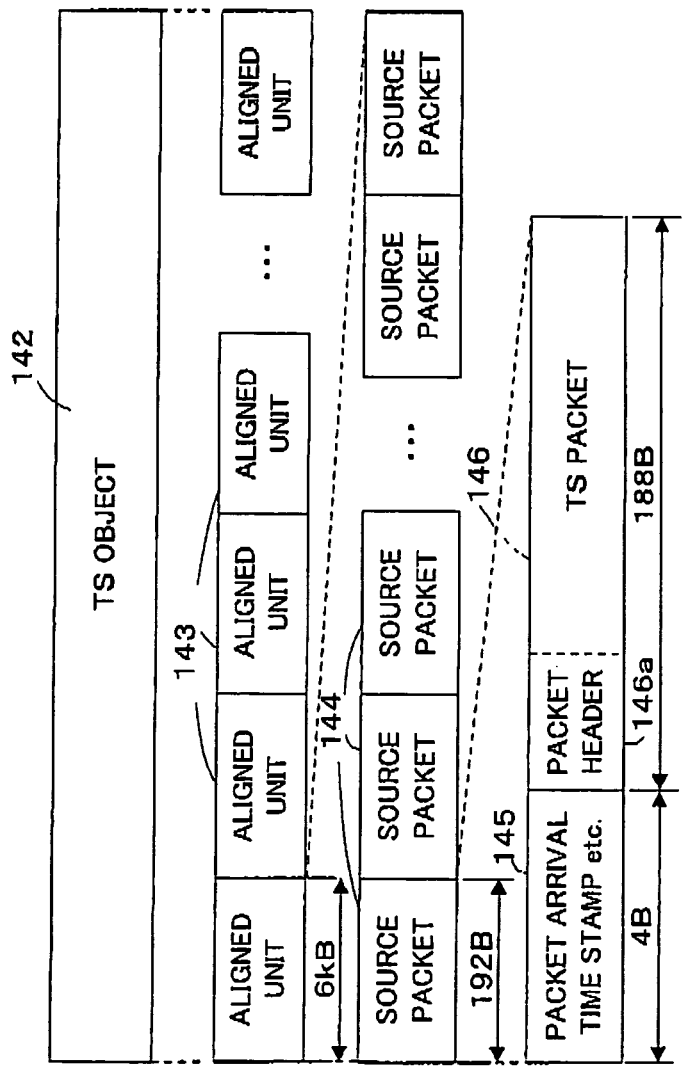
FIG. 10 is a conceptual view schematically illustrating a detail of a data structure in each object shown in FIG. 3.

Next, with reference to FIG. 3 and FIG. 10, a structure of data to be recorded onto the optical disc 100 is discussed. FIG. 3 schematically illustrates the data structure to be recorded onto the optical disc 100. FIG. 4 schematically illustrates in detail the data structure in each object shown in FIG. 3. FIG. 5 and FIG. 6 schematically show a data structure in detail respectively in each play list (P list) set shown in FIG. 3. FIG. 7 schematically shows a detail of the data structure of each item shown in FIG. 6. FIG. 8 schematically shows a logic structure of data in each title element shown in FIG. 4. FIG. 9 schematically shows a logic structure of data in each title element, in a case that each play list set is composed of one play list. FIG. 10 schematically shows a detail of a data structure in each object shown in FIG. 3.

In the following explanation, the "title" means a reproduction unit, on the basis of which a plurality of "play lists" are executed continuously or sequentially, and which is a logically large grouped unit, such as one movie or one TV program. The "play list set" means a bundle of "play lists". For example, it may be a bundle of play lists to reproduce a plurality of content information having a special relationship switchable to each other in an angle reproduction or a parental reproduction, or may be a bundle of play lists to reproduce content information relating to a plurality of programs broadcasted in the same time zone and collectively recorded. Alternatively, it may be a bundle of play lists to reproduce various content information, in one title, prepared on the basis of required function, for example on the basis of video performance or audio performance required for the information reproduction system, such as a high vision compatibility, a display resolution, a surround speaker compatibility, a speaker layout and so on. The "play list" is information for storing the information required to reproduce the "object" and consists of a plurality of "items" each storing the information about a reproduction range of the object to access the object. The "object" is the entity information of contents constructing the aforementioned MPEG2 transport stream.

In FIG. 3, the optical disc 100 is provided with four files as a logical structure: a disc information file 110; a play list (P list) information file 120; an object information file 130; and an object data file 140. The disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown in FIG. 1. That is, it is possible to record the file system 105 or the like in the data record area 106 following the lead-in area 104 and further record the object data file 140 or the like in the data record area 106. The file structure shown in FIG. 3 can be constructed, even without the lead-in area 104 or the lead-out area 108 shown in FIG. 1.

The disc information file 110 is a file for storing general information about the entire optical disc 100, and stores the disc general information 112, the title information table 114 and other information 118. The disc general information 112 may store the total numbers of titles or the like in the optical disc 100. The title information table 114 includes a title pointer 114-1 and a plurality of titles 200 (title #1-#m) whose ID (identification) number or record address is indicated by the title pointer. In each title 200, each title type (e.g. sequential reproduction type, branch type and so on), or the play list (P list) number constructing each title is recorded for each title, as the logical information.

More specifically, for example, as shown in FIG. 4, each title 200 is made of a title general information 200-1, a plurality of title elements 200-2 and other information 200-5. Furthermore, each title element 200-2 is made of a pre-command 200PR, a pointer 200PT to a play list set, a post command 200PS and other information 200-6.

The pointer 200PT as an example of the first pointer information according to the present invention indicates an ID number of the play list set 126S stored in the play list information file 120 corresponding to content information to be reproduced on the basis of the title element 200-2 including the pointer 200PT. Incidentally, the pointer 200PT may be information to indicate a record position of the play list set 126S corresponding to the content information to be reproduced on the basis of the title element 200-2. The pre-command 200PR as an example of the first pre-command according to the present invention indicates a command to be executed before reproducing the content information whose reproduction sequence is defined by one play list set 126S designated by the pointer 200PT. The post command 200PS as an example of the first post command according to the present invention is a command to be executed after reproducing the content information whose reproduction sequence is defined by said one play list set. Other information 200-5 included in the title element 200-2 may include next information to designate a title element for a next reproduction after the present reproduction of the present title element, for example.

Therefore, when the information reproduction apparatus reproduces the information record medium, the desired content information can be reproduced as a title element 200-2, by making access to the play list set 126S in accordance with the pointer 200PT and performing a control to select play list corresponding to the desired program or the like from among a plurality of play lists 126 in the play list set 126S. Furthermore, reproducing such a title element 200-2 solely or sequentially makes it possible to reproduce one title 200. Furthermore, it is possible to execute commands to be executed before reproduction, in the content information whose reproduction sequence is defined by one play list set 126S designated by the pointer 200PT, according to the pre-command 200PR. Furthermore, it is possible to execute commands to be executed after the reproduction, in the content information whose reproduction sequence is defined by one play list set 126S designated by the pointer 200PT, according to the post command 200PS. The post command 200PS may be a command to branch the content information, a command to select a next title and so on. Additionally, it is possible to reproduce a next title element 200-2 to be reproduced after the presently reproduced title element 200-2, according to the "next information" included in other information 200-5.

Again in FIG. 3, the play list information file 120 stores the play list (P list) information table 121 indicating the logical structure of each play list. This table 121 is divided into the play list (P list) management information 122, the play list (P list) set pointer 124, a plurality of play list (P list) sets 126S (P list set #1-#n), and other information 128. In this play list information table 121, the logical information of each play list set 126S is stored in the order of the play list set number. In other words, the order for storing the each play list set 126S is the play list set numbers. Furthermore, in the aforementioned title information table 114, the same play list set 126S can be referred from a plurality of titles 200. That is, the play list set #p in the play list information table 121 may be pointed on the title information table 114, even in the case that title #q and title #r use the same play list set #p.

As shown in FIG. 5, the play list set 126S includes play list set general information 126-1, a plurality of play lists 126 (play list #1-#x), an item definition table 126-3, and other information 126-4. Each play list 126 includes a plurality of play list elements 126-2 (play list element #1-#y), and other information 126-5. Furthermore, each play list element 126-2 includes a pre-command 126PR, a pointer 126PT to item, a post command 126PS and other information 126-6.

The pointer 126PT as an example of the second pointer information according to the present invention indicates an item identification number defined by the item definition table 126-3 corresponding to the content information to be reproduced on the basis of the play list element 126-2 including the pointer 126PT. Incidentally, the pointer 126PT may be an item record position defined by the item definition table 126-3.

As shown in FIG. 6, in the play list set 126S, a plurality of items 204 are defined in the item definition table 126-3. They are commonly belonged to a plurality of play lists 126. Furthermore, as the play list set general information 126-1, a name of each play list 126 included in the play list set 126S, UI (user interface information) such as a reproduction time, address information to each item definition table 126-3 and so on are recorded.

Again in FIG. 5, the pre-command 126PR as an example of the second pre-command according to the present invention indicates a command to be executed before reproduction of one item 204 designated by the pointer 126PT. The post command 126PS as an example of the second post command according to the present invention indicates a command to be executed after the reproduction of said one item 204. Other information 126-6 included in the play list element 126-2 may include the next information to designate the play list element 126-2 relating to the next reproduction of the reproduction of the play list element 126-2.

As shown in FIG. 7, the item 204 is a minimum unit to be displayed. In the item 204, "in-point information" to indicate a start address of an object and "out-point information" to indicate an end address of the object are recorded. Incidentally, each of these "in-point information" and "out-point information" may indicate the address directly or indirectly as a time period or time point on the reproduction time scale. In the figure, if a plurality of ESs (Elementary Streams) are multiplexed for the object designated by "stream object #m", designating the item 204 means designating a special ES or special combination of ESs.

As shown in FIG. 8, the title element 200-2 logically consists of the pre-command 200PR or 126PR, the play list set 126S selected by the pointer 200PT, the post command 200PT or 126PS, and the next information 200-6N. Therefore, a processing to select the play list 126 from among the play list set 126S is executed, according to any condition reproducible in a system, such as video resolution.

As shown in FIG. 9, however, if the play list set designated by the pointer 200PT consists of only one play list, i.e. if the play list set 126S shown in FIG. 3 is replaced by a single play list 126, the title element 200-2 logically consists of the pre-command 200PR or 126PR, the play list 126 to be reproduced during the reproduction operation, the post command 200PS or 126PS, and the next information 200-6N. In this case, once the play list set is designated for the reproduction, the single play list 126 is reproduced, regardless of the condition reproducible in the system.

Again in FIG. 3, in the object information file 130, the storage position (i.e. the logical address of the reproduction object) in the object data file 140 for each item constructed in each play list 126, and/or various attribute information relating to the reproduction of the item are stored. Particularly in this embodiment, the object information file 130 stores the AU table 131 including a plurality of AU (Associate Unit) information 132I (AU #1-#q) as mentioned below, the ES (Elementary Stream) map table 134 and other information 135.

The object data file 140 stores a plurality of TS objects 142 for each transport stream (TS #1 object-TS #s object), i.e. entity data of contents to be actually reproduced.

Incidentally, four kinds of file discussed with reference to FIG. 3 can be further divided into a plurality of files respectively to be stored. All these files may be managed by the file system 105. For example, the object data file 140 can be divided into a plurality of files such as object data file #1, object data file #2 and so on.

As shown in FIG. 10, the TS object 142 shown in FIG. 3, as a logically reproducible unit, may be divided into a plurality of aligned units 143 each having 6 kB of data amount. The head of the aligned units 143 is aligned with the head of the TS object 142. Each aligned unit 143 is further divided into a plurality of source packets 144 each having 192 B of data amount. The source packet 144 is a physically reproducible unit, on the basis of which (i.e. packet by packet) at least the video data, the audio data and the sub-picture data from among the data on the optical disc 100 are multiplexed, and other information may be multiplexed in the same manner. Each source packet 144 includes the control information 145 having 4 B of data amount to control the reproduction, such as the packet arrival time stamp or the like indicating the reproduction start time point of the TS (Transport Stream) packet on the reproduction time scale, and includes the TS packet 146 having 188 B of data amount. The TS packet 146 (also referred to as "TS packet payload") has a packet header 146a at its head portion. The video data may be packetized as the "video packet", the audio data may be packetized as the "audio packet", or the sub-picture data may be packetized as the "sub-picture packet", otherwise other data may be packetized.

Figure 11:
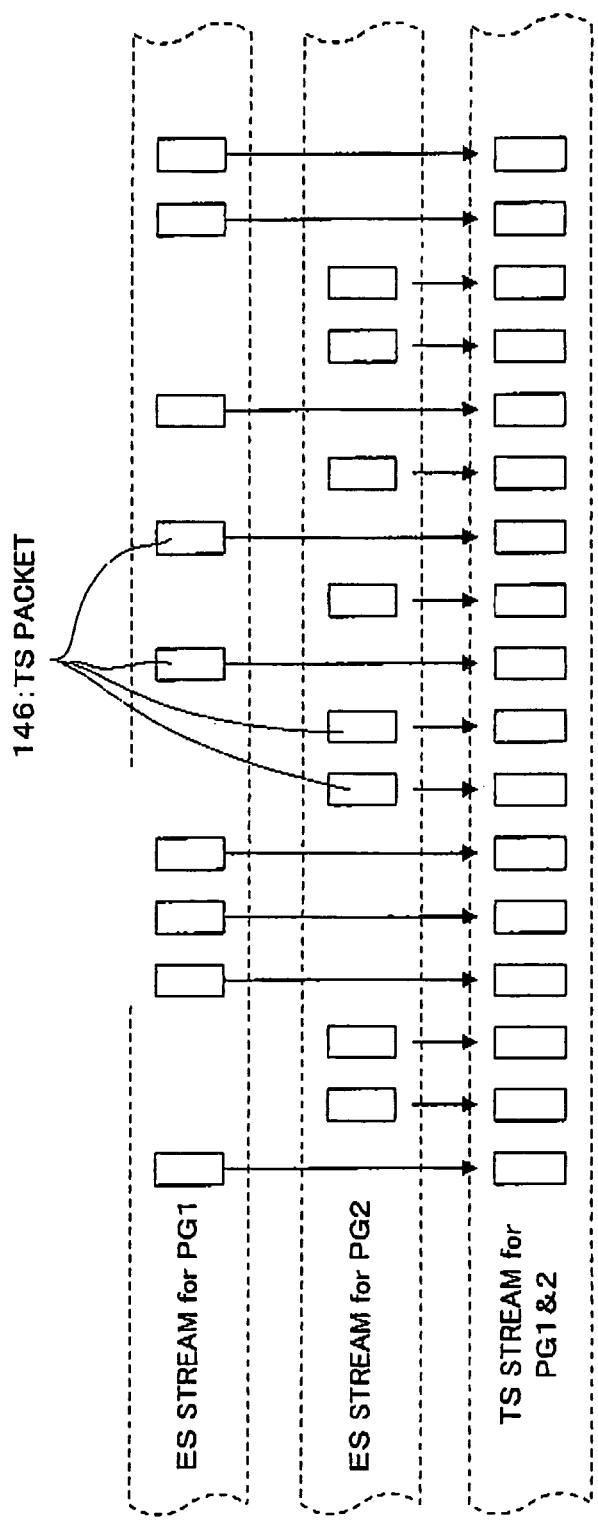
FIG. 11 is a view schematically illustrating a situation that an elementary stream for a program #1, shown in the upper column, and an elementary stream for a program #2, shown in the middle column, are multiplexed to form a transport stream for these two programs, on the basis of a time scale in a horizontal direction.
Figure 12:
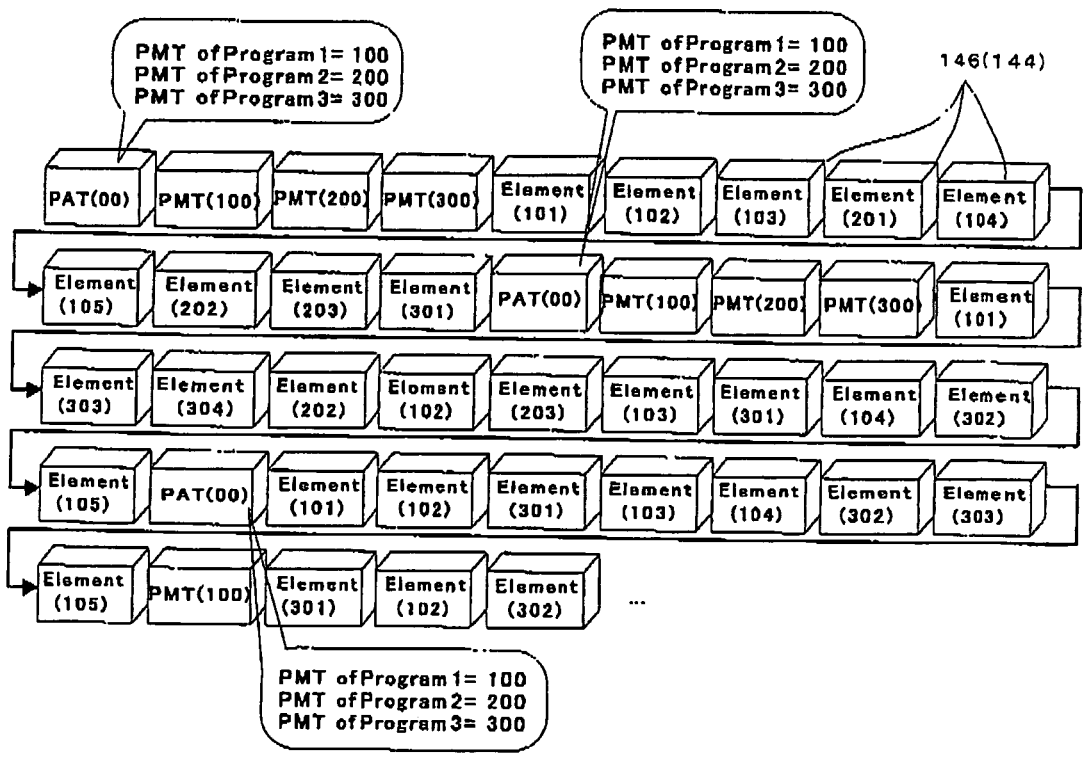
FIG. 12 is a conceptual view conceptually illustrating an image of TS packets multiplexed in one transport stream in the embodiment, as a packet arrangement based on the time scale.

Next, with reference to FIG. 11 and FIG. 12, an explanation is made on the multi-recording of the video data, the audio data, the sub-picture data and the like in the transport stream format as shown in FIG. 2(b), by the TS packet 146 shown in FIG. 4. FIG. 11 conceptually illustrates that the elementary stream (ES) for program #1 (PG1) in the upper stage and the elementary stream (ES) for program #2 (PG2) in the middle stage are multiplexed, and the transport stream (TS) for these two programs (PG1&2) is formed, under an assumption that a horizontal axis is defined as a time axis. FIG. 12 conceptually illustrates an image of the TS packets multiplexed in one transport stream (TS), as a packet array along the time (sic).

As shown in FIG. 11, the elementary stream for program #1 (in the upper stage) may be formed by discretely arranging TS packets 146 obtained by packetizing the video data for program #1, along the time axis. The elementary stream for program #2 (in the middle stage) may be formed by discretely arranging TS packets obtained by packetizing the video data for program #2, along the time axis. Then, these TS packets 146 are multiplexed so that the transport stream (in the lower stage) for two programs is made. Incidentally, omitted for convenience of explanation in FIG. 11, the elementary stream made of TS packets obtained by packetizing the audio data as the elementary stream for program #1, and/or the sub-picture stream made of TS packets obtained by packetizing the sub-picture data may be multiplexed similarly, as shown in FIG. 2(b). In addition to this, the elementary stream made of TS packets obtained by packetizing the audio data, as the elementary stream for program #2, and the sub-picture stream made of TS packets obtained by packetizing the sub-picture data may be multiplexed similarly.

As shown in FIG. 12, in this embodiment, a plurality of TS packets 146 multiplexed as such forms one TS stream. Then, a plurality of TS packets 146 in the multiplexed form is multi-recorded onto the optical disc 100, with the information such as the packet arrival time stamp 145 and the like being added. Incidentally, in FIG. 12, the TS packet 146 consisting of the data forming program #i (i=1, 2, 3) is indicated by "element (i0j)", wherein, j (j=1, 2, ...) is a sequential number for each stream composing the program. This (i0j) is defined as a packet ID which is an identification number of the TS packet 146 for each elementary stream. This packet ID is fixed at an inherent value for a plurality of TS packets 146 to be multiplexed at the same time point, so that the plurality of TS packets 146 are distinguished from each other even if multiplexed at the same time point.

Furthermore, in FIG. 12, the PAT (Program Association Table) and the PMT (Program Map Table) are also packetized by the TS packet 146 unit and multiplexed. The PAT among them stores a table indicating a plurality of PMT packet IDs. Particularly, the PAT is defined by MPEG2 standard so that (000) is given as a predetermined packet ID, as shown in FIG. 12. That is, from among a plurality of packets multiplexed at the same time point, the TS packet 146 obtained by packetizing the PAT is detected, as the TS packet 146 whose packet ID is (000). The PMT stores a table indicating the packet ID for each elementary stream forming each program in one or more programs. Any packet ID can be given to the PMT, their packet IDs are indicated by the PAT detectable with the packet ID (000) as mentioned above. Therefore, among a plurality of packets multiplexed at the same time point, the TS packets 146 obtained by packetizing the PMT (i.e. TS packets 146 to which packet IDs (100), (200) and (300) are given in FIG. 12) are detected on the basis of the PAT.

In the case that the transport stream as shown in FIG. 12 is transferred digitally, the tuner refers to the PAT and the PMT constructed as such and thereby extracts the multiplexed packets corresponding to the desired elementary stream and decodes the extracted packets.

In this embodiment, these PAT and PMT are included as the TS packets 146 to be stored in the TS object 142 shown in FIG. 10. That is, when the transport stream as shown in FIG. 12 is transferred, the transferred stream can be directly recorded onto the optical disc 100, which is a great advantage.

Furthermore in this embodiment, these PAT and PMT recorded as such are not referred to when the optical disc 100 is reproduced. Instead, referring to the AU table 131 and the ES map table 134, shown in FIG. 3 and mentioned in detail later, makes it possible to perform the reproduction effectively and apply to the complicated multi-vision reproduction or the like. For this, in this embodiment, a relationship between packets and the elementary stream obtained by referring to the PAT and the PMT on decoding or recording for example is stored in the object information file 130, in a form of AU table 131 and ES map table 134, without packetizing or multiplexing.

Figure 13:
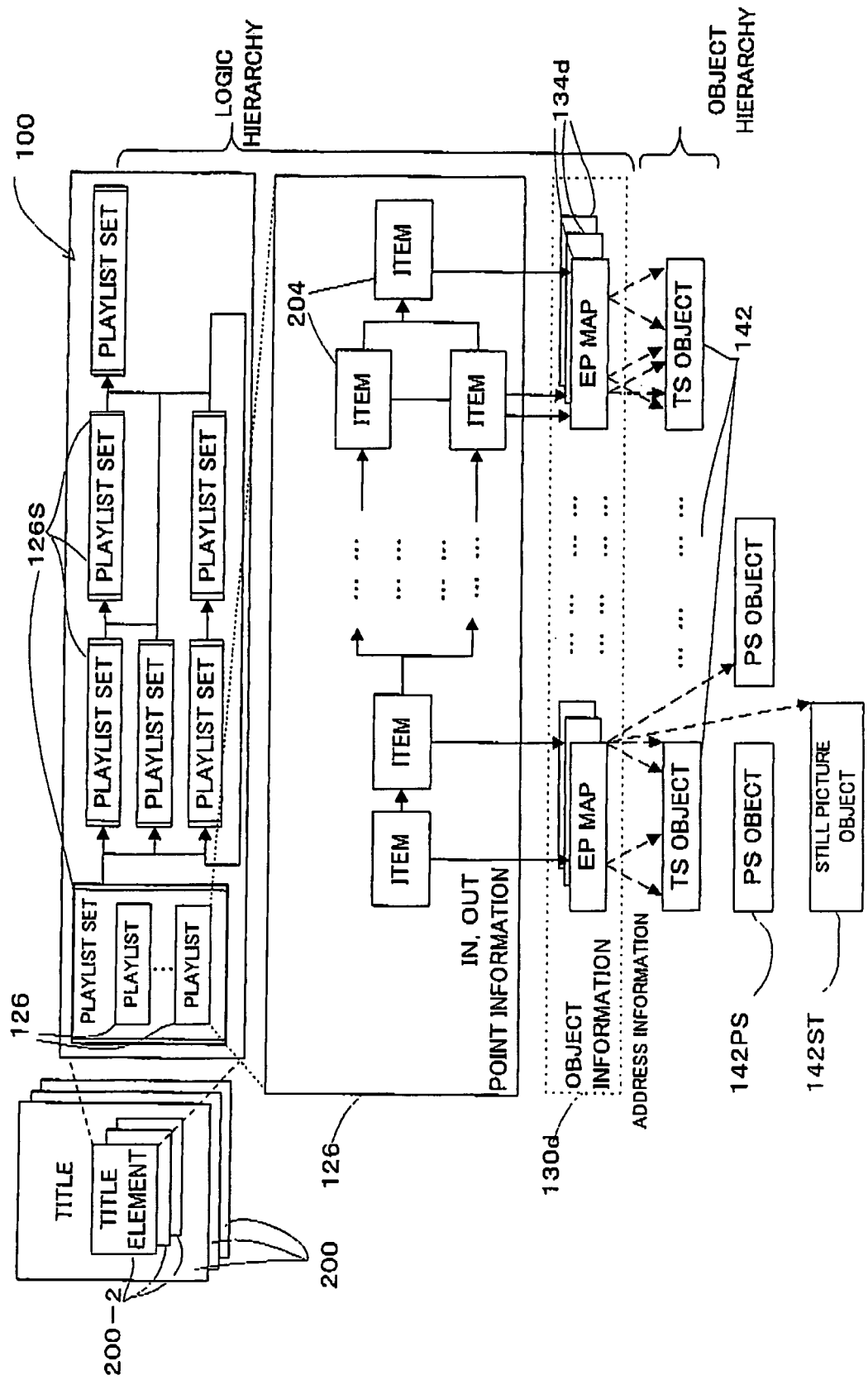
FIG. 13 is a view schematically illustrating a logic structure of data on an optical disc in the embodiment, focusing on development from a logic hierarchy to an object hierarchy or an entity hierarchy.

Next, with reference to FIG. 13, the logical structure of data on the optical disc 100 is discussed. FIG. 13 schematically illustrates the logical structure of data on the optical disc 100, focusing on the development from the logic hierarchy to the object hierarchy or the entity hierarchy.

In FIG. 13, one or more titles 200 that are a logical large unit such as one movie or one TV program are recorded on the optical disc 100. Each title 200 includes one or more title elements 200-2. Each title element 200-2 logically consists of a plurality of play list sets 126S. In each title element 200-2, the plurality of play list sets 126S may have a sequential structure or may have a branch structure.

Incidentally, in the case of a simple logical structure, one title element 200-2 consists of one play list set 126S. Furthermore, one play list set 126S consists of one play list 126. On the other hand, it is possible to refer to one play list set 126S by a plurality of title elements 200-2 or a plurality of titles 200.

Each play list 126 is logically made of a plurality of items (play items) 204. In each play list 126, a plurality of items 204 may have the sequential structure or may have the branch structure. On the other hand, it is possible to refer to one item 204 by a plurality of play lists 126. The aforementioned in-point information and out-point information recorded on/in the item 204 logically designates the reproduction range of the TS object 142. Then, the object information 130d of the logically designated reproduction range is referred to and thereby the reproduction range of the TS object 142 is physically designated, via the file system finally. Here, the object information 130d includes various information to reproduce the TS object 142, such as the attribute information of the TS object 142, the ES address information 134*d* and the like required for the data search in the TS object 142 (Incidentally, the ES map table 134 shown in FIG. 3 includes a plurality of ES address information 134*d*).

Then, when the information record and reproduce apparatus reproduces the TS object 142 as mentioned below, a physical address to be reproduced in the TS object 142 is obtained from the item 204 and the object information 130*d* so that a desired elementary stream is reproduced.

Incidentally, the EP (Entry Pass) map including a plurality of ES address information 134*d*, shown within the object information of FIG. 13, herein indicates an object information table in which the AU table 131 and the ES map table 134 are listed.

Thus, in this embodiment, the in-point information and out-point information recorded on/in the item 204, as well as the ES address information 134*d* recorded in the ES map table 134 (see FIG. 3) of the object information 130*d* make it possible to perform the association from the logic hierarchy to the object hierarchy in the reproduction sequence so that the elementary stream is reproduced.

As discussed above, in this embodiment, units of the TS packet 146 are multiplexed and recorded on the optical disc 100. Thereby, the transport stream including a plurality of elementary streams as shown in FIG. 2(*b*) can be recorded onto the optical disc 100. In this embodiment, in the case that digital broadcasting is recorded onto the optical disc 100, a plurality of programs can be recorded at the same time, within the restriction of the record rate. Nevertheless, a record method is employed herein, in which a plurality of programs are multiplexed and recorded for one TS object 142. Now, an explanation is made on an embodiment of the information record reproduction apparatus capable of performing such a record processing.

(Information Record Reproduction Apparatus)

Figure 14:
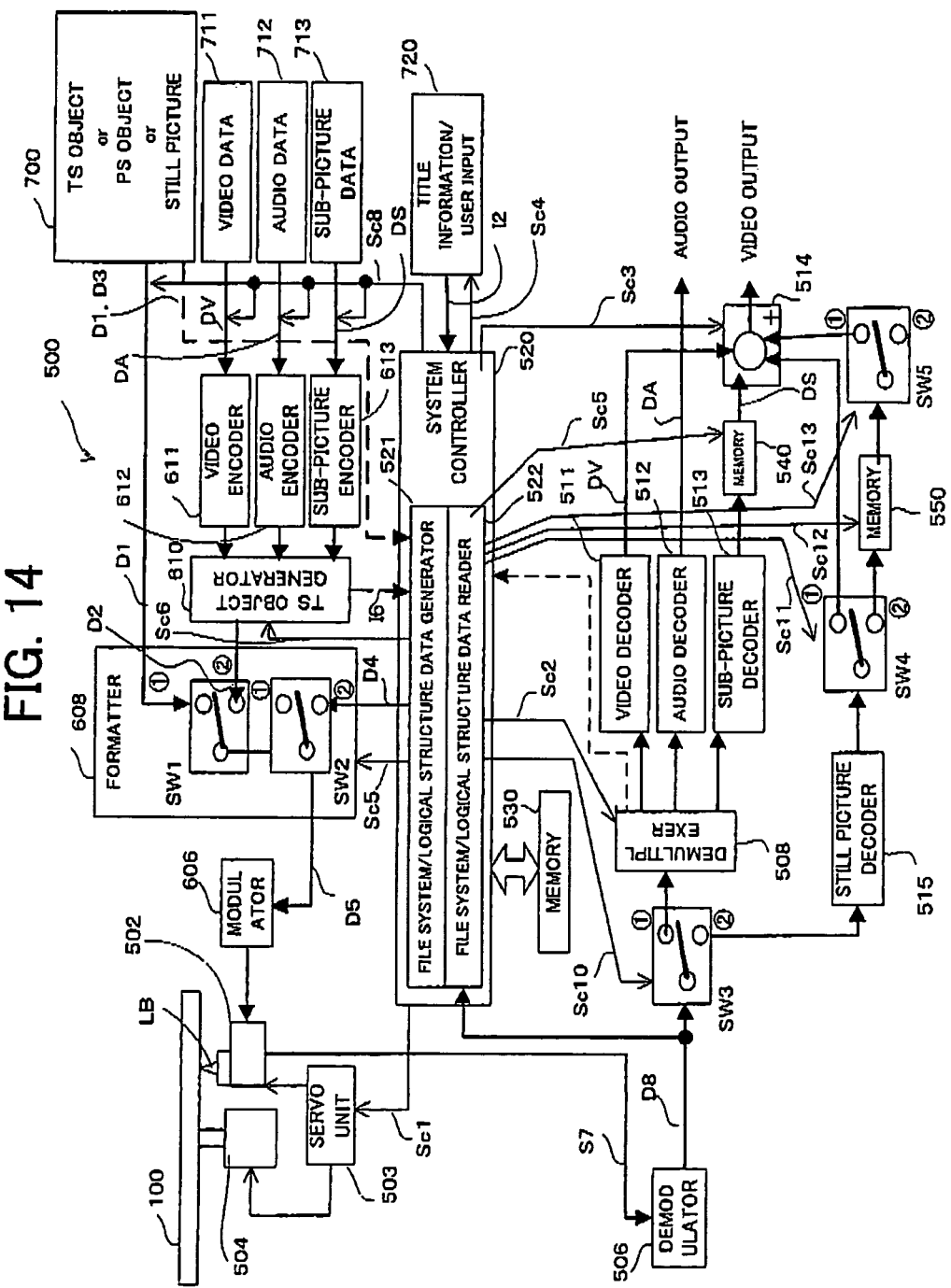
FIG. 14 is a block diagram schematically illustrating an information record reproduction apparatus in the embodiment.

Next, with reference to FIG. 14 to FIG. 19, an embodiment of the information record reproduction apparatus of the present invention is discussed. Here, FIG. 14 is a block diagram of the information record reproduction apparatus, and FIGS. 15 to 19 illustrate the operational flow.

In FIG. 14, the information record reproduction apparatus 500 is roughly divided into a reproduction system and a record system. The apparatus 500 is constructed to record the information onto the optical disc 100 mentioned above and reproduce the information recorded thereon/therein. In this embodiment, the information record reproduction apparatus 500 is thus for recording and reproduction. Nevertheless, an embodiment of the information record apparatus according to the present invention can be constructed basically with the record system of the apparatus 500 and an embodiment of the information reproduction apparatus according to the present invention can be constructed basically with the reproduction system of the apparatus 500.

The information record reproduction apparatus 500 is provided with: an optical pickup 502; a servo unit 503; a spindle motor 504; a decoder 506; a demultiplexer 508; a video decoder 511; an audio decoder 512; a sub-picture decoder 513; an adder 514; a still picture decoder 515; a system controller 520; a memory 530; a memory 540; a memory 550; a modulator 606; a formatter 608; a TS object generator 610; a video encoder 611; an audio encoder 612; and a sub-picture encoder 613. The system controller 520 includes a file system/logical structure data generator 521 and a file system/ logical structure data reader 522. Furthermore, the memory 530 and a user interface 720 to give a user input such as title information are connected to the system controller 520.

Among these constitutional elements, the decoder 506, the demultiplexer 508, the video decoder 511, the audio decoder 512, the sub-picture decoder 513, the adder 514, the still picture decoder 514, the memory 540 and the memory 550 mainly constructs the reproduction system. On the other hand, among these constitutional elements, the modulator 606, the formatter 608, the TS object generator 610, the video encoder 611, the audio encoder 612 and the sub-picture encoder 613 mainly constructs the record system. The optical pickup 502, the servo unit 503, the spindle motor 504, the system controller 520, the memory 530 and the user interface 720 to give the user input such as title information are generally shared for both the reproduction system and the record system. Furthermore, for the record system, a TS object data source 700 (or a PS object data source 700, or a still picture data source 700 such as bit map data, JPEG data and the like); a video data source 711; an audio data source 712; and a sub-picture data source 713 are prepared. Furthermore, the file system/logical structure data generator 521 disposed in the system controller 520 is used mainly in the record system, and the file system/logical structure reader 522 is used mainly in the reproduction system.

The optical pickup 502 irradiates the optical disc 100 with a light beam LB such as a laser beam, at the first power as reading light for the reproduction, and at the second power with the light beam LB being modified as writing light for recording. The servo unit 503 performs the focus servo, the tracking servo and the like for the optical pickup 502, as well as the spindle servo for the spindle motor 504, under control of the control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 14 to FIG. 18, a specific structure and the operation of each constitutional element constructing the record system of the information record and reproduction system 500 is explained in each case.

(i-1) In the Case that the Already Generated Object is Used

Figure 15:
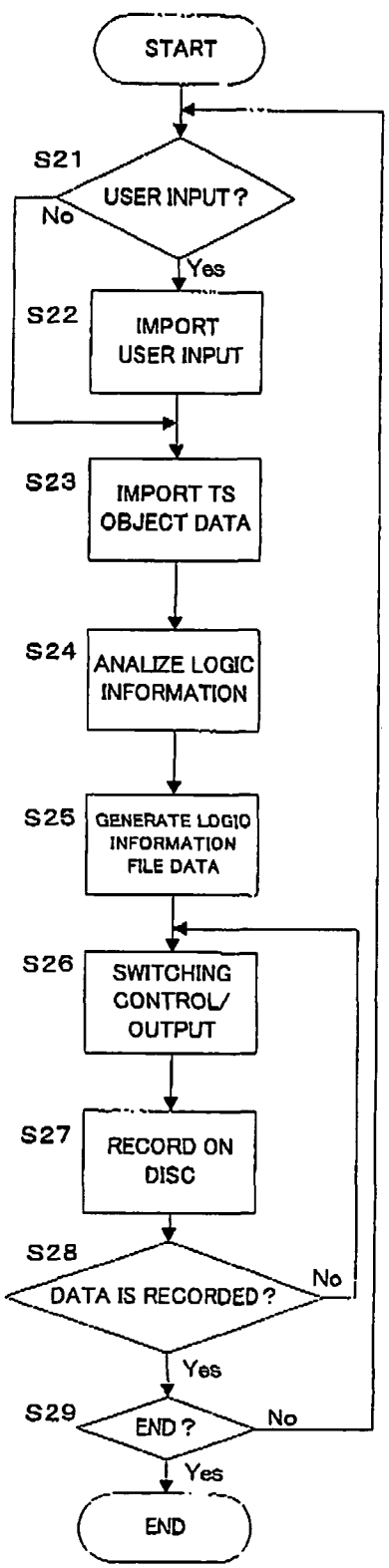
FIG. 15 is a flow chart indicating a recording operation (part 1) of the information record reproduction apparatus in the embodiment.

This case is discussed, with reference to FIG. 14 and FIG. 15.

In FIG. 14, the TS object data source 700 may be made of the memory storage such as a video tape, a memory, for storing the TS object data D1.

Firstly in FIG. 15, each title information (e.g. play list contents etc.) to be logically constructed on the optical disc 100 using the TS object data D1 is inputted into the system controller 520, as the user input I2 such as the title information, via the user interface 720. Then, the system controller 520 imports the user input I2 such as the title information via the user interface 720 (step S21: Yes, and step S22). In this case, the user interface 720, under control of the control signal Sc4 from the system controller 520, can perform the input operation in response to the contents to be recorded, such as the selection via the title menu screen. Incidentally, if the user input is already performed (step S21: No), these processings are omitted.

Next, the TS object data source 700 outputs the TS object data D1, under control of the control signal Sc8 to indicate the data reading from the system controller 520. Then, the system controller 520 imports the TS object data D1 from the TS object data source 700 (step S23), and performs the data array analysis (e.g. a record data length and the like) of the TS object data D1, the analysis of each elementary stream structure (e.g. understanding of ES_PID (elementary stream/ packet identification number)), on the basis of the PAT, the PMT and the like packetized with the video data as mentioned above, due to the TS analysis feature in the file system/logical structure data generator 521 (step S24).

Next, the system controller 520 makes the file system/logical structure data generator 521 generate the disc information file 110, the play list information file 120, the object information file 130 and the file system 105 (see FIG. 3), as the logical information file data D4, on the basis of the analysis result of each elementary stream and the TS object data D1 data array, as well as the user input I2 such as the imported title information (step S25). The memory 530 is used to generate this logical information file data D4.

Incidentally, variations in which the data about each elementary stream structure information and the TS object data D1 data array may be prepared in advance are naturally understood or suggested, all of which are encompassed within a scope of the embodiment.

In FIG. 14, the formatter 608 is for formatting the data array to store both the TS object data D1 and the logical information file data D4 on the optical disc 100. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as to output the logical information file data D4.

At step S26 in FIG. 15, (i) the logical information file data D4 from the file system/logical structure data generator 521 at the step S25 or (ii) the TS object data D1 from the TS object data source 700 is outputted through the formatter 608, under the switching-control by the formatter 608 as constructed above (step S26).

The selection output from the formatter 608 is transmitted to the modulator 606 as disc image data D5, and modulated by the modulator 606, and recorded onto the optical disc 100 through the optical pickup 502 (step S27). The system controller 520 also executes the disc record control in this case.

Then, if both the logical information file data D4 generated at the step S25 and the corresponding object data D1 have not been completely recorded yet, the operational flow returns to the step S26 to continue the recording (step S28: No). Incidentally, there is no preference in the record sequence of the logical information file data D4 and the corresponding object data D1.

On the other hand, if the both have been already recorded, it is judged whether or not the recording onto the optical disc 100 is to be ended, on the basis of the presence or absence of an end command (step S29). If it is not to be ended (step S29: No), the operational flow returns to the step S21 to continue the recording. On the other hand, if it is to be ended (step S29: Yes), a series of record processing ends.

As described above, the information record reproduction apparatus 500 performs the record processing in the case of using the already prepared TS object.

Incidentally, the example in FIG. 15 shows that the logical information file data D4 and the corresponding object data D1 are outputted at the step S26, after preparing the logical information file data D4 at the step S25. However, it is also possible to output the object data D1 and/or record the object data D1 onto the optical disc 100 before the step S25, so that the logical information file data D4 is generated and/or recorded after or in parallel with this recording.

Additionally, a PS object data source or a still picture data source may be used instead of the TS object data source 700. In this case, the recording processing the same as in the case of the TS object data D1 as mentioned above is performed for the PS object data, or the sill picture data such as bit map data, JPEG data and the like, instead of the TS object data D1. Furthermore, instead of the TS object 142, the PS object data or the still picture data is stored in the object data file 140. Then, various logic information about the PS object data or the still picture data is generated under control of the system controller 520, and stored in the disc information file 110, the play list information file 120, the object information file 130 and the like.

(i-2) The Case of Receiving and Recording the Transport Stream on Air

Figure 16:
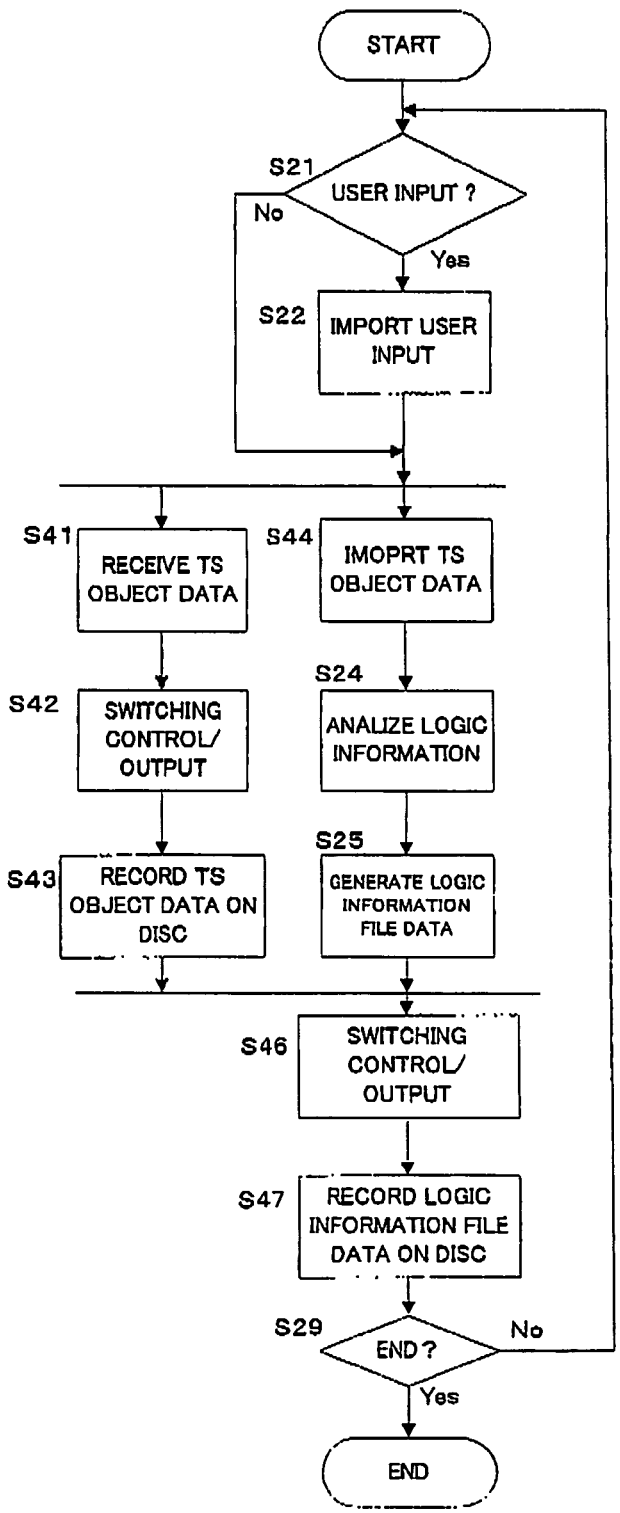
FIG. 16 is a flow chart indicating a recording operation (part 2) of the information record reproduction apparatus in the embodiment.

This case is explained with reference to FIG. 14 and FIG. 16. Incidentally, in FIG. 16, the same steps as those in FIG. 15 have the same step reference numbers, and their explanation is omitted as occasion demands.

Again, in this case, the similar processing is performed, as is "the case of using the already prepared object" described above. Therefore, the following explanation is focused on the differences from this case.

In the case of receiving and recording the transport stream on air, the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the belowmentioned ES_PID information, which are deciphered upon receiving, is imported into the system controller 520 and is stored into the memory 530 (step S44).

In the meantime, the TS object data D1 outputted to the formatter 608 is outputted to the modulator 606 under the switching-control by the formatter 608 (step S42), and is recorded onto the optical disc 100 (step S43).

Along with these operations, using the program construction information and the ES_PID information included in the reception information D3 imported upon receiving and stored in the memory 530, the file system/logical structure data generator 521 prepares the logical information file data D4 (step S24 and step S25). Then, after the completion of recording a series of the TS object data D1, this logical information file data D4 is additionally recorded onto the optical disc 100 (step S46 and step S47). Incidentally, these steps S24 and S25 may be performed after the step S43.

Moreover, as the occasion demands (e.g. in the case of editing one portion of the title, or the like), by adding the user input I2 of the title information and the like from the user interface 720 to the program construction information and the ES_PID information stored in the memory 530, it is possible to prepare the logical information file data D4 by the system controller 520 and additionally record this onto the optical disc 100.

As described above, the information record reproduction apparatus 500 performs the record processing in the case of receiving the transport stream on air and recording it in real time.

Incidentally, if all the reception data obtained when broadcasting is once stored into an archive apparatus, and then, if this is used as the object source 700, the same processing as that in "the case of using the already prepared object" will do.

Figure 17:
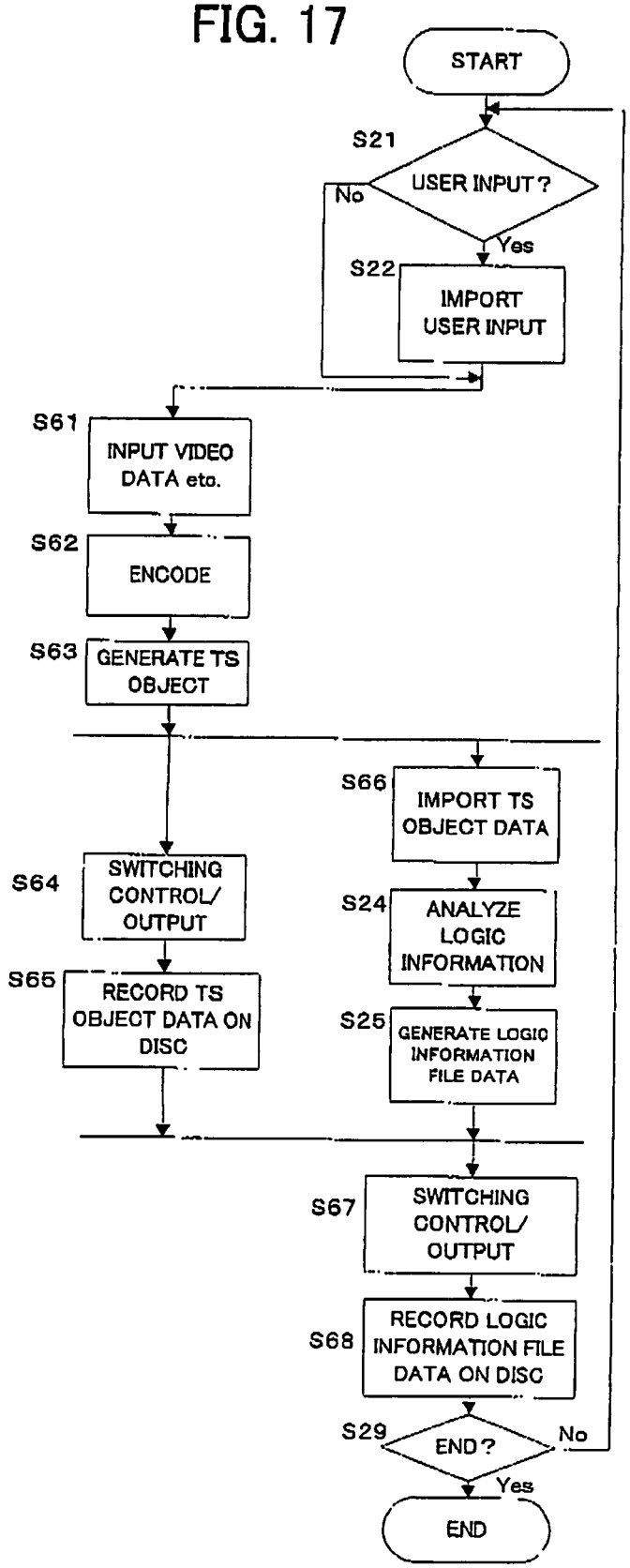
FIG. 17 is a flow chart indicating a recording operation (part 3) of the information record reproduction apparatus in the embodiment.

(i-3) The Case of Recording the Video Data, the Audio Data and the Sub-Picture Data This case is explained with reference to FIG. 14 and FIG. 17. Incidentally, in FIG. 17, the same steps as those in FIG. 15 have the same step reference numbers, and their explanation is omitted as occasion demands.

In the case of recording the video data, the audio data, and the sub-picture data, which are individually prepared in advance, the video data source 711, the audio data source 712, and the sub-picture data source 713 are individually provided with the memory storage, such as a video tape and a memory, and store a video data DV, an audio data DA, and a sub-picture data DS, respectively.

These data sources are controlled by the control signal Sc8 giving an instruction for reading out the data from the system controller 520, and they transmit the video data DV, the audio data DA, and the sub-picture data DS, to the video encoder 611, the audio encoder 612, and the sub-picture encoder 613, respectively (step S61). Then, the video encoder 611, the audio encoder 612, and the sub-picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES_PID, as described later, and the like) are transmitted as information I6 from the TS object generator 610 to the system controller 520 and are stored into the memory 530 (step S66).

On the other hand, the TS object data generated by the TS object generator 610 is transmitted to the ②  side of the switch Sw1 of the formatter 608. Namely, when formatting the TS object data from the TS object generator 610, the formatter 608 is switching-controlled by the switch control signal Sc5 from the system controller 520 to shift the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream imported as the information I6 into the memory 530, the file system/logical structure data generator 521 prepares the logical information file data D4 (step S24 and step S25). Then, after the completion of recording a series of the TS object data D2, the logical information file data D4 is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input I2 such as the title information and the like from the user interface 720 to these information stored in the memory 530, it is possible to prepare the logical information file data D4 by the file system/logical structure generator 521 and additionally record this onto the optical disc 100.

As described above, the information record reproduction apparatus 500 performs the record processing in the case of recording the video data, the audio data, and the sub-picture data, which are individually prepared in advance.

Incidentally, this record processing is applicable even when recording an arbitrary content the user has.

(i-4) The Case of Recording the Data by Authoring

Figure 18:
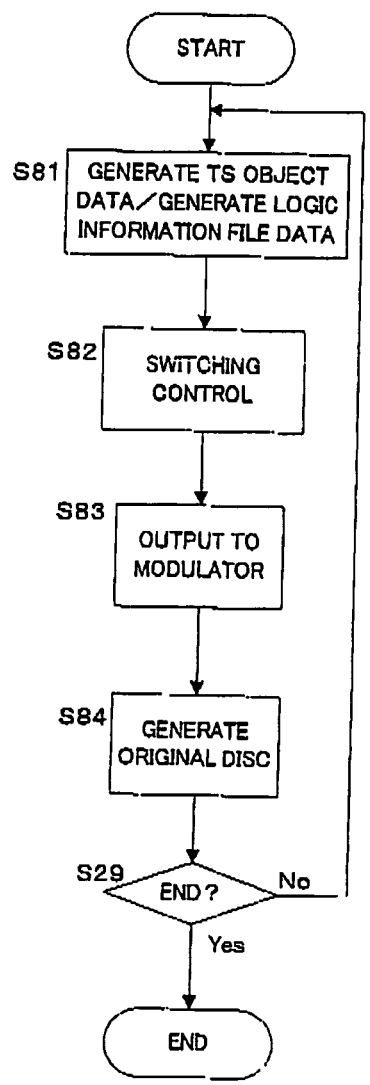
FIG. 18 is a flow chart indicating a recording operation (part 4) of the information record reproduction apparatus in the embodiment.

This case is explained with reference to FIG. 14 and FIG. 18. Incidentally, in FIG. 18, the same steps as those in FIG. 15 have the same step reference numbers, and their explanation is omitted as occasion demands.

In this case, by combining the above described three types of record processing in the three cases, an authoring system generates the TS object, the logical information file data, and the like in advance (step S81), and then completes the processing until switching-control performed at the formatter 608 (step S82). Then, the information obtained by this operation is transmitted, as the disc image data D5, to the modulator 606 equipped in front of and/or behind an original disc cutting machine (step S83), and this cutting machine prepares the original disc (step S84).

(ii) Structure and Operation in Reproduction System

Next, the specific structure and operation of each constitutional element constituting the reproduction system of the information record reproduction apparatus 500 is explained with reference to FIG. 14 and FIG. 19.

In FIG. 14, via the user interface 720, the title to be reproduced from the optical disc 100, its reproduction condition and the like are inputted to the system controller 520, as the user input I2 such as the title information and the like. In this case, under control of the control signal Sc4 from the system controller 520, the input processing suitable for the content to be reproduced, such as a selection on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, depending on whether the TS object data is included as the multiplexed information part in the demodulated data D8, or whether the still picture data is included, or whether both data are included, the shift switch Sw3 is shifted to ① side (demultiplexer 508 side) or shifted to ② side (still decoder 515 side), under control of the control signal Sc10 from the system controller 520. Thereby, the TS object data is selectively supplied to the demultiplexer 508, and the still picture data is selectively supplied to the still picture decoder 515.

Then, as for the TS object data included as the multiplexed information part in the demodulated data D8, the demultiplexer 508 demultiplexes the TS object data, under control of the control signal Sc2 from the system controller 520. Here, when the access to the reproduction position address is terminated under the reproduction control by the system controller 520, the control signal Sc2 is transmitted to start the demultiplexing.

The video packet, the audio packet and the sub-picture packet are transmitted respectively from the demultiplexer 508 and supplied respectively to the video decoder 511, the audio decoder 512 and the sub-picture decoder 513. Then, the video data DV, the audio data DA and the sub-picture data DS are decoded, respectively. In this case, the sub-picture data DS is supplied to the adder 514 via the memory 540. The sub-picture data DS is outputted from the memory 540, selectively or at a predetermined timing, under control of the control signal Sc5 from the system controller 520, so as to be super-imposed on the video data DV, if needed. That is, in comparison with a case that the sub-picture data outputted from the sub-picture decoder 513 is directly super-imposed, it is easy to control the timing of the super-imposing, or to judge the need for the super-imposing. For example, under output control of the control signal Sc5, it is possible to select whether or not a caption using the sub-picture is displayed over the main picture, or whether or not a menu screen using the sub-picture is displayed.

Incidentally, although the packets obtained by packetizing the PAT or the PMT, included in the transport stream shown in FIG. 6, are included as a part of the demodulated data D8, respectively, they are discarded or abandoned at the demultiplexer 508.

The adder 514 is controlled by a control signal Sc3 giving an instruction of the mixing from the system controller 520, and mixes or superimposes in a predetermined timing the video data DV and the sub-picture data DS, which are respectively decoded at the video decoder 511 and the sub-picture decoder 513. The result is outputted as a video output from the information record reproduction apparatus 500 to a TV monitor, for example.

On the other hand, the audio data DA decoded at the audio decoder 512 is outputted as an audio output from the information record reproduction apparatus 500 to an external speaker, for example.

In the case that the still picture data is included in the decoded data D8, the still picture data is supplied to the still picture decoder 515, via the shift switch Sw3 controlled by the control signal Sc10 from the system controller 520, instead of or in addition to such a reproduction operation or processing of the video data DV or the sub-picture data DS. Then, the still picture data such as the decoded bit map data, JPEG data and the like is added to the adder 514 via the shift switch Sw4, without subjected to any processing, under control of the control signal Sc11 from the system controller 520. Alternatively, it may be temporarily stored in the memory 550 via the shift switch Sw4. The still picture data is outputted from the memory 550, selectively or at a predetermined timing, under control of the control signal Sc12 from the system controller 520, and then supplied to the adder 514 via the shift switch Sw5. Thereby, if needed, the video data DV or the sub-picture data DS is super-imposed over the still picture data or vice versa. That is, in comparison with a case that the still picture data outputted from the still picture decoder 515 is directly super-imposed, it is easy to control the timing of the super-imposing, or to judge the need for the super-imposing. For example, under output control of the control signal Sc12, it is possible to select whether or not a still picture such as a menu screen or a window screen using the still picture data or a still picture as a background image using the still picture data is displayed on the main picture of the sub-picture.

Additionally, under control of the control signal Sc13 from the system controller 520, the still picture data may be outputted via another route (not shown), with the aid of the shift switch Sw5 shifted to ② side. Alternatively, no still picture data may be outputted from the shift switch Sw5 shifted to ② side.

Here, the specific example of a reproduction processing routine by the system controller 520 is explained with reference to a flow chart of FIG. 19.

Figure 19:
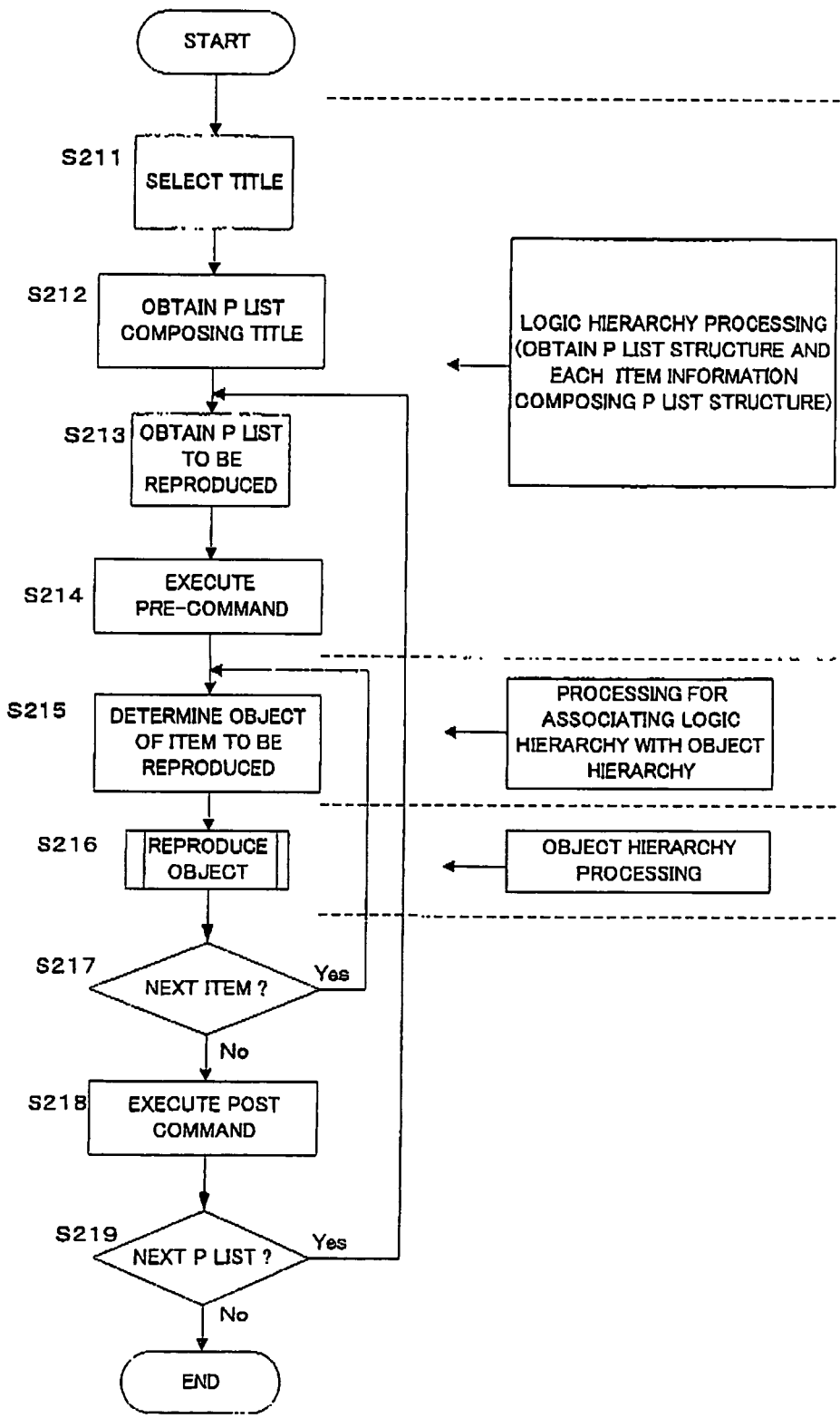
FIG. 19 is a flow chart indicating a reproduction operation of the information record reproduction apparatus in the embodiment.

In FIG. 19, it is assumed that as an initial condition, the recognition of the optical disc 100 in the reproduction system and the recognition of a volume structure and a file structure by the file system 105 (see FIG. 3) have been already completed by the system controller 520 and the file system/logical structure data reader 522 inside of the system controller 520. Here, an explanation is made on the operational flow after obtaining the total number of the total titles from the disc general information 112 in the disc information file 110 and then choosing or selecting one title from among them.

Firstly, the choice or selection of the title is performed via the user interface 720 (step S211). Responding to this, the system controller 520 obtains the information about the reproduction sequence from a reading result of the file system/logical structure data reader 522. Incidentally, in the selection of the title 200, the desired title element(s) 200-2 (see FIG. 4) may be selected from among a whole title elements 200-2 composing the title 200, with the aid of an external input operation by the user with using a remote controller and the like, or one title element 200-2 may be selected automatically depending on a system parameter or the like adjusted for the information record reproduction apparatus 500.

Then, contents of a plurality of play lists 126 composing a play list set 126S corresponding to the selected title 200 (title element 200-2) are obtained. Here, as a processing at a logic hierarchy, the information about the each play list 126 structure and each item composing each play list (see FIG. 5, FIG. 6 and FIG. 13) is obtained (step S212).

Then, contents of the play list 126 to be reproduced is obtained from among a plurality of play lists 126 obtained at step S212. For example, herein, the reproduction is started from a play list #1, and the contents of the corresponding play list 126 is obtained (step S213). The contents of the play list 126 may be one or more play list elements 126-2 (see FIG. 5), which are obtained by the obtaining processing at step S213.

Then, the pre-command 126PR (see FIG. 5) included in this play list 126 is executed (step S214). Incidentally, it is possible for the pre-command 126PR to select one from among a plurality of play lists 126, which composes the play list set 126S with a certain relationship of the plurality of play lists 126. If the play list element 126-2 composing the play list 126 does not have the pre-command 126PR, this processing is omitted.

Then, the TS object 142 (see FIG. 3 and FIG. 10) to be reproduced is determined (step S215), on the basis of the item 204 (see FIG. 5 to FIG. 7) identified by the play list 126 obtained at step S213. More specifically, on the basis of the item 204, the object information file 130 (see FIG. 3) relating to the TS object 142 as the reproduction target is obtained and a stream number, address and the like of the TS object 142 to be reproduced are identified.

Incidentally, in this embodiment, also the belowmentioned AU (Association Unit) information 132I and PU (Presentation Unit) information 302I are obtained as the information stored in the object information file 130. On the basis of these informations, the aforementioned logic hierarchy is associated with the object hierarchy (see FIG. 13).

Then, the reproduction of the TS object 142 determined at step S215 is actually started. That is, on the basis of the processing at the logic hierarchy, the processing at the object hierarchy is started (step S216).

During the reproduction of the TS object 142, it is judged whether or not the next item 204 composing the play list 126 to be reproduced exists (step S217). Then, insofar as the next item 204 exists (step S217: Yes), the process goes back to the step S215 to repeat the aforementioned determination and the reproduction of the TS object 142.

On the other hand, at the judgement at step S217, if it is judged that the next item 204 does not exist (step S217: No), the post command 126PS (see FIG. 5) corresponding to the presently executed play list 126 is executed (step S218).

Incidentally, if the play list element 126-2 composing the play list 126 does not have the post command 126PS, this processing is omitted.

Then, it is judged whether or not the next play list 126 composing the selected title 200 exists (step S219). If exists (step S219: Yes), the process goes back to the step S213 to repeat the processings following obtaining the play list 126 to be reproduced.

On the other hand, at the judgement at step S219, if it is judged that the next play list 126 does not exist (step S219: No), i.e. if the all play lists 126 to be reproduced corresponding to the title 200 selected at step S211 are completely reproduced, a series of reproduction operations or processings is terminated.

As discussed above, the information record reproduction apparatus 500 in this embodiment reproduces the optical disc 100.

Particularly in this embodiment, (i) with regard to the structure and operation of the record system mentioned above, for example in the case of a DVD-ROM application (i.e. in the case of (i-4)), the content information composing a plurality of blocks, such as a plurality of parental blocks or angle blocks is recorded as the transport streams and the like. On the other hand, for example in the case of a DVD recorder application (i.e. in the case of (i-2)), the content information composing a plurality of programs streamed into the same transfer wave or the same transfer signal is recorded as the transport stream or the like. Alternatively, a plurality of various content informations about the same title, which are prepared for each function demand such as a video reproduction function demand (video performance) or an audio reproduction function demand (audio performance) required for the information reproduction system, are recorded as the transport streams or the like, such as a pair of the high-vision compatible content information and the normal video compatible content information, a pair of the surround speaker compatible content information and the monaural compatible content information. Then, in such a recording, it is recorded logically as one title 200 from the start of the recording to the end of the recording, and a plurality of play list sets 126S each including a plurality of play lists 126 for the plurality of content information are recorded.

Particularly in this embodiment, (ii) with regard to the structure and operation of the reproduction system, in the processing of the logic hierarchy from the step S211 to the step S214 of FIG. 19 and the processing of associating the logic hierarchy with the object hierarchy at the step S215, any one of a plurality of play lists 126 included in each play list set 126S designated by the title 200 is selected, and the content information is reproduced in the reproduction sequence defined by the selected play list. For example, in the DVD recorder application or the DVD-ROM application, the desired content information can be reproduced as the title 200, by selecting the play list information, from among a plurality of play list informations included in each play list set 126S recorded as one title, which corresponds to the desired content information, such as a desired program, a desired parental block, a desired angle block, a version actually reproducible in each information reproduction system in view of the functionality, a version capable of using fully or efficiently the functionality of each information reproduction system.

(Selection of Play List)

Now, with reference to FIG. 20 to FIG. 35, an explanation is made on various specific examples of the information record reproduction apparatus 500 having the individual video reproduction function (video performance) and the individual audio reproduction function (audio performance), as an example of the information reproduction system belonging to the user, to select appropriately the play list 126 corresponding to the content information which makes the best or good use of the function, from among the play list set 126S included in the play list information file 120 reproduced by the aforementioned information record reproduction system 500. Furthermore in this embodiment, the explanation is made on both cases, that is, a case that the user or the author of the contents declares a designation to put the priority on the audio performance (hereinafter referred to as "audio priority" as appropriate), and a case that the user or the author declares a designation to put the priority on the video performance (hereinafter referred to as "video priority" as appropriate). Furthermore, although the play list 126 in the play list set 126S is selected in this embodiment, one play list 126 may be selected from a simple bundle or collection of play lists 126 (i.e. the "play list set" according to the present invention in a broad sense), as a variation, even without taking a form of the play list set 126S.

Incidentally, the present invention is not limited to such a selection. Other ways of selection may be employed to substantially obtain the same or similar advantages as or to this embodiment, insofar as the play list 126 to be reproduced actually is selected, on the reproduction of the information record reproduction apparatus 500, with taking into account at least somewhat of the "required performance information" according to the present invention or the attribute information as an example thereof recorded for each play list 126.

Figure 20:
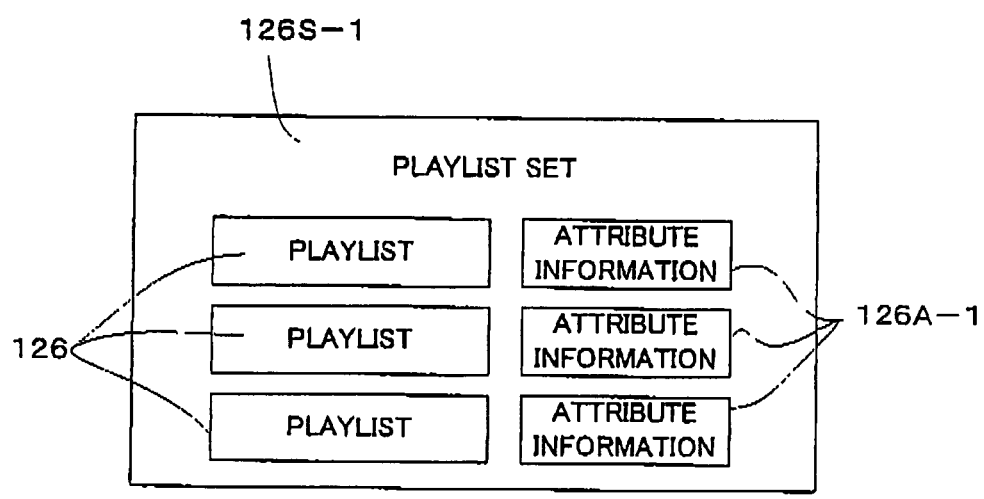
FIG. 20 is a conceptual diagram schematically illustrating a data structure in the case that the attribute information is stored in the play list set, in one example of the play list selection in the embodiment.
Figure 21:
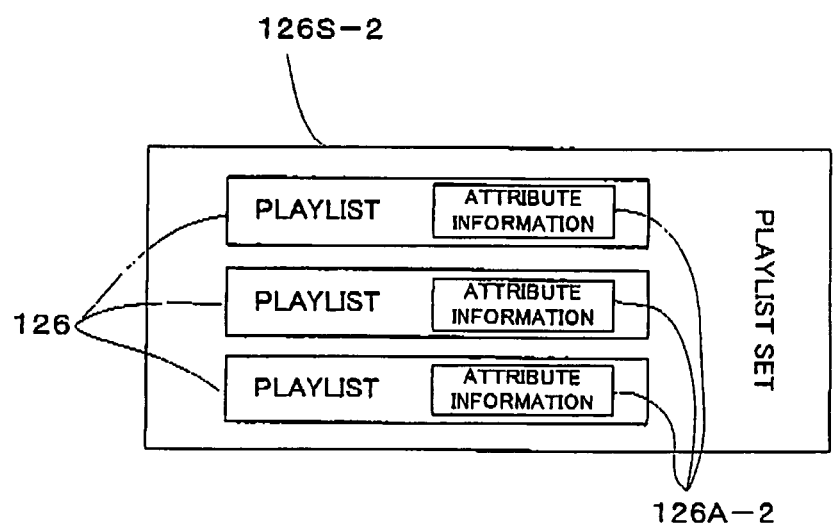
FIG. 21 is a conceptual diagram schematically illustrating a data structure in the case that the attribute information is stored in the play list set, in another example of the play list selection in the embodiment.
Figure 22:
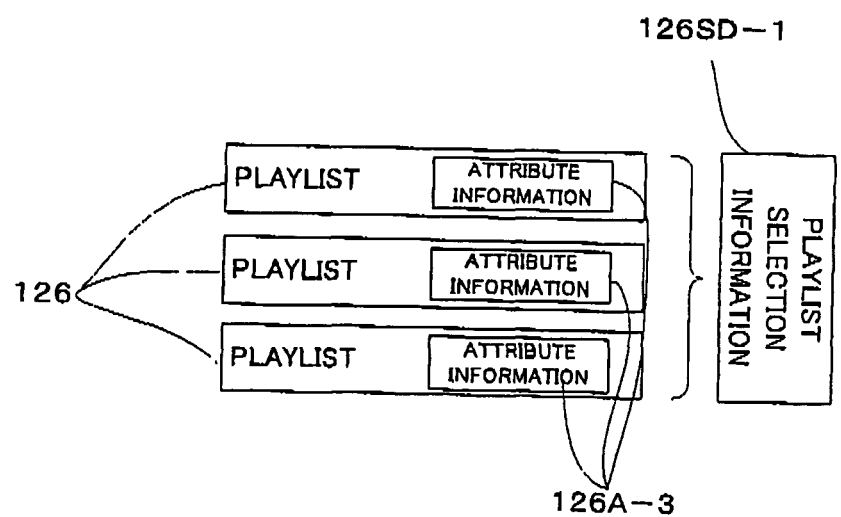
FIG. 22 is a conceptual diagram schematically illustrating a data structure in the variation of the specific example show in FIG. 21, in the case that the play list set structure is not employed, in another example of the play list selection in the embodiment.
Figure 23:
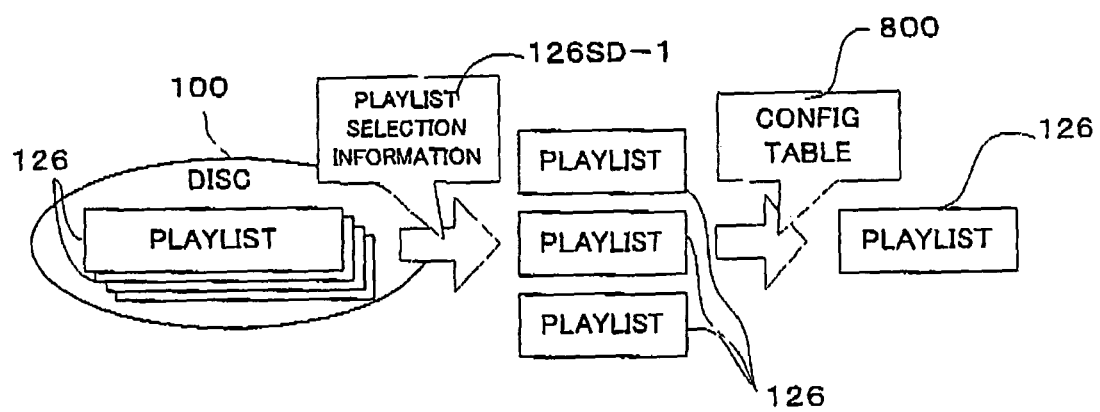
FIG. 23 is a conceptual diagram schematically illustrating a play list selection in the variation shown in FIG. 22.
Figure 24:
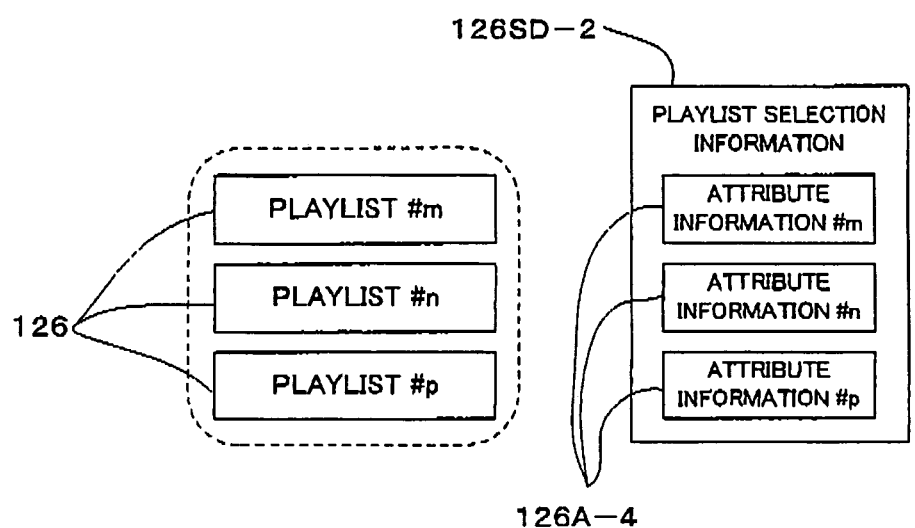
FIG. 24 is a conceptual diagram schematically illustrating a data structure in the case that the attribute information according to the embodiment is stored in the play list selection information stored in the play list or out of the play list.
Figure 25:
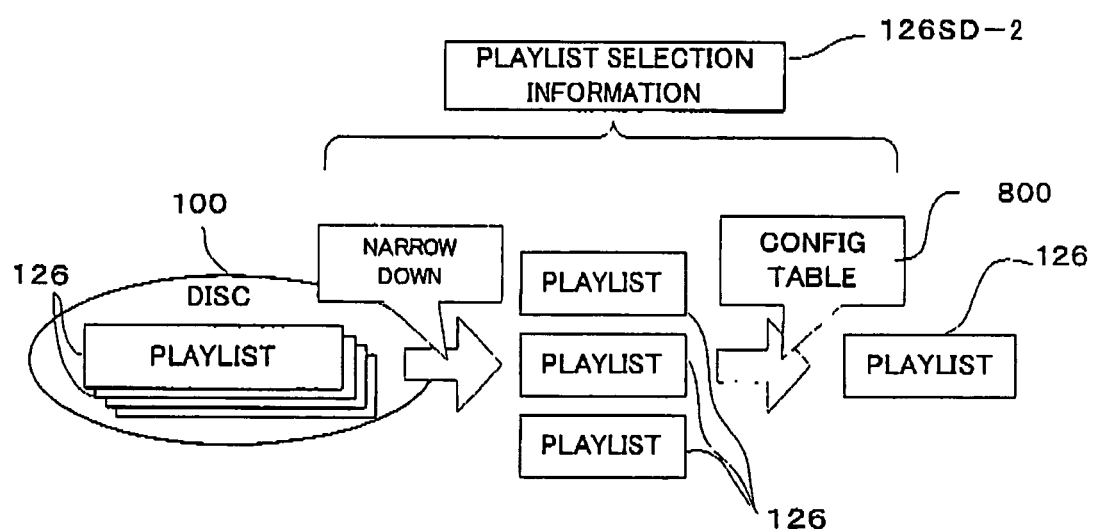
FIG. 25 is a conceptual diagram schematically illustrating a play list selection in the specific example shown in FIG. 24.

Firstly, with reference to FIG. 20 to FIG. 25, an explanation is made on various specific examples of the attribute information as an example of the "required performance information" according to the present invention, in particular focusing on the storage position thereof. FIG. 20 schematically shows a data structure in the case that the attribute information is stored in the play list set. FIG. 21 schematically shows a data structure in the case that the attribute information is stored in each play list. FIG. 22 schematically shows a data structure in a variation of the specific example of FIG. 22, in the case that the structure of the play list set 126S is not employed. FIG. 23 is a conceptual view schematically showing a selection of the play list in the variation of FIG. 22. FIG. 24 schematically shows a data structure in the case that the attribute information is stored in the play list selection information stored out of the play list or in the play list. FIG. 25 is a conceptual view schematically showing a selection of the play list in the specific example of FIG. 24.

In the specific example of FIG. 20, the attribute information 126A-1 is stored in the play list 126S, in association with each play list 126. The "attribute information" means an information to indicate the attribution of the content information relating to the play list, for example, with regard to the video performance, what extent of video resolution is achieved, what extent of view angle is achieved respectively for progressive/interleave, what extent of the refresh rate is achieved, what codec is employed, or whether it is compatible with the hi-vision or normal vision. On the other hand, with regard to the audio performance, it means an information to indicate the attribute of the content information relating to the play list indicating what the channel assignment is employed, what codec is employed, what the sampling frequency is employed, what sample bit is employed, or whether it is compatible with surround speakers or stereo or monaural. These attribute informations mean the reproduction performance required for the information record reproduction apparatus 500 to reproduce the corresponding content information. In this case, the attribution information is contemplated as an example of the required performance information.

In the specific example of FIG. 21, the attribute information 126A-2 is stored in each play list 126 stored in the play list set 126S. The contents of the "attribute information" are the same as in the case of the specific example of FIG. 20.

The selecting operation or performance of play list employing the specific examples shown in FIG. 20 and FIG. 21 is discussed later with reference to a flow chart.

In the variation of FIG. 22, there is no structure of the play list set 126S, but there is a bundle or collection of a plurality of play lists 126 including the attribution information 126A-3. That is, the plurality of play lists 126 does not take the structure of the play list set 126S shown in FIG. 3, but forms a play list set (i.e. a bundle or collection of a plurality of play lists) according to the present invention in a broad sense. One play list selection information 126SD-1 is prepared in association with the plurality of play lists 126. Such play list selection information 126SD-1 may be stored in the title 200 or the title element 200-2, or may be stored in other fields or tables insofar as it can be associated with the play list 126.

The selecting operation or performance in the variation of FIG. 22 may be performed as shown in FIG. 23.

That is, as shown in FIG. 23, a plurality of play lists 126 recorded on the optical disc 100 is firstly narrowed down, in accordance with a selection condition defined by the play list selection information 126SD-1, by comparing the attribution of each play list 126 with the reproduction performance of the information reproduction system. Furthermore, in accordance with the configuration table 800 constructed, as discussed later, in the information record reproduction apparatus 500, the play list 126 is selected, which corresponds to the content information capable of using fully or efficiently the reproduction performance of the information record reproduction apparatus 500.

In the variation of FIG. 24, there is no structure of the play list set 126S as in the case of FIG. 22, and the play list selection information 126SD-2 stores a plurality of attribute information 126A-4 for each play list. Such play list selection information 126SD-2 may be stored in the title 200 or the title element 200-2, or may be stored in other fields or tables insofar as it can be associated with the play list 126.

The selecting operation or performance of the play list 126 in the variation of FIG. 24 may be performed as shown in FIG. 25.

That is, as shown in FIG. 25, a plurality of play lists 126 recorded on the optical disc 100 are narrowed down, in accordance with the selection condition defined by the attribute information defined by the play list selection information 126SD-2, by comparing the attribution of each play list 126 with the reproduction performance of the information reproduction system. Furthermore, in accordance with the configuration table 800 mentioned later in addition to the play list selection information 126SD-2, the play list 126 is selected, which corresponds to the content information capable of using fully or efficiently the reproduction performance of the information record reproduction apparatus 500. Particularly in this case, since the attribution information 126A-4 of the play list is stored in each play list selection information 126SD-2, a group of the candidate play lists 126 is judged as for only a part to be a candidate on the basis of the selection information from among a group of all play lists 126.

Incidentally, in this variation, on the basis of the play list selection information 126SD-2, both a primary narrow down of the play lists 126 and a secondary selection of the play list 126 with the processing of the attribute information 126A-4 are performed. Also in this case, the structure of the play list set 126S is not essential.

As discussed above, in this embodiment, since the attribute information 126A1-126A4 are stored corresponding to the play list 126, it is possible to select the play list 126 corresponding to the content information reproducible by the information record reproduction apparatus 500, in view of the video performance or the audio performance, from among a plurality of play lists 126.

Figure 26:
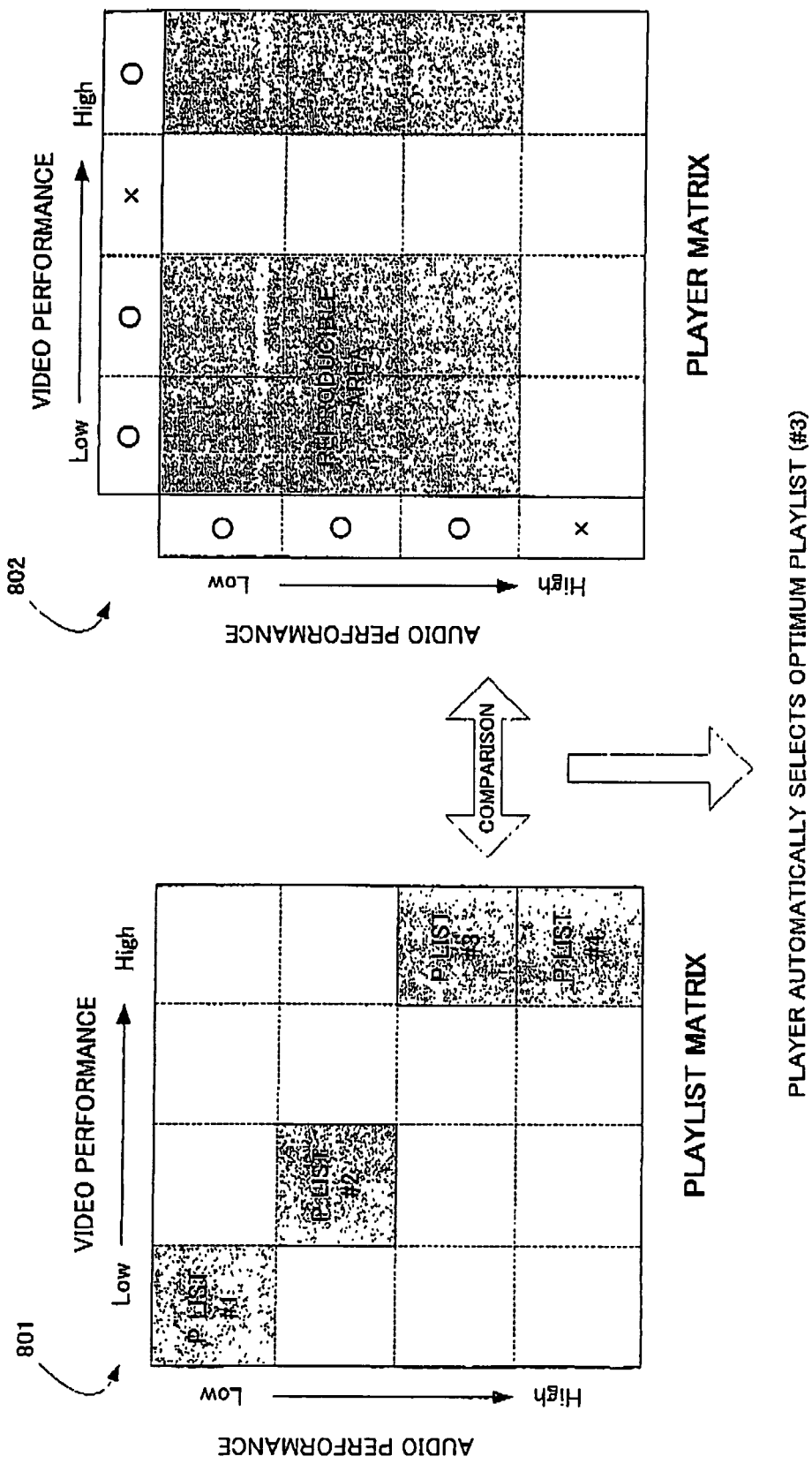
FIG. 26 is a conceptual diagram schematically illustrating a fundamental theory of selecting the optimum content information for the information reproduction system in the embodiment.
Figure 27:
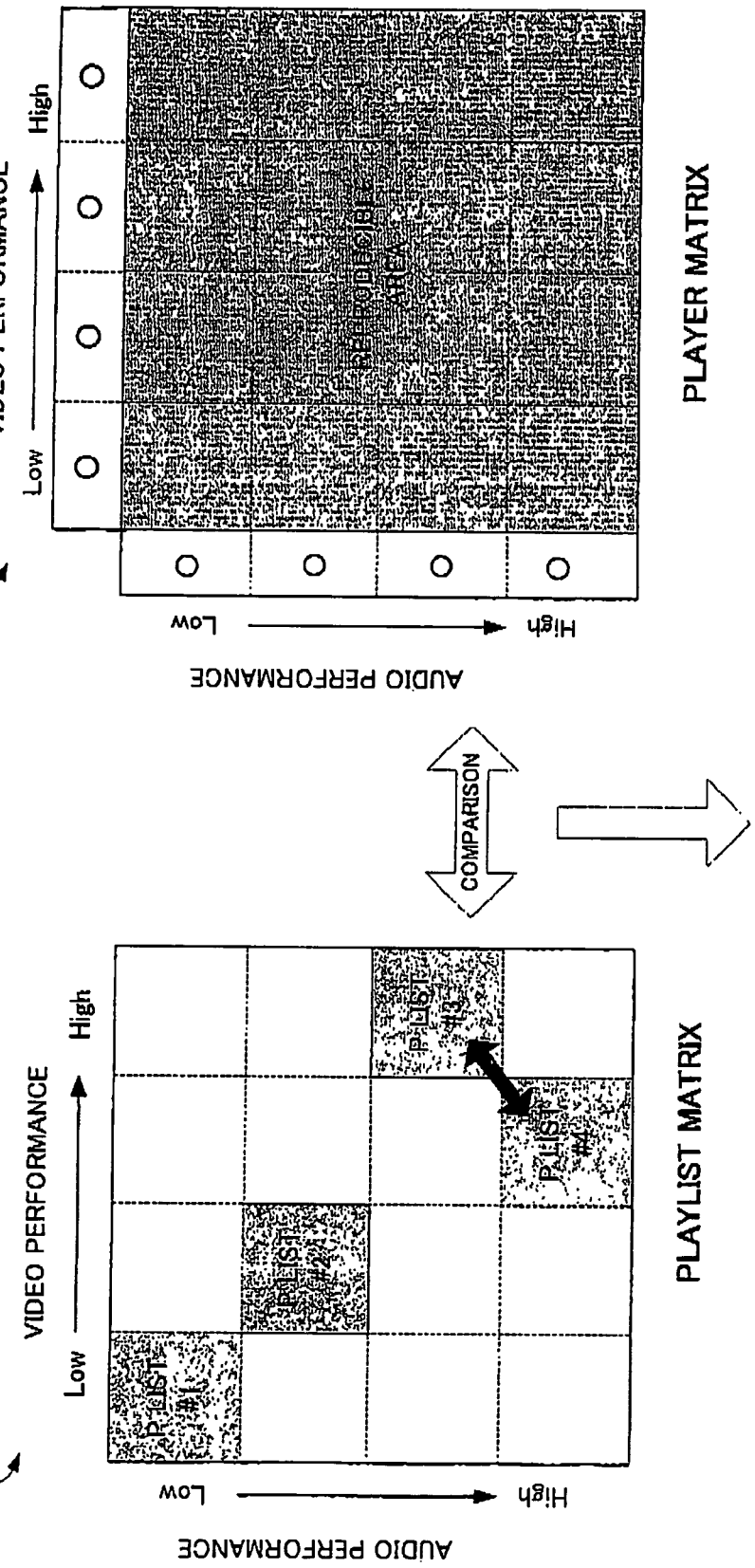
FIG. 27 is a conceptual diagram indicating a problem that may be occurred in the fundamental selection shown in FIG. 26.

Now an explanation is made on a fundamental processing of reproducing the optimum content information in accordance with the video performance and the audio performance of the information reproduction system (e.g. the aforementioned information record reproduction apparatus 500), with reference to FIG. 26 and FIG. 27. FIG. 26 is a conceptual view schematically showing a fundamental theory about a selection of the optimum content information for the information reproduction system. FIG. 27 is a conceptual view showing a problem which may be occurred in such a fundamental selection.

As shown in FIG. 26, a play list matrix 801 is assumed which is logically configured in which columns from left to right are representative of predetermined ranks from low performance to high performance with regard to the video performance required by each content information whose reproduction sequence is designated by a plurality of play lists in the play list set, and rows from top to bottom are representative of predetermined ranks from low performance to high performance with regard to the audio performance required by each content information. On the other hand, a player matrix 802 is assumed which is logically configured in which columns from left to right are representative of predetermined ranks from low performance to high performance with regard to the video performance of each information reproduction system, and rows from top to bottom are representative of predetermined ranks from low performance to high performance with regard to the audio performance of each information reproduction system.

In this case, a play list number #1, #2, . . . , designating the content information requiring the video performance and the audio performance defined by each cell for the reproduction is assigned to each cell of the play list matrix 801. On the other hand, in the player matrix 802, cells corresponding to the video performance and the audio performance of the information reproduction system is assumed as a "reproducible range (gray zone in the figure)". On the contrary, cells corresponding to the video performance or the audio performance that the information reproduction system does not have is assumed as "not reproducible".

Therefore, by comparing with each other these logically configured two matrixes, i.e., the play list matrix 801 and the player matrix 802, one play list (play list #3 in this example), which positions toward the highest function side (i.e. lower right side) of each matrix, is selected as a play list to designate the content information capable of using fully the function of the information reproduction system.

As shown in FIG. 27, however, in the case that a comparison is made between the play list matrix 801 and the player matrix 802, it may not be judged which cell positions at the highest function side. That is, in the case that there are (i) a play list (play list #4 in this example) assigned with a cell positioned at highest function side with regard to the audio performance but at slightly lower function side with regard to the video performance, and (ii) a play list (play list #3 in this example) assigned with a cell positioned at a slightly lower function side with regard to the audio performance but at the highest function side with regard to the video performance, reproducing either of them results in bringing both merits and demerits, and thereby any of them cannot be simply selected as the optimum play list.

Figure 28:
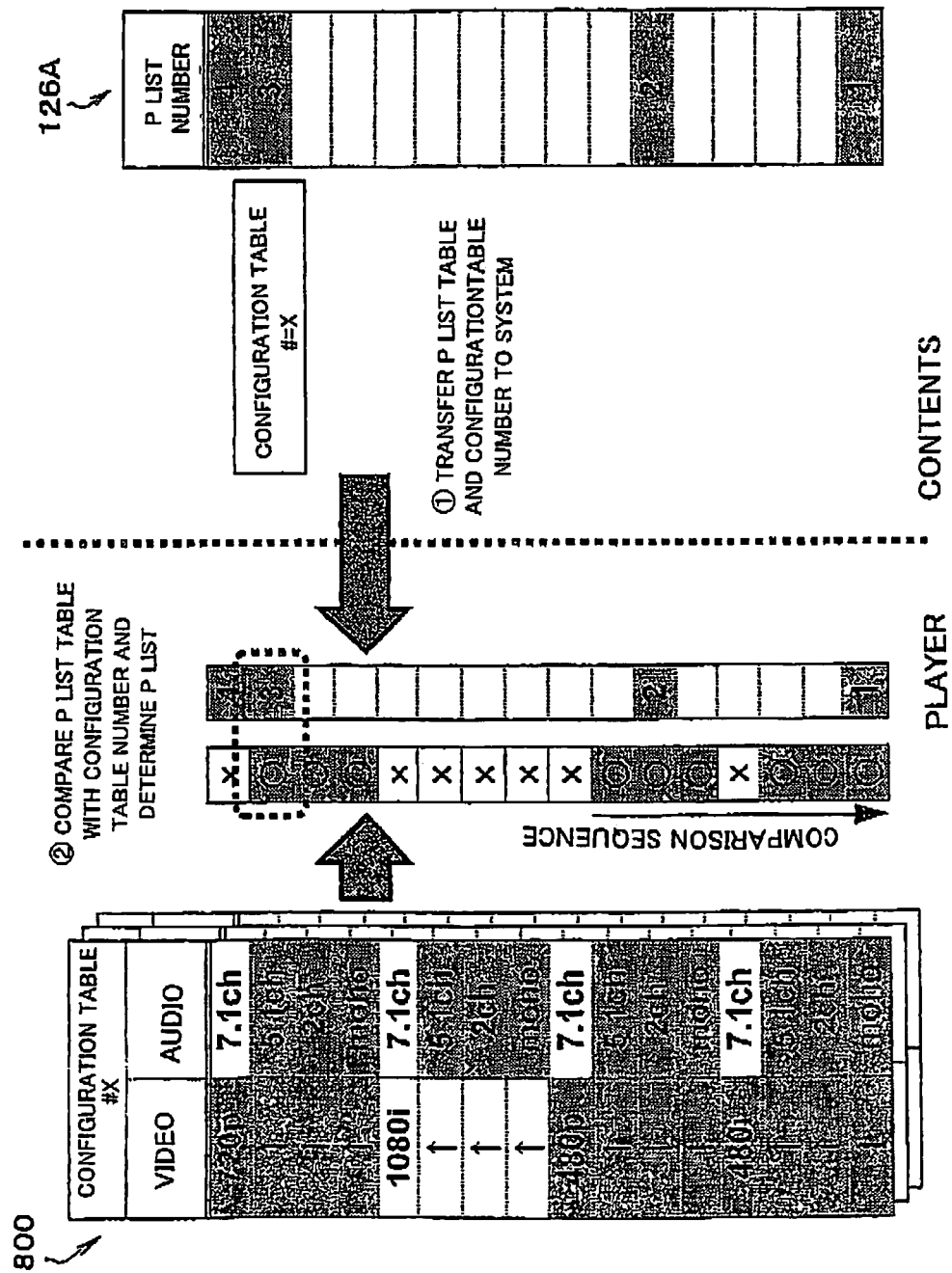
FIG. 28 is a conceptual diagram schematically illustrating a processing of selecting the play list from the configuration table and the attribute information in the embodiment.
Figure 29:
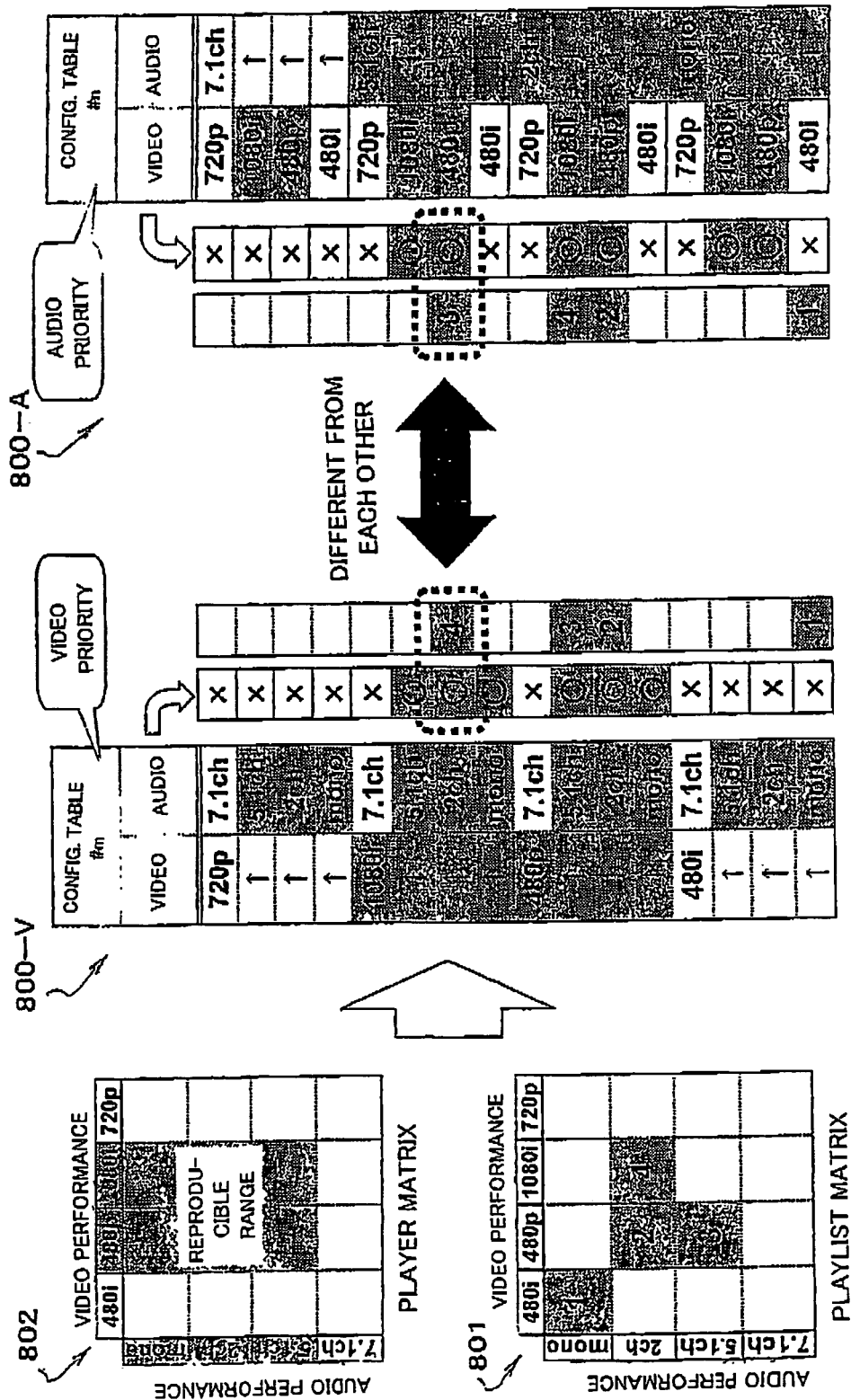
FIG. 29 is a conceptual diagram schematically illustrating a case that different play lists are selected depending on whether the play list selection in the embodiment is the video priority or the audio priority.
Figure 30:
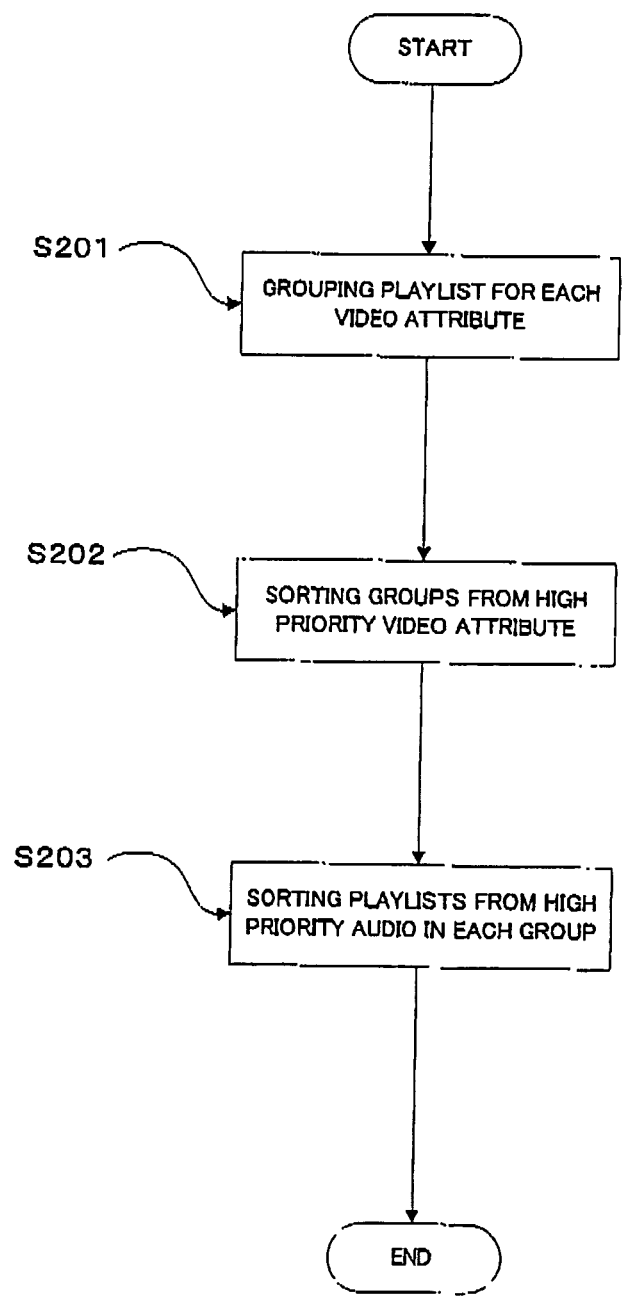
FIG. 30 is a flow chart showing an operational flow of the selection in the video priority, in the play list selection of the embodiment.
Figure 31:
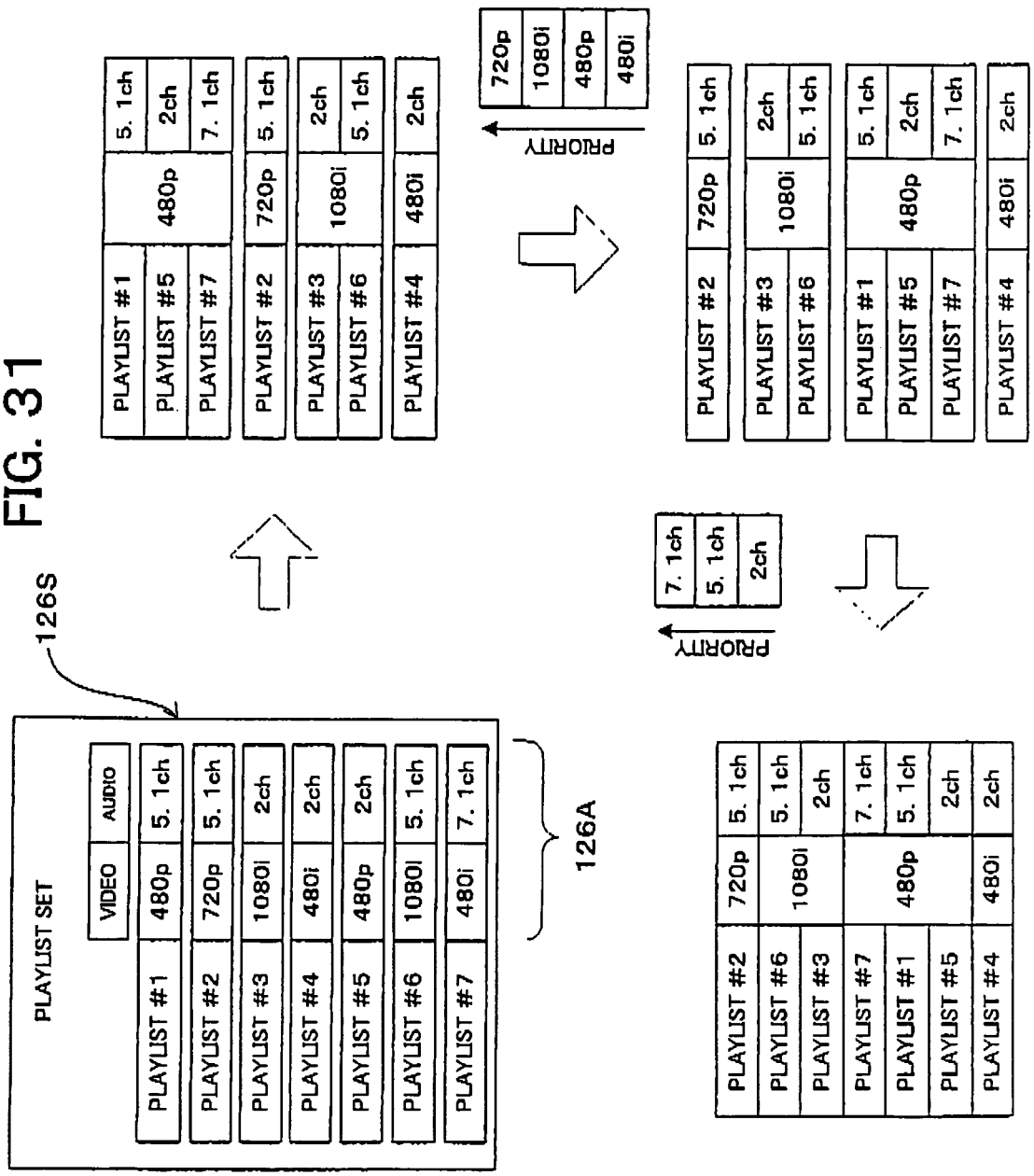
FIG. 31 is a conceptual diagram schematically illustrating an operational flow of the selection in the video priority, in the play list selection of the embodiment.
Figure 32:
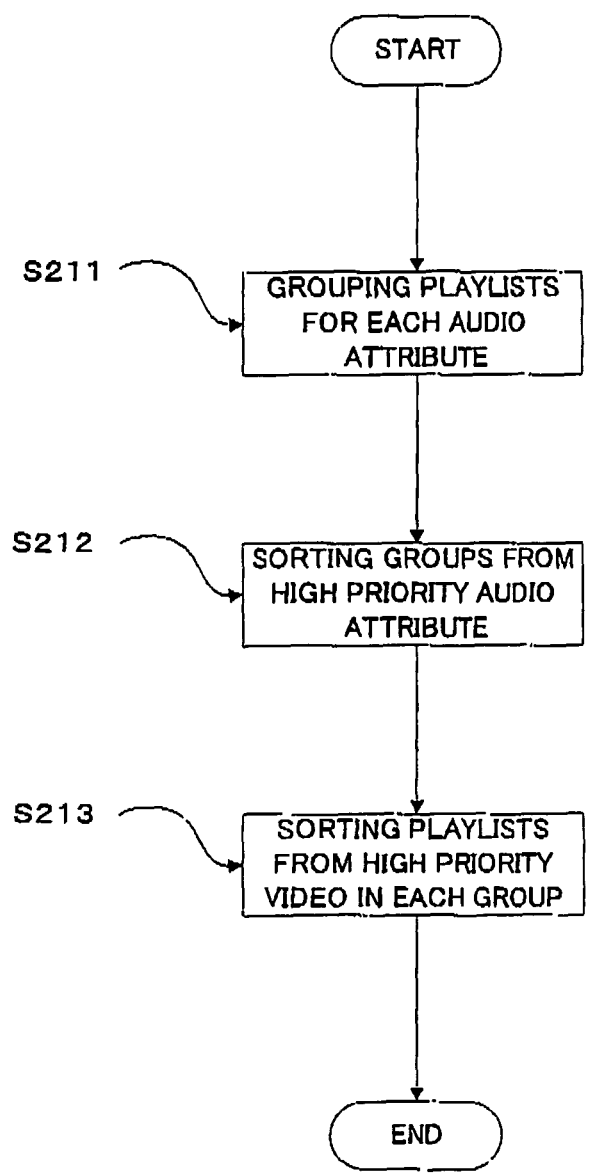
FIG. 32 is a flow chart showing an operational flow of the selection in the audio priority, in the play list selection of the embodiment.
Figure 33:
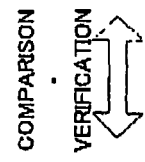
FIG. 33 is a conceptual diagram schematically illustrating a case that different configuration tables are generated depending on whether the play list selection in the embodiment is the video priority or the audio priority.

Now, an explanation is made on the selection of the play list according to the play list addressable to such a problem, with reference to FIG. 28 to FIG. 33. FIG. 28 schematically shows a processing of selecting the play list, on the basis of the configuration table and the attribute information in this embodiment. FIG. 29 schematically shows a selection of the play list differently for the video priority and for the audio priority. FIG. 30 is a flow chart showing an operational flow of the selection in the video priority. FIG. 31 is a conceptual view schematically showing it. FIG. 32 is a flow chart showing an operational flow of the selection in the audio priority. FIG. 33 schematically shows a generation of the configuration table differently for the video priority and for the audio priority.

That is, particularly in the embodiment, as shown in FIG. 28, the play list table (see the right side of FIG. 28) in which the attribute information 126A (126A-1, 126A-2, 126A-3 or 126A-4) is arranged for each play list (i.e. for each play list #) discussed with reference to FIG. 20 to FIG. 25 is used. Furthermore, the configuration table 800 (see the left side of FIG. 28) is generated prior to the selection at the information reproduction system side. Furthermore, a plurality of such configuration tables 800 are prepared, depending on which reproduction performance the priority is given to, for example, depending on whether the priority is given to the video performance, or whether the priority is given to the audio performance. Then, the optimum play list is selected by making a comparison between the attribute information 126A in the play list table and any of the plurality of configuration tables 800. In this selection, different from the case discussed relating to FIG. 26 and FIG. 27, the comparison can be made in one dimensional manner. For this, a play list conflict (see FIG. 27) does not occur, and thereby one play list (e.g., the play list #3 encapsulated by a broken frame in this example) can be selected.

Furthermore in this case, as shown in FIG. 29, the audio priority configuration table 800-A (configuration table #n in the right side) and the video priority configuration table 800-V (configuration table #m in the left side) may be generated by weighting the content information depending on its type, such as the video information or the audio information, in the information reproduction system. In this case, it is possible to select different play lists depending on whether the authors intention is the audio priority or the video priority, even in the case that the same play list set is reproduced by the same information reproduction system. In this example, if it is the audio priority, the play list #3 having the relatively high audio performance is selected. On the other hand, if it is the video priority, the play list #4 having the relatively high video performance is selected.

Incidentally, in the embodiment, in the case that the play list is selected automatically depending on the attribute information in the play list set, each reproduction attribution of video/audio is preferably unified in the play list. Thereby, the appropriate selection is achieved.

Now, an explanation is made on the selection of the play list in the video priority, with reference to FIG. 30 and FIG. 31.

In FIG. 30 and FIG. 31, if it is the video priority, a plurality of play lists are firstly grouped for each attribute (i.e. video attribute) of the video information (step S201 in FIG. 30). Thereby, a plurality of play lists 126 in the play list set 126S are re-arranged as shown from the upper left to the upper right of FIG. 31.

Then, the groups are re-arranged depending on their video attribute from the higher priority video information (step S202 in FIG. 30), which is typically from the higher performance to the lower performance about the video performance. Thereby, a plurality of play lists in the play list set are re-arranged as shown from the upper right part to the lower right part of FIG. 31. In this example, they are re-arranged depending on the video resolution in the order from 720p, 1080i, 480p and 480i.

Then, the play lists are re-arranged depending on their audio attribute from the higher priority audio information (step S203), which is typically from the higher performance to the lower performance about the audio performance. Thereby, a plurality of play lists in the play list set are re-arranged as shown from the lower right part to the lower left part of FIG. 31. In this example, they are re-arranged depending on their audio channel number in the order from 7.1ch, 5.1ch, 1ch and 2ch.

Thus, the generation of the configuration table 800-V (see FIG. 29) in the case of the video priority is terminated.

On the other hand, an explanation is made on a selection of the play list in the audio priority, with reference to FIG. 32.

In FIG. 32, a plurality of play lists are firstly grouped depending on their audio attributes about the audio information (step S211). Then, the groups are re-arranged depending on their attributes from the higher priority audio information (step S212), which is typically from the higher performance to the lower performance about the audio performance. Then, in each group, the play lists are re-arranged depending on their attributes from the higher priority audio information (step S213), which is typically from the higher performance to the lower performance about the video performance.

Thus, the generation of the configuration table 800-A (see FIG. 29) in the case of the audio priority is terminated.

Therefore, as shown in FIG. 33, it is possible, for example, to select the play list of the video priority (play list #3 in this example) uniquely and appropriately, for the configuration table 800-V (the lower left part of FIG. 33) of the video priority, which is a one-dimensional arrangement generated as shown in FIG. 30 and FIG. 31. On the contrary, even in the case that the same content information is reproduced in the same information reproduction system, it is possible to select the play list of the audio priority (play list #1 in this example) uniquely and appropriately, in accordance with the configuration table 800-A (the lower right part of FIG. 33) of the audio priority, which is a one-dimensional arrangement generated as shown in FIG. 32.

Incidentally, it is preferable to record a parameter, so-called a "presentation type", in the play list set, to identify whether it is the video priority or the audio priority, to which the priority is given upon generating the configuration table 800, or to which the priority is given upon reproducing the content information. For example, the parameter of such a "presentation type" may be any of various parameters, such as a "video type" to put the priority on the screen resolution, an "audio type" to put the priority on the channel number, a "still picture type" to put the priority on the progressive, and a "movie native type" to put the priority on the refresh rate 24 Hz. A plurality of configuration tables 800 different from each other are generated corresponding to each parameter, at least as many as a variety of parameters different from each other. Furthermore, in the case that a plurality of video streams are combined and reproduced at the same time, a further plurality of configuration tables 800 are to be generated for each combination of these parameters.

Figure 34:
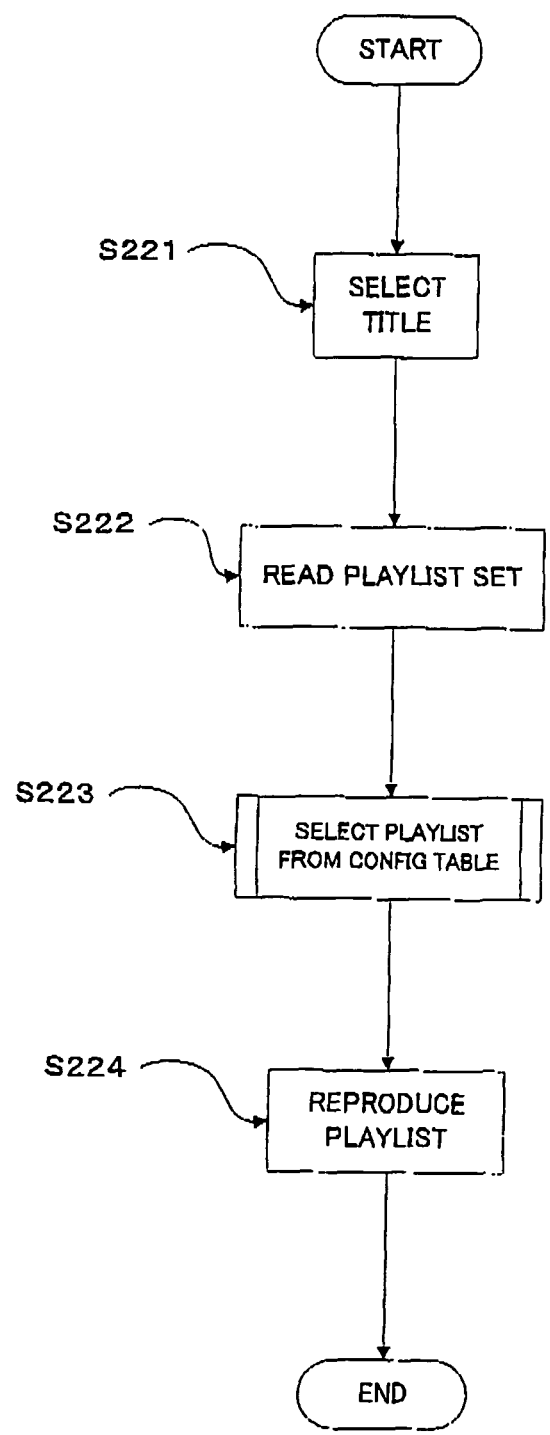
FIG. 34 is a flow chart showing the reproduction processing relating to one play list set in the embodiment.
Figure 35:
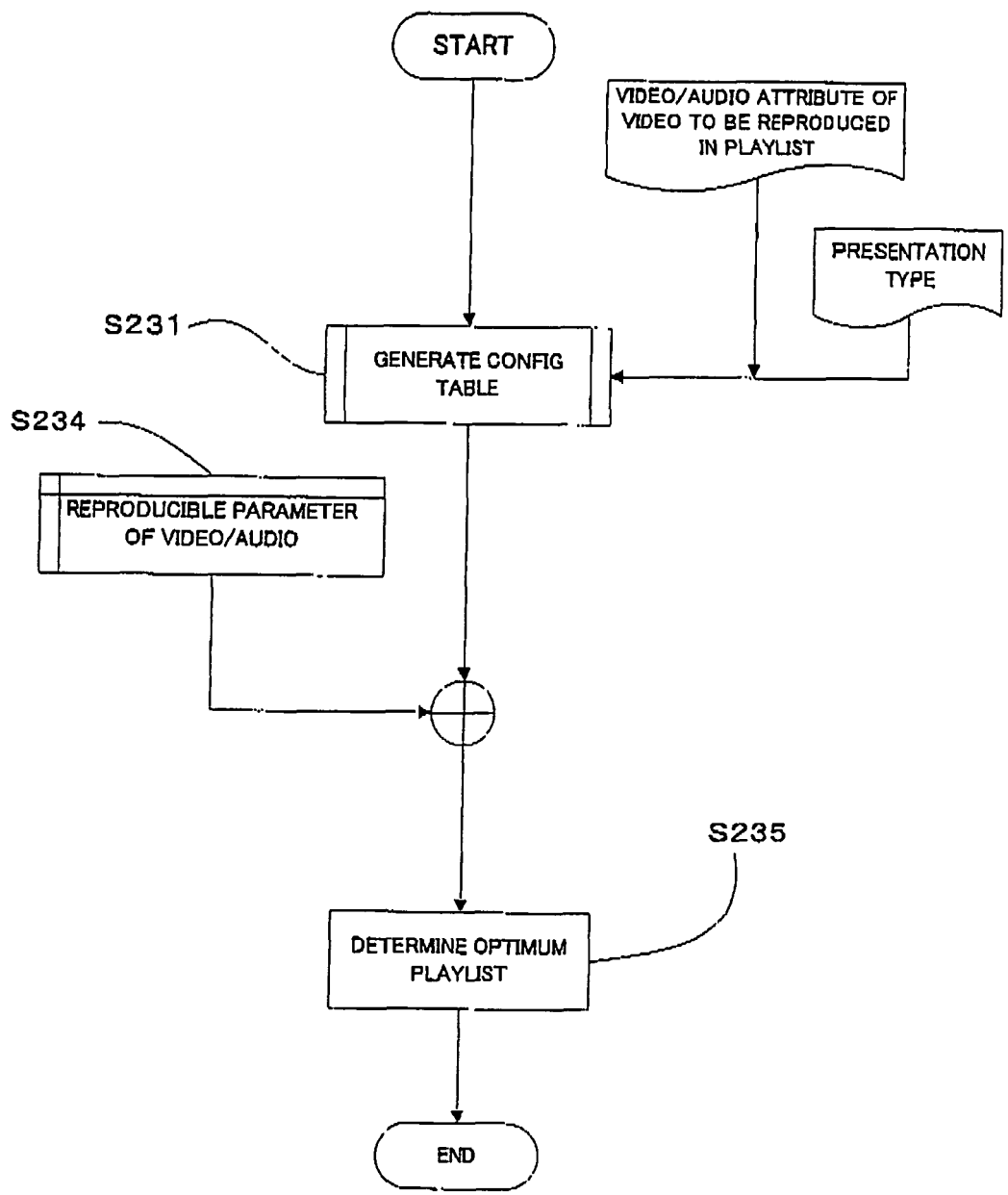
FIG. 35 is a flow chart relating to a generation of the configuration table in the embodiment.

Now, an explanation is made on a reproduction of one play list set, as a part of the title reproduction, including the selection of the play list with the aid of the configuration table 800 as mentioned above, with reference to FIG. 34 and FIG. 35. FIG. 34 is a flow chart showing a reproduction of said one play list. FIG. 35 is a flow chart relating to a generation of the configuration table in the flow chart of FIG. 34.

As shown in FIG. 34, a title is firstly selected (step S221), and the play list set corresponding to the selected title is read (step S222). Then, the configuration table 800 is generated, and thereby one play list is selected from the play list set (step S223).

That is, as shown in FIG. 35, in the processing at step S223, more specifically, the generation of the configuration table 800 as shown in FIG. 28 to FIG. 33 is performed (step S231), on the basis of the attribute information (see FIG. 2 to FIG. 25) of each play list stored in the play list set or the like and the "presentation type" which is a parameter stored in the play list set or the like as mentioned above, such as the video type or the audio type. In this case, for example, the generation of the configuration table 800-V of the video priority or the configuration table 800-A of the audio priority is performed. On the other hand, a reproducible parameter is read, which is an example of the "set function information" in the information reproduction system. Then, a comparison or verification between the reproducible parameter and the configuration table 800 is performed, so that the play list capable of using efficiently the function of the information reproduction system and the most matched to the intention of the contents author, i.e. the optimum play list, is selected (step S235).

Then, again in FIG. 34, the reproduction using the play list selected as such is performed, and a series of reproduction processings is terminated.

Incidentally, particularly in this embodiment, the reproducible parameter as an example of the "set function information" according to the present invention is set as a system parameter, in the built-in memory in the system controller 520, or in the memory 530 connected to the system controller 520, for the information record reproduction apparatus 500 already discussed with reference to FIG. 14, which is an example of the information reproduction system. Such a reproducible parameter may be set automatically by the system controller 520 through a plug-in processing, or may be set by default from the start of the system construction. Alternatively, the user who is familiar to the actual system may set the reproducible parameter through the control panel or the remote controller.

Thus, in this embodiment, one play list is selected from a plurality of play lists, while taking into account the video performance or the audio performance in the information reproduction system such as the information record reproduction apparatus 500, and taking into account the video performance or the audio performance required by the selectable content information. As a result, the content information reproducible in the information reproduction system is appropriately reproduced. For example, even in the case that the same title recorded in the optical disc 100 is reproduced, if it is reproduced by the information reproduction system including a high vision television, it is possible to select automatically the play list information to define the reproduction sequence of the content information compatible with the high vision, from the play list set. Thereby, the content information compatible with the high vision is reproduced automatically. On the other hand, if it is reproduced by the information reproduction system including no high vision television, the play list information to define the reproduction sequence of the content information compatible with the normal different from the high vision may be selected automatically from the play list set. Thereby, the content information compatible with the normal is reproduced automatically. Furthermore, if the information to indicate whether it is the video priority or the audio priority is recorded as the "presentation type" onto the optical disc 100, the reproduction processing can be achieved in accordance with the intention of the contents author.

As discussed in detail with reference to FIG. 20 to FIG. 35, in this embodiment, the information matched to the reproduction performance of the information reproduction system of the user can be reproduced, from among the content information such as the video information, the audio information recorded onto the optical disc 100.

(Access Flow on Reproduction)

Figure 36:
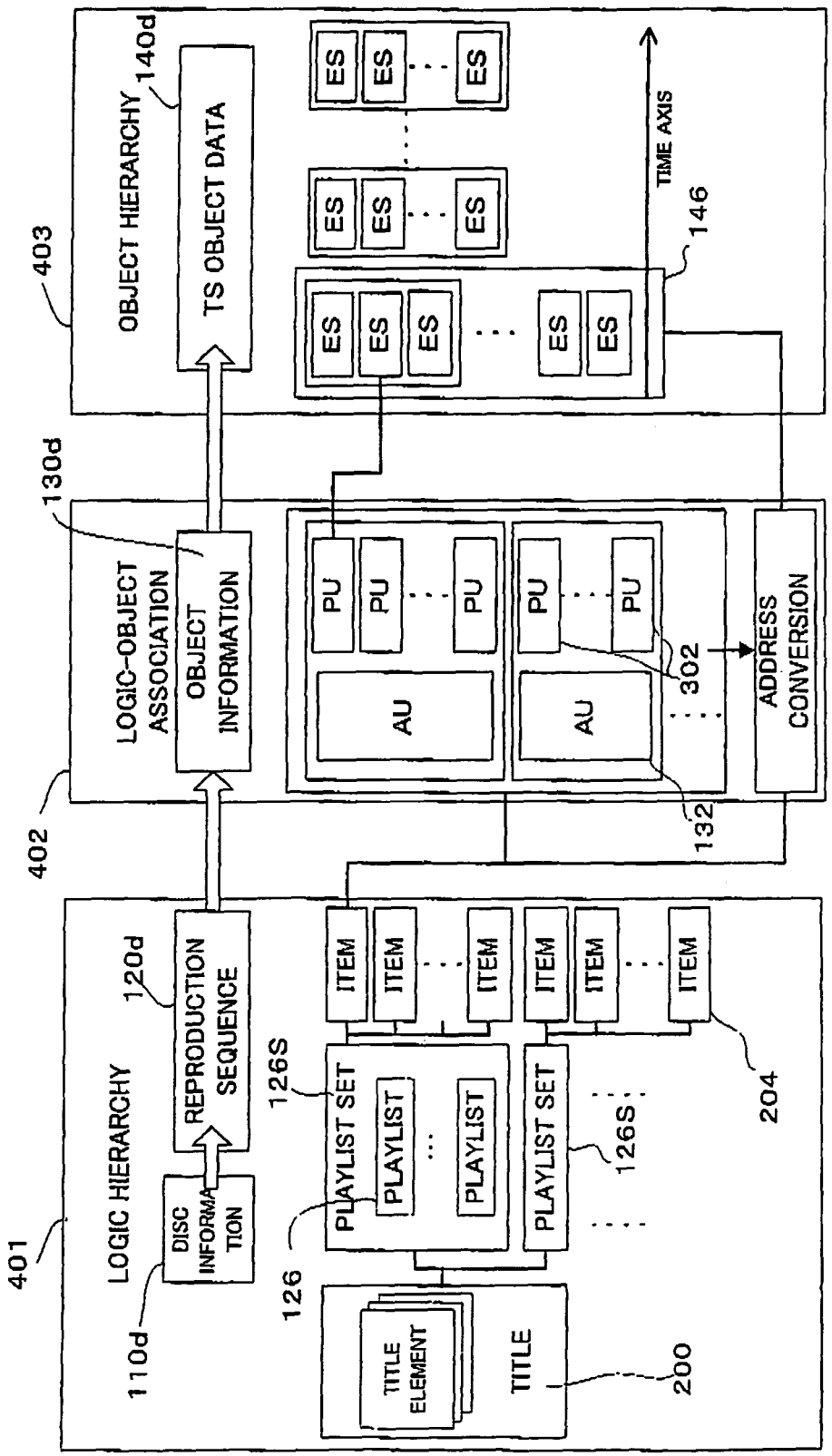
FIG. 36 is a view conceptually illustrating a general flow of an access during a reproduction in the embodiment, showing in association with a logic structure of an optical disc.

Next, with reference to FIG. 36, the access flow on reproduction by the information record reproduction apparatus 500, employing the AU information 132 and the PU information 302, is explained as one of the features of this embodiment, with the logical structure of the optical disc 100. FIG. 36 schematically illustrates an entire access flow on reproduction, in relation to the logical structure of the optical disc 100.

In FIG. 36, the logical structure of the optical disc 100 is categorized roughly into the following three hierarchies: a logic hierarchy 401; an object hierarchy 403; and a logic-object association hierarchy 402 mutually associating those two hierarchies.

Among them, the logic hierarchy 401 is a hierarchy for logically specifying various logical information to reproduce the desired title during the reproduction, as well as the play list (P list) to be reproduced and its constitutional contents. In the logic hierarchy 401, disc information 110*d* indicating the entire titles 200 and the like on the optical disc 100 is written within the disc information file 110 (see FIG. 3), and further, reproduction sequence information 120*d* of the entire contents on the optical disc 100 is written within the play list information file 120 (see FIG. 3). More specifically, the construction of one or more play list sets 126S is written, as the reproduction sequence information 120*d*, respectively for one or more title elements 200-2 included in each title 200. Furthermore, each play list set 126S includes one or more play lists 126, in each of which the construction of one or more items 204 (see FIG. 13) is written. Then, at the time of the access during the reproduction, the logic hierarchy 401 as described above specifies the title 200 to be reproduced, the play list 126 corresponding to this, and further the item 204 corresponding to this.

Next, the logic-object association hierarchy 402 is a hierarchy for specifying the attribute and the physical storage address of the TS object data 140*d* to be reproduced, so as to specify the combination and/or the construction of the TS object data 140*d* as the entity data and perform an address conversion to the object hierarchy 403 from the logic hierarchy 401, on the basis of the information specified in the logic hierarchy 401 as described above. More specifically, in the logic-object association hierarchy 402, the object information data 130*d*, which separates a group of the contents composing each item 204 into units of the AU 132 and which finely separates each AU 132 into units of the PU 302, is written in the object information file 130 (see FIG. 3).

Here, the "PU (Presentation Unit) 302" is a unit associating and uniting a plurality of elementary streams by the reproduction switchable unit. If there are three audio streams in the PU 302, the user can freely switch these three audio (e.g. audio for each language), during the reproduction of this vision.

On the other hand, the "AU (Associate Unit) 132" is a unit uniting a plurality of elementary streams such as video streams in the TS object used in one title, and made of one or more PUs 302. More specifically, it is a unit uniting the elementary stream packet IDs (ES_PID) for each TS object, indirectly via the PU 302. This AU 132 corresponds to an assembly made of a plurality of programs having a specific inter-relationship in view of the contents, such as a plurality of programs switchable to each other in the multi-source broadcasting. The PUs 302 belonged to the same AU 132 corresponds to one or more elementary stream assemblies each constructing a plurality of programs switchable to each other by the user operation during the reproduction.

Therefore, if the AU 132 to be reproduced is identified, and the PUs belonged to the AU are identified, the elementary stream to be reproduced is identified. That is, a desired elementary stream can be reproduced from the multi-recorded optical disc 100, without using the PAT or the PMT shown in FIG. 12.

Incidentally, a further specific data structure of the AU information 132I and the PU information 302I, each defining the AU 132 and the PU 302, is discussed later in detail.

The elementary stream to be actually reproduced herein is identified or designated by the ES_PID that is a packet ID (see FIG. 12) of the elementary stream, on the basis of the PU information 302. At the same time, the information indicating the start time point and the end time point of the reproduction is converted to the elementary stream address information, and thereby the contents in a specific area (or a specific time range) of a specific elementary stream is reproduced.

Thus, in the logic-object association hierarchy 402, an address conversion is performed from a logical address relating to each item 204 to a physical address relating to each PU 302.

Next, the object hierarchy 403 is a physical hierarchy to reproduce the actual TS object data 140d. In the object hierarchy 403, the TS object data 140d is written within the object data file 140 (see FIG. 3). More specifically, TS packets 146 constructing a plurality of elementary streams (ES) are multiplexed at every time point. The multiplexed packets are disposed on the time scale to form a plurality of elementary streams (see FIG. 11). Then, a plurality of TS packets multiplexed at each time point is associated with a PU 302 identified by the logic-object association hierarchy 402, for each elementary stream. Incidentally, it is possible to associate a plurality of PUs 302 with one elementary stream (e.g. one elementary stream relating to the same audio data is shared, or one elementary stream relating to the same sub-picture data is shared, among a plurality of switchable programs).

Thus, in the object hierarchy 403, the object data is actually reproduced, using the physical address obtained from the conversion in the logic-object association hierarchy 402.

As described above, the three hierarchies shown in FIG. 36 allow making an access to the optical disc 100 during the reproduction.

(Structure of Each Information File)

Now, an explanation is made on a specific example of a data structure of various information files constructed on the optical disc 100 in this embodiment, i.e. the data structure of (1) the play list information file 120 and the disc information file 110 discussed with reference to FIG. 3, and (2) the object information file 130, with reference to FIG. 37 to FIG. 44.

(1) Disc Information File and Play List Information File

With reference to FIG. 37 to FIG. 43, an explanation is made on each constitutional element and a hierarchy structure therebetween or thereamong in specific examples of these files. FIG. 37 to FIG. 43 are conceptual diagrams, schematically showing the hierarchy structures of these files. Incidentally, in FIG. 37 to FIG. 43, the same file, data, information, and the like as those already explained with reference to FIG. 3 to FIG. 9 and the like carry the same reference numerals, and the detailed explanations of them are omitted.

Figure 37:
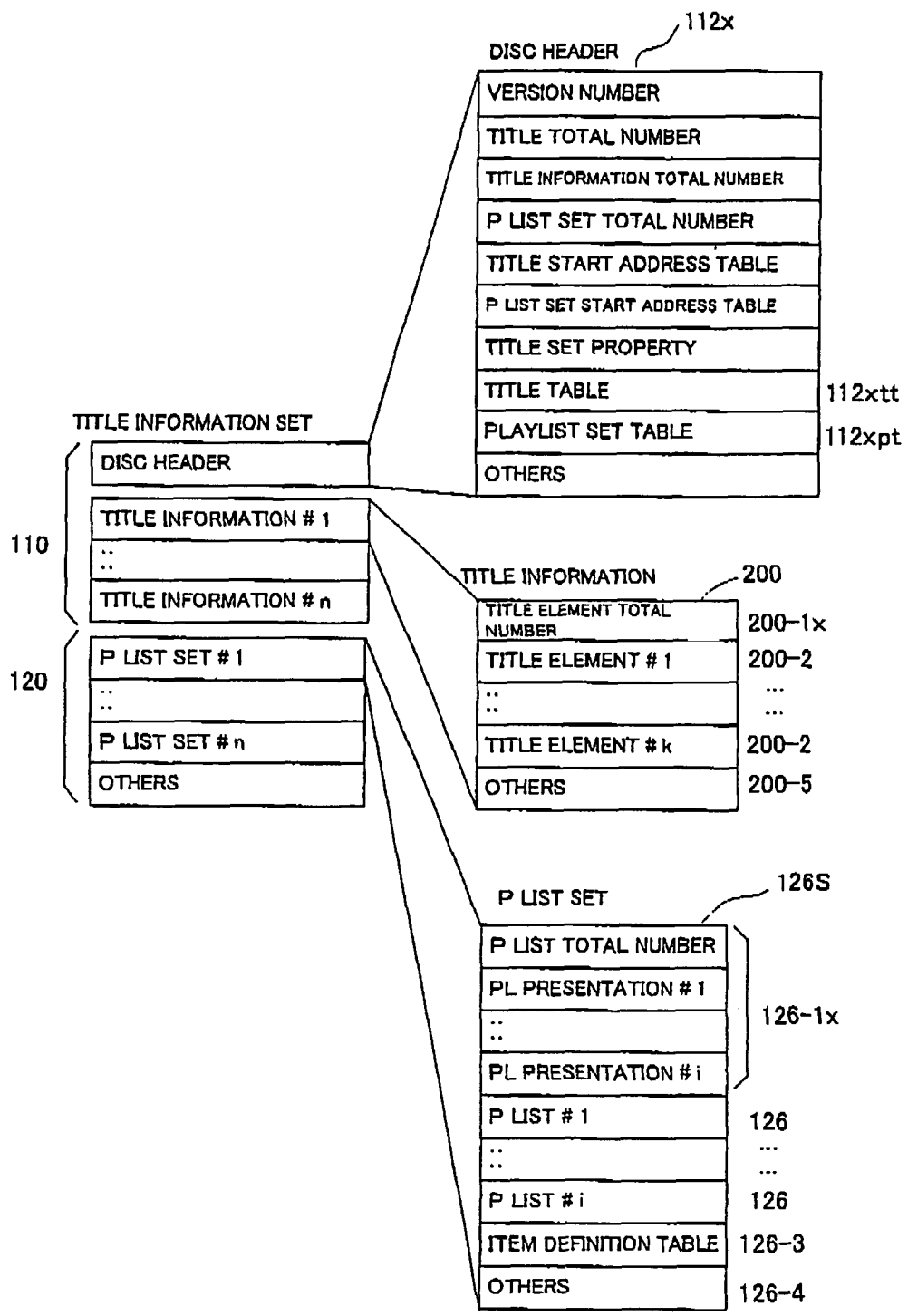
FIG. 37 is a conceptual diagram schematically illustrating a hierarchical structure in a specific example of a title information set in the embodiment.

Firstly, as shown in FIG. 37, a "title information set" associated with this specific example is an information set including the disc information file 110 and the play list information file 120, shown in FIG. 3 and the like.

The title information set is provided with: one disc header 112x; a plurality of title information 200 (title information #1, . . . , #n); a plurality of play list (P list) sets 126S (P list sets #1, . . . , #n); and other information.

(1-1) Disc Header:

Firstly, from among the title information set shown in FIG. 37, the disc header 112x is explained with reference to FIG. 37 and FIG. 38.

In FIG. 37, the disc header 112x is shown in a branched form on the upper right of the figure, and has a plurality of fields for various information, such as a version number, the title total number, the title information total number, and the play list (P list) set total number, in order from the top in FIG. 30, as information corresponding to the disc general information 112 shown in FIG. 3. The disc header 112x has: a title start address table, as a table for information corresponding to the title pointer 114-1 shown in FIG. 3; and a play list (P list) set start address table, as a table for information corresponding to the play list set pointer 124 shown in FIG. 3. The disc header 112x has a field for information which indicates a title set attribute for indicating the attribute of each title set. Moreover, the disc head 112x has a title table 112xtt and a play list set table 112xpt.

As described above, the disc header 112x having the plurality of fields and tables is to collectively manage a plurality of titles of the entire recording area on the disc.

Here, the "version number" is a version number in the standard, and according to ISO 646, it is regarded as a code "0070", for example. The "title total number" is the total number of the titles of the entire recording area on the disc, and the "title information total number" is the total number of the title information of the entire recording area on the disc. The "play list set total number" is the total number of the play list sets of the entire recording area on the disc, and the "title start address table" indicates the start address of each title, as a relative byte number from the head of the title set. This byte number is counted from zero, for example. The "play list set start address table" indicates the start address of each play list set, as a relative byte number from the head of the title set. This byte number is counted from zero, for example. The "title set attribute" indicates the attribute of the title set, such as the data length of the title set, the type of language used in the title set (Japanese, English, etc.), and the name of the title set.

Figure 38:
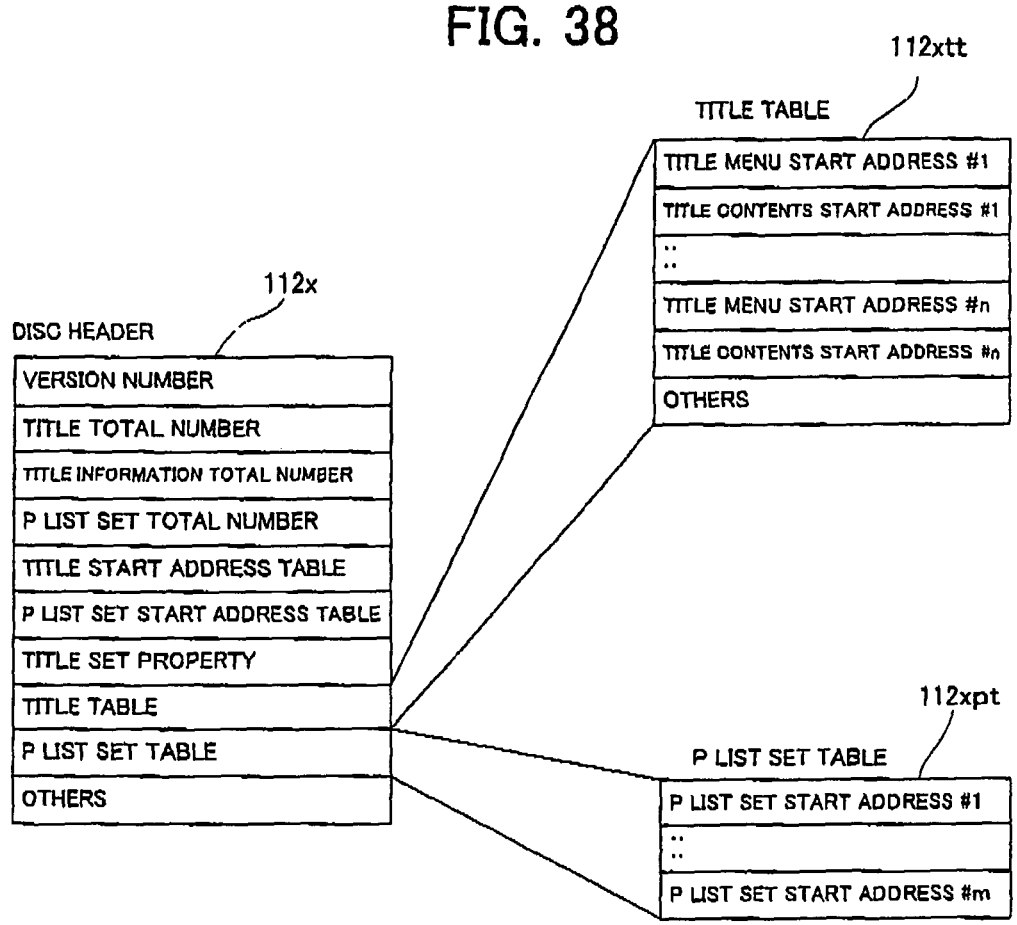
FIG. 38 is a conceptual diagram schematically illustrating a hierarchical structure in a specific example of a disc header in the embodiment.

In FIG. 38, the title table 112xtt is shown in a branched form on the upper right of the figure, and has a plurality of fields for recording a plurality of title menu start address information #1, . . . , #n, and a plurality of title content start address information #1, . . . , #n, in such a form that they make pairs for each number, in order from the top of the figure.

Here, the "title menu start address" indicates the start address of the title information including each title menu, as a relative byte number from the head of the title set. This byte number is counted from zero, for example. The title menu start address "0" is assigned to the disc menu about the entire disc. The "title contents start address" indicates the start address of the title information including each contents title, as a relative byte number from the head of the title set. Here, the "contents title" is a title for indicating the contents of each title. This byte number is counted from zero, for example. The title contents start address "0" is assigned to a first play title which is unconditionally reproduced at the initial stage of the title reproduction, for example.

In FIG. 38, the play list set table 112xpt is shown in a branched form on the lower right of the figure, and has a plurality of fields for recording a plurality of play list (P list) set start addresses #1, . . . , #m.

Here, the "play list set start address" indicates the start address of each play list set, as a relative byte number from the head of the title set. This byte number is counted from zero, for example.

(1-2) Title Information:

Next, from among the title information set shown in FIG. 37, the title information 200 is explained with reference to FIG. 37 and FIG. 39.

In FIG. 37, the title information 200 is shown in a branched form on the center right of the figure, and has a field for recording information 200-1x which indicates the total number of the title elements corresponding to the title general information 200-1 shown in FIG. 4, and further, a plurality of fields for recording the plurality of title elements 200-2 (title elements #1, . . . , #k) and the other information 200-5, in order from the top in FIG. 30.

Here, the "title element total number" indicates the total number of the title elements included in the title information.

Figure 39:
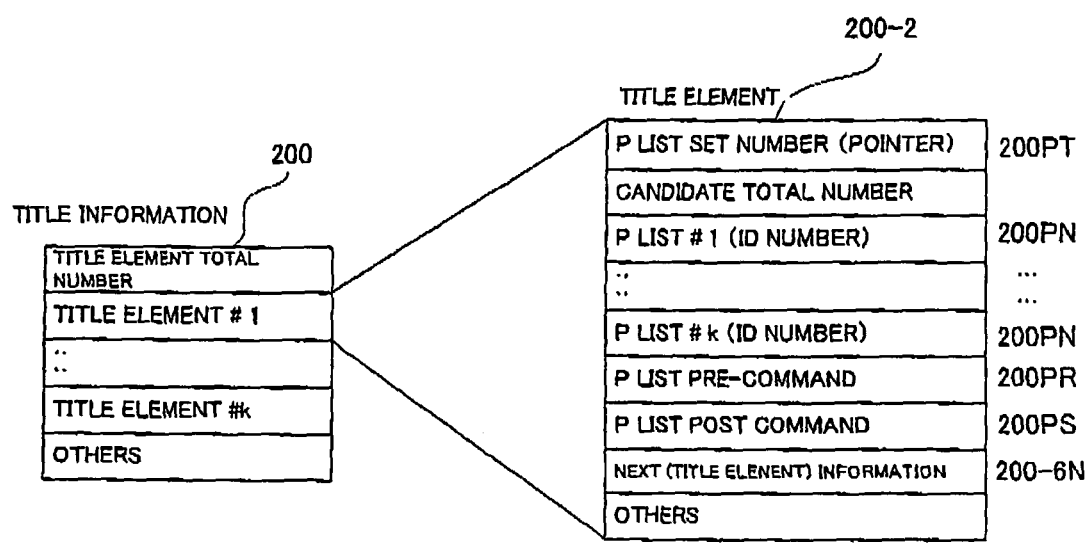
FIG. 39 is a conceptual diagram schematically illustrating a hierarchical structure in a specific example of title information in the embodiment.

In FIG. 39, each title element 200-2 is shown in a branched form on the right of the figure, and has a plurality of fields for recording the pointer 200PT in which a "play list set number" is written, the candidate total number, and P list identification information 200PN in which one or more available play list (P list) numbers (i.e. P lists #1, . . . , #k) is written, in order from the top in FIG. 32. Moreover, it has a plurality of fields for recording the P list pre-command 200PR, the P list post command 200PS, the next information 200-6N and the like for indicating the title element to be reproduced next. Incidentally, the other information in the title element 200-2 is information about each title element, such as the title type, for example, a sequential type and a branch type or the like.

Here, the "pointer 200PT in which the play list set number is written" is a pointer for indicating the identification (ID) number of the play list set. The "candidate total number" indicates the total number of the play list which can be a selection candidate of the title element in the play list set specified by the pointer 200PT. The "P list identification information 200PN" indicates the ID (identification) number of one or more play lists which can be the selection candidate. By providing such P list identification information 200PN, it is possible to include the play list which can be the selection candidate for the reproduction of different titles, in one play list set, and it is possible to share the one play list set with different title elements. On the other hand, the "P list pre-command 200PR", the "P list post command 200PS", and the "next information 200-6N", and the like are the same as described above.

(1-3) Play List Set:

Next, from among the title information set shown in FIG. 37, the play list set 126S is explained with reference to FIG. 37 and FIG. 40 to FIG. 43.

In FIG. 37, the play list set 126S is shown in a branched form on the lower right of the figure, and has fields for recording information 126-1 which includes the play list (P list) total number and a plurality of play list (PL) presentations (PL presentations #1, . . . , #i), as information corresponding to the play list set general information 126-1 shown in FIG. 5, in order from the top in FIG. 30. Moreover, the play list set 126S has a plurality of fields for recording the plurality of play lists (P lists) 126 (i.e. P lists #1, . . . , #i), the item definition table 126-3, and the other information 126-4.

Here, the "play list total number" indicates the total number of the play lists in the play list set. The PL presentations #1, . . . , #i are attribute information corresponding to the P lists #1, . . . , #i, respectively, and correspond to the attribute information shown in FIG. 20.

Figure 40:
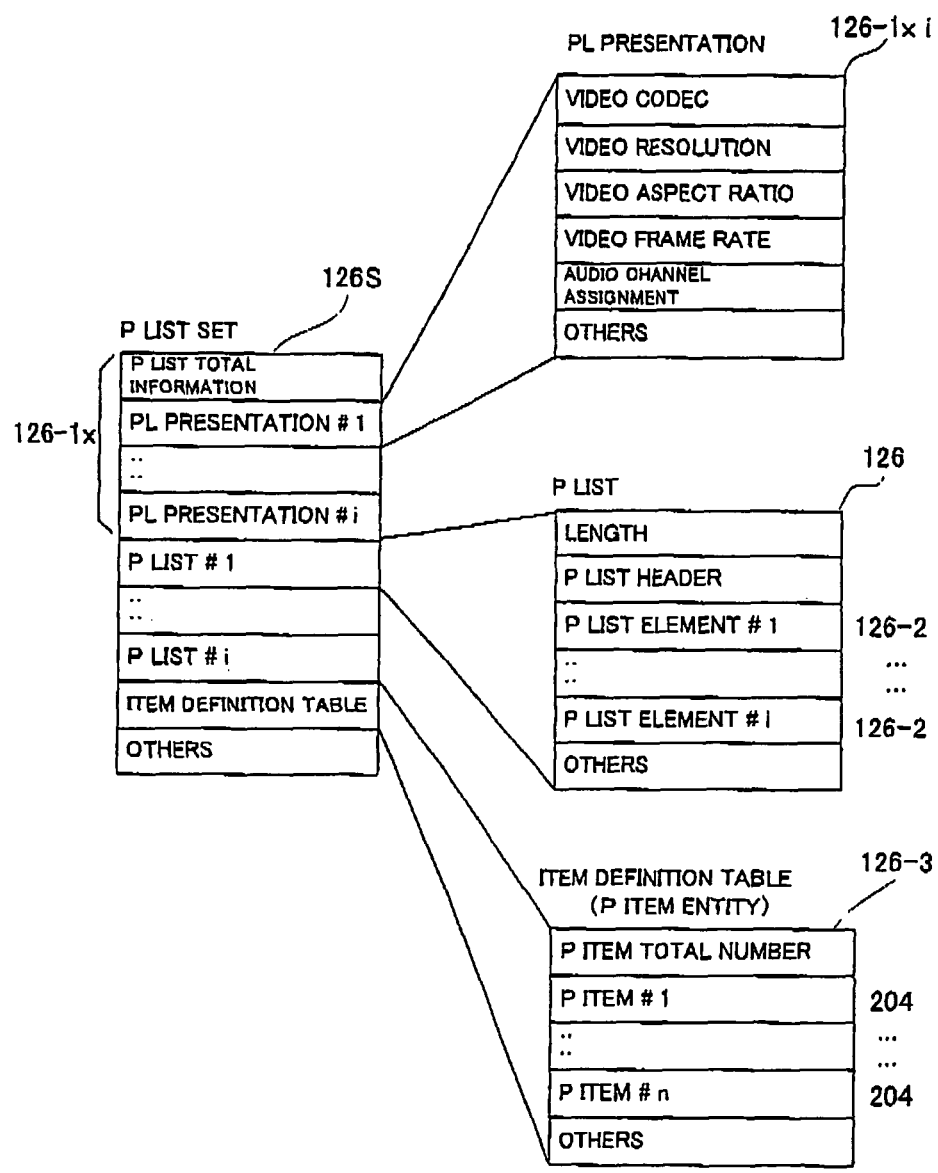
FIG. 40 is a conceptual diagram schematically illustrating a hierarchical structure in a specific example of a play list set in the embodiment.

As shown in FIG. 40, each PL presentation 126-1xi is shown in a branched form on the upper right of the figure, and has a plurality of fields for recording information which indicates a video codec, video resolution, a video aspect ratio, a video frame rate, an audio channel assignment and so on, in order from the top in FIG. 40.

Here, the "video codec" is used in recording the video information associated with the play list set, and thus indicates the type of the video codec to be used in reproducing it. The "video resolution" indicates video resolution used in recording the video information associated with the play list corresponding to the main pass (i.e. the video stream for providing the video) from among the play list set. The "video aspect ratio" indicates a video aspect ratio used in recording the video information associated with the play list corresponding to the main pass from among the play list set. The "video frame rate" indicates a video frame rate used in recording the video information associated with the play list corresponding to the main pass from among the play list set. The "audio channel assignment" indicates the assignment of an audio channel used in recording the audio information associated with the play list corresponding to the main pass from among the play list set.

In FIG. 40, each play list 126 is shown in a branched form on the center right of the figure, and has a plurality of fields for recording information which indicates the data length of the play list 126, a play list header, the plurality of play list elements 126-2 (i.e. P list elements #1, . . . , #i) and the like, in order from the top in FIG. 40.

Here, the "length" of the play list indicates the length of the play list continuing to the next, with the byte number. This indicates the length of the data which does not include the field itself. The "play list header" indicates information about the total number of the play list elements included in the play list, the reproduction time length of the play list, the name of the play list, and the like.

Figure 41:
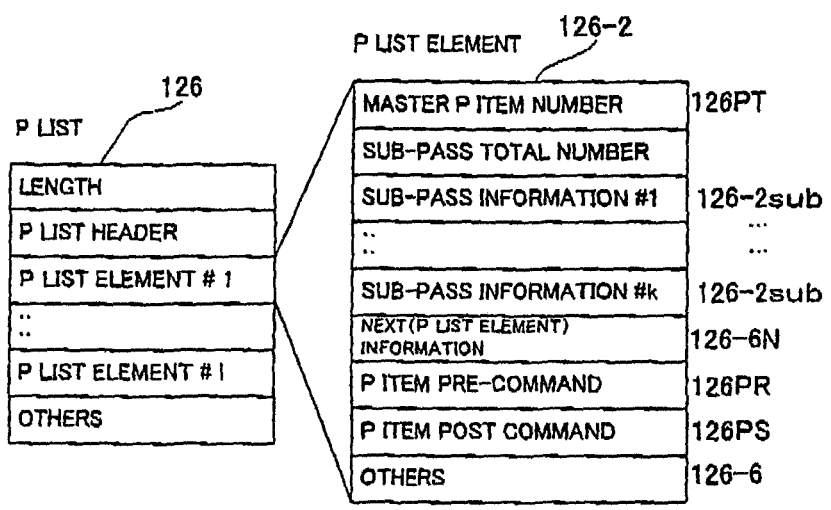
FIG. 41 is a conceptual diagram schematically illustrating a hierarchical structure in a specific example of a play list in the embodiment.

Moreover, in FIG. 41, each play list element 126-2 is shown in a branched form on the right of the figure, and has a plurality of fields for recording the pointer 126PT which indicates the item number of a master play item (master P item), the sub pass total number, a plurality of sub pass information 126-2sub (i.e. sub pass information #1, . . . , #k), the next information 126-6N, the pre-command 126PR about the play item (P item), the post command 126PS about the play item (P item), and the other information 126-6, and the like.

Here, the "pointer 126PT", the "pre-command 126PR", and the "post command 126PS" are the same as described above. Moreover, the "sub pass total number" indicates the total number of the sub passes which exist in the play list element. The "next information 126-6N" indicates the play list element to be reproduced next.

Figure 42:
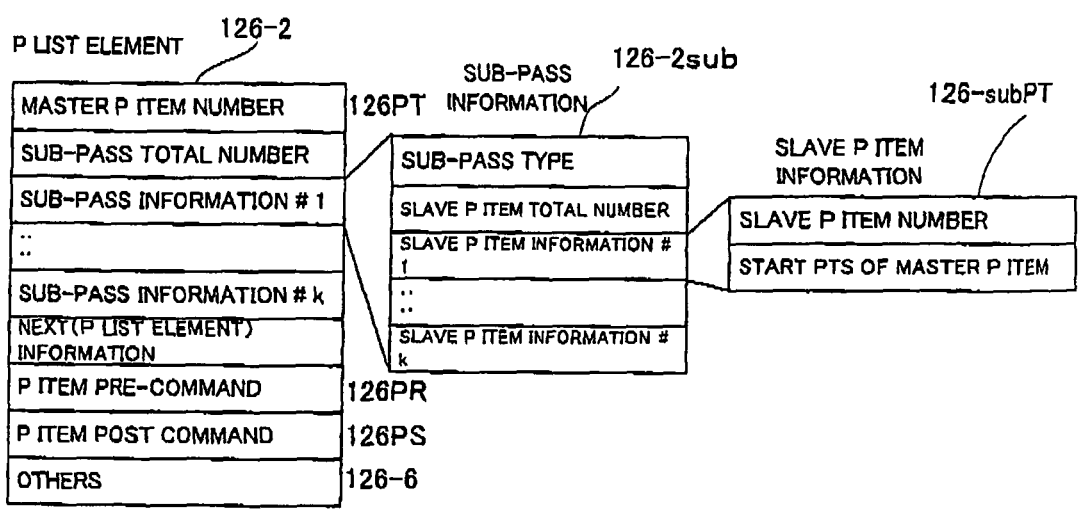
FIG. 42 is a conceptual diagram schematically illustrating a hierarchical structure in a specific example of a play list element in the embodiment.

Moreover, in FIG. 42, each sub pass information 126-2sub is shown in a form branched to the right toward the center, in the figure, and has a plurality of fields for recording a sub pass type, the slave play item (slave P item) total number, and a plurality of slave play item (slave P item) information 126-subPT (i.e. slave P item information #1, . . . , #k), in order from the top in the figure.

Here, the "sub pass type" indicates what type of display is performed by the sub pass, such as various menu display. The "slave P item total number" indicates the total number of slave play items of the sub pass.

Each slave play item (slave P item) information 126-subPT is shown in a form branched toward the right end from the center in the figure, and has a plurality of fields for recording a slave play item (slave P item) number and a start PTS of the master play item (master P item), in order from the top in the figure.

Here, the "slave P item number" indicates the ID (identification) number of the play item of the sub pass. The "start PTS (Presentation Time Stamp) of the master play item" indicates the reproduction time point of the slave item on the reproduction time scale of the master play item.

On the other hand, in FIG. 40, the item definition table 126-3 is shown in a branched form toward the lower right of the figure, and has a plurality of fields for recording the play item (P item) total number, and a plurality of play items (P items) 204 (i.e. P items #1, . . . , #n), and the like, in order from the top in the figure.

Here, the "play item total number" indicates the total number of the items 204 on the item definition table.

Figure 43:
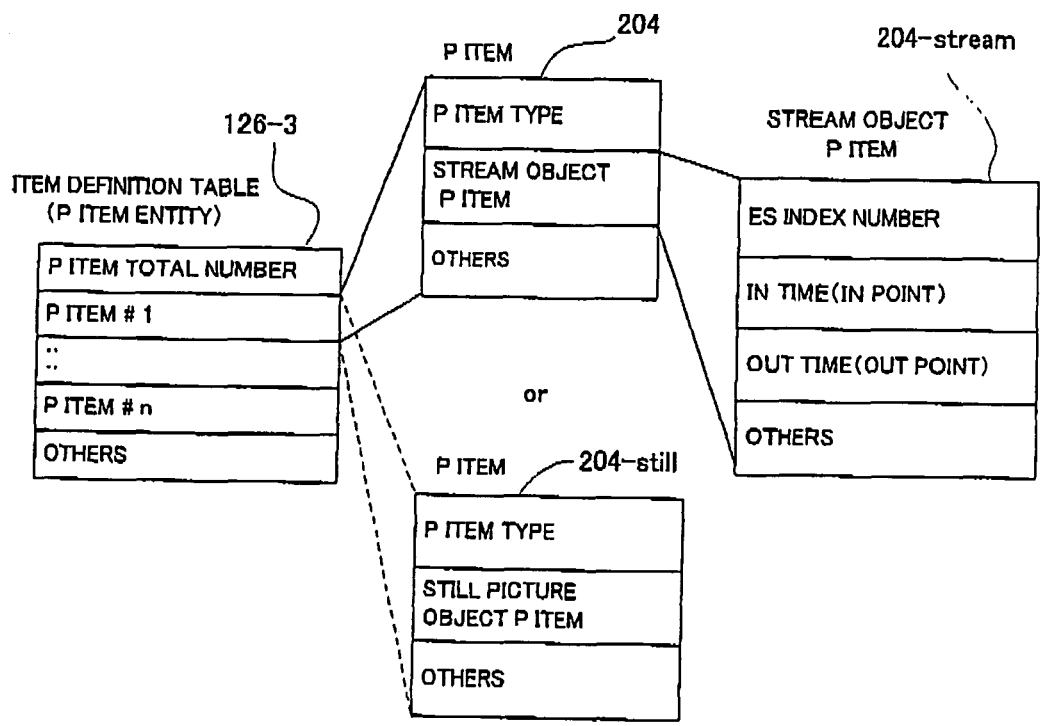
FIG. 43 is a conceptual diagram schematically illustrating a hierarchical structure in a specific example of an item definition table in the embodiment.

In FIG. 43, each item 204 is shown in a branched form to the upper right side toward the center of the figure, and has a plurality of fields for recording a play item (P item) type, a stream object play item (P item) 204-stream, and the like, in order from the top in the figure.

Here, the "play item (P item) type" indicates the type of the play item. For example, in the case of the item for the stream object for the moving picture or video, it is set to a code "00h", and in the case of the item for the stream object for the still picture, it is set to a code "10h". In the case of the item for the object for various menus, it is set to a code "20h".

Moreover, the stream object play item (P item) 204-stream is shown in a form branched to the right end from the center in the figure, and has information for indicating an ES (Elementary Stream) index number, an IN time (IN point), an OUT time (OUT point), and the like, which are related to each play item, in order from the top in the figure.

Here, the "ES index number" indicates the ID (identification) number and the type of the elementary stream to which the IN time and the OUT time are applied. Moreover, the "IN time (IN point)" and the "OUT time (OUT point)" are as descried above, and the reproduction time point and the end time point of the item are written on a time basis of 90 kHz, for example.

Incidentally, in FIG. 43, the item definition table 126-3 may include an item 204-still for the still picture object, in place of such an item 204 for the stream object, i.e. the item 204 for the moving picture or video. In this case, the item 204-still has information for indicating the type of the play item, a still picture object play item (P item), and the like.

Incidentally, the data amount of each of the title information set explained above may be a fixed byte or a variable byte. Moreover, each field may have a structure in which a required number of each table can be added.

(2) Object Information File:

Next, with reference to FIG. 44, the object information file 130 is explained in detail by using one specific example. FIG. 44 schematically shows one specific example of the data structures of the AU (Associate Unit) table 131 (refer to FIG. 3) constructed in the object information file 130 and the ES (Elementary Stream) map table 134 (refer to FIG. 3) related to the AU table 134.

In this specific example, as shown in FIG. 44, the object information table is stored in the object information file 130.

The object information table is provided with the AU table 131 shown in the upper part of FIG. 44 and the ES map table 134 shown in the lower part.

In the upper part of FIG. 44, the AU table 131 may have a structure that allows the required number of tables for each Field to be added. For example, if there are four AUs, it may have such a structure that the number of the Fields increases to four.

In the AU table 131, there are stored "AU table general information" in which the number of AUs and the pointer to each AU, and the like are written, and "the other information."

The AU table 131 describes therein the Index number (Index number= . . . ) of the corresponding ES map table 134, as the AU information 132I which indicates an ES table Index #m in each PU #m corresponding to each AU #n. Here, the "AU" is a unit corresponding to a "show" in TV broadcast, for example, as mentioned above (especially, in the case of "multi-vision" broadcasting, it is a unit of a group of a plurality of "visions" which is changeable or selectable), and it includes one or more PUs, each of which is a reproduction unit. Moreover, the "PU" is a group of mutually changeable elementary streams which are included in each AU, as described above, and the ES table Index #m corresponding to each PU is specified by the PU information 302I. For example, if multi-view contents are provided with the AU, the AU stores therein a plurality of PUs, and each PU stores therein the pointers to a plurality of elementary stream packet IDs which indicates the packets constituting the contents of each view. This indicates the Index number in the ES map table 134, as described later.

In the lower part of FIG. 44, in the ES map table 134, there are stored ES map table general information, a plurality of Indexes #m (m=1, 2, . . . ), and the "other information", for each Field.

The "ES map table general information" describes therein the size of the ES map table, the total number of Indexes, and the like.

The "Index #m" includes the elementary stream packet ID (ES_PID) of the entire elementary stream to be used for the reproduction, the corresponding Index number, and the address information of the elementary stream.

In the embodiment, for example, if the elementary stream is the video stream of the MPEG 2 as described above, only the TS packet number of the TS packet at the head of the I picture, and the corresponding display time length are written, as the address information, i.e. the ES address information 134d, on the ES map table 134, by which the data amount is tried to be reduced.

Because of the construction as described above, it is possible to obtain the elementary stream packet ID (ES_PID) of the actual elementary stream, from the Index number of the ES map 134 specified from the AU table 131. Moreover, since the address information of the elementary stream corresponding to the elementary stream packet ID can be obtained at the same time, it is possible to reproduce the object data on the basis of these information.

According to the data structure of the optical disc 100 explained above, even in adding a new title to the optical disc 100, necessary information can be easily added, which is useful. On the other hand, even if some information becomes unnecessary as a result of editing or the like, for example, what is to be done is simply not to refer to the information, and it is not necessary to actually delete the information from the table, which is useful, as well.

Incidentally, in FIG. 44, even the ES_PID that is not referred to from the AU table 131 in the upper part is described in each Index of the ES map table 134 in the lower part; however, it is not necessary to describe the ES_PID that is not referred to, in this manner. However, if the more versatile ES map table 134 is prepared in advance by describing the ES_PID that is not referred to in this manner, it is not necessary to reconstruct the ES map table, in reediting the content, such as trying the authoring operation again, which is advantageous.

Now, an explanation is given, regarding the reproduction order of various files or the like, in the reproduction of the optical disc 100 having such a data structure as the one specific example, explained with reference to FIG. 37 to FIG. 44.

Firstly, the disc header 112x is reproduced out of the title information set shown in FIG. 37. As a part of that, the title table 112xtt shown in FIG. 38 is reproduced, and from it, the title menu start address or title contents start address is obtained.

Next, in accordance with the obtained address information, the reproduction of the title information 200 shown in FIG. 37 is started. More specifically, the reproduction of the title element 200-2 shown in FIG. 39 is performed, to thereby obtain the play list set number. Moreover, the pointer 200PT to the play lists #1 to #k is obtained. Incidentally, by adopting such a construction that the play list 126 is specified by the pointer 200PT, it is possible to share, among the plurality of titles, the plurality of play lists which is in the play list set specified by the reproduction of the title element 200-2 in advance.

Next, the play list set table 112xpt shown in FIG. 38 is reproduced, to thereby obtain the play list set start address. On the basis of this, the reproduction of the play list set 126S shown in FIG. 40 is started, and the PL presentation 126-1xi is firstly reproduced.

Then, the PL presentation 126-1xi, one example of the required function information, is compared with the reproduction function (i.e. video performance, audio performance, and the like) of the information reproduction system during the reproduction of the optical disc 100, and thus, one optimum play list 126 is selected from the play list set 126S shown in FIG. 40.

Next, the selected play list 126 is reproduced. More specifically, the play list element 126-2 shown in FIG. 41 is reproduced. At this time, firstly, the pre command 126PR is executed, then, the master P item number shown in FIG. 42 is obtained. Then, the Item definition table shown in FIG. 43 is referred to, to thereby reproduce the relevant Item 204. The reproduction of this Item 204 is performed by reproducing the relevant TS object in accordance with the ES index number, the IN time, and the OUT time, which are obtained by reproducing the stream object P item 204-stream (see FIG. 44). Then, the post command 126PS shown in FIG. 41 is executed. Moreover, the play list element to be reproduced next is specified in accordance with the next information 126-6N, and its reproduction is repeated in the same manner.

As explained in detail with reference to FIG. 1 to FIG. 44, according to this embodiment, one play list is selected from a plurality of play lists, for example, with taking into account the video performance or the audio performance in the information reproduction system. As the result, the content information reproducible by the information reproduction system is appropriately reproduced.

Incidentally, in the aforementioned embodiment, the explanation is made on the optical disc 100 as an example of the information record medium and the recorder or player of the optical disc 100 as an example of the information record reproduction apparatus. Nevertheless, the present invention is not limited to the optical disc and the player or recorder thereof, but is applicable to various record media and the recorders or players thereof, supporting other high density recording or high transfer rate.

The present invention is not limited to the above-described embodiments, and various changes may be made, if desired, without departing from the essence or spirit of the invention which can be read from the claims and the entire specification. An information record medium, an apparatus for and a method of recording the information, an apparatus for and a method of reproducing the information, an apparatus for and a method of recording and reproducing the information, a computer program for controlling the record or the reproduction, and a data structure including a control signal, all of which involves such changes, are also intended to be within the technical scope of the present invention.

INDUSTRIAL APPLICABILITY

An information record medium, a apparatus for and a method of recording the information, an apparatus for and a method of reproducing the information, an apparatus for and a method of recording and reproducing the information, a computer program for controlling the record or the reproduction, and a data structure including a control signal, all of which are according to the present invention, can be applied to a high-density optical disc for consumer or industrial use, such as a DVD, on which various information, such as the video information, the audio information and the sub-picture information, can be recorded at high density and further can be applied to a DVD player, a DVD recorder, and the like. Moreover, they can be applied to an information record medium, an information record reproduction apparatus, or the like, which are mounted on or can be connected to various computer equipment for consumer or industrial use, for example.

The invention claimed is:

1. An information record medium, which can be recorded by an information recording apparatus or which can be reproduced by an information reproducing apparatus, on which there are recorded in a non-transitory state:

a plurality of content informations, wherein (i) the plurality of content informations being made of a transport stream, (ii-1) the transport stream including a plurality of partial streams and (ii-2) the transport stream is multiplexed by an aligned unit, (iii-1) the aligned unit is formed from of a plurality of source packets, (iii-2) a head portion of the aligned unit corresponds to a head portion of the source packets and (iii-3) the aligned unit does not start from a management information packet, (iv) one source packet includes one transport packet, (v) one of the plurality of partial streams is one of a video stream, an audio stream or a sub-picture stream, (vi) each of the plurality of partial streams being multiplexed by one of the source packets, (vii) the source packet being a physically accessible source packet and (viii) each transport packet stores pieces of one of video information in the video stream, audio information in the audio stream and sub-picture information in the sub-picture stream;

a plurality of first informations, wherein (i-1) each of the plurality of first informations is not multiplexed by the source packet unit and (i-2) each of the plurality of first informations which indicates a plurality of play list informations, (ii-1) each of the plurality of play list informations including a plurality of play item informations and (ii-2) each of the plurality of play list informations indicates (ii-2-1) a number of the play item informations, (ii-2-2) the number of sub path information and (ii-2-3) type of sub path which indicates presentation type of sub path, (iii-1) each of the plurality of play item informations defining a reproduction sequence of one part of the plurality of content informations by a unit of an item, (iii-2) each of the plurality of play item informations is only control information for controlling the reproduction of the entity information and (iii-3) each of the plurality of play item information indicates start time and end time of the one part of the plurality of content information by a unit of the item, (iv) each of the plurality of sub path information defines the sub-picture information which is reproduced with the content information defined by the play item information, (v) one content information can be shared by the plurality of play item informations;

object information which is not multiplexed by the packet unit, wherein (i) the object information includes a relationship definition information, defining a relationship between an ID of each of the transport packets to be multiplexed and address information of each of the plurality of partial streams which construct the content information and (ii) the object information stores therein a plurality of records each of which includes a combination of the ID and the address information; and a disc information file for storing title information, wherein (i) the title information is control information so as to reproduce the plurality of content informations as a title which is the logically united information unit, (ii) the title information specifies one or a plurality of the first information and (iii) the title information acts as a part of reproduction control information to control the reproduction of the content information, wherein some of the plurality of content informations are different from each other in reproduction functions required for an information reproduction system to reproduce the plurality of content informations and are adapted to at least partially construct title which is a logically united information unit, a reproduction sequence of said some of the plurality of content informations are defined by the plurality of play list informations indicated by one of the first informations, each play item information specifies each of a plurality of object information, all of the plurality of content informations are packetized and are stored in one object data file, all of the object informations are not packetized and are stored in one object information file, all of the plurality of play list informations are not packetized and are stored in one play list information file.

2. The information record medium according to claim 1, wherein
required function information indicating the reproduction function is further recorded in a non-transitory state for each of the plurality of play list informations.

3. The information record medium according to claim 2, wherein
the reproduction function is a video reproduction performance and an audio reproduction performance required for the information reproduction system.

4. The information record medium according to claim 3, wherein
the required function information is of information, which indicates the video reproduction performance and the audio reproduction performance and is recorded for each of the plurality of play list informations.

5. The information record medium according to claim 4, wherein priority information indicating which of the video reproduction performance and the audio reproduction performance is to be prioritized is further recorded in a non-transitory state.

6. An information reproduction apparatus for reproducing the information record medium according to claim 5,
said apparatus comprising:
a reproduction device capable of reproducing the plurality of content informations, the plurality of first informations, the required function information, the object information and the title information; and
a control device for selecting one play list information defining the reproduction sequence of the content information reproducible by the information reproduction apparatus, from among the plurality of play list informations indicated by one of the first informations by comparing (i) the video reproduction function and the audio reproduction function indicated by the required function information reproduced by the reproduction device with (ii) video reproduction function and audio reproduction function of the information reproduction apparatus indicated by a set function information set for the information reproduction apparatus, and controlling the reproduction device to reproduce the content information in accordance with the reproduction sequence defined by the selected play list information, wherein
the control device selects one play list information corresponding to the vide reproduction performance or the audio reproduction performance prioritized in accordance with the priority information, from among the plurality of play list informations included in the same play list.

7. The information record medium according to claim 3, wherein
the required function information comprises a required function information table in which information indicating whether or not different video reproduction performances are required for each of predetermined ranks and information indicating whether or not different audio reproduction performances are required for each of predetermined ranks are arranged vertically and horizontally as a matrix.

8. The information record medium according to claim 7, wherein
priority information indicating a priority among various combination of said video reproduction performances different for each of said predetermined ranks and said audio reproduction performances different for each of said predetermined ranks is further recorded in a non-transitory state.

9. An information reproduction apparatus for reproducing the information record medium according to claim 2,
said apparatus comprising:
a reproduction device capable of reproducing the plurality of content informations, the plurality of first informations, the required function information, the object information and the title information; and
a control device for selecting one play list information defining the reproduction sequence of the content information reproducible by the information reproduction apparatus, from among the plurality of play list informations indicated by one of the first informations by comparing (i) the reproduction function indicated by the required function information reproduced by the reproduction device with (ii) reproduction function of the information reproduction apparatus indicated by a set function information set for the information reproduction apparatus, and controlling the reproduction device to reproduce the content information in accordance with the reproduction sequence defined by the selected play list information.

10. The information reproduction apparatus according to claim 9, wherein
the reproduction function is a video reproduction performance and an audio reproduction performance required for the information reproduction system,
the required function information is of information indicating the video reproduction performance and the audio reproduction performance recorded for each of the plurality of play list informations,
the set function information indicates the video reproduction performance and the audio reproduction performance of the information reproduction apparatus, and
the set function information includes information indicating whether or not the information reproduction apparatus has different video reproduction performances for each of predetermined ranks and information indicating whether or not the information reproduction apparatus has different audio reproduction performances for each of predetermined ranks.

11. The information record medium according to claim 1, wherein
each of the play list informations includes pointer information designating item information, which is a logically accessible reproduction unit and composes the content information.

12. The information record medium according to claim 1, wherein
the title information includes pointer information designating at least one first information, which corresponds to the content information to be reproduced.

13. An information reproduction apparatus for reproducing the information record medium according to claim 1,
said apparatus comprising:
a reproduction device capable of reproducing the plurality of content informations, the first informations, the play list informations, the object information and the title information; and
a control device for selecting one play list information from among the plurality of play list informations indicated by one of the first informations, and controlling the reproduction device to reproduce the content information in accordance with the selected play list information.

14. The information reproduction apparatus according to claim 13, wherein
the reproduction function is a video reproduction performance and an audio reproduction performance required for the information reproduction system.

15. A computer readable recording medium recording thereon a computer program, in a non-transitory state, for a reproduction control to control a computer disposed at the information reproduction apparatus according to claim 13, said program making the computer function as at least a part of the reproduction device and the control device.

16. An information reproduction method of reproducing the information record medium according to claim 1,
said method implemented with an information reproduction apparatus comprising a reproduction device capable of reproducing the plurality of content informations, the first informations, the play list informations, the object information and the title information,
said method comprising:
a first control process of selecting one play list information from among the plurality of play list informations indicated by one of the first informations, and
a second controlling process of controlling the reproduction device to reproduce the content information in accordance with the selected play list information.

17. An information record apparatus comprising:
a first record device for recording a plurality of content informations, wherein (i) the plurality of content informations being made of a transport stream, (ii-1) the transport stream includes a plurality of partial streams and (ii-2) the transport stream is multiplexed by an aligned unit, (iii-1) the aligned unit is formed of a plurality of source packets, (iii-2) a head portion of the aligned unit corresponds to a head portion of the source packet and (iii-3) the aligned unit does not start from a management information packet, (iv) one source packet includes one transport packet, (v) one of the plurality of partial streams is one of a video stream, an audio stream or a sub-picture stream, (vi) each of the plurality of partial streams being multiplexed by the source packet, (vii) the source packet being a physically accessible source packet and (viii) each transport packet stores pieces of one of video information in the video stream, audio information in the audio stream or sub-picture information in the sub-picture stream;
a second record device for recording a plurality of first informations, wherein (i-1) each of the plurality of first informations is not multiplexed by the packet unit and (i-2) each of the plurality of first informations indicates a plurality of play list informations, (ii-1) each of the plurality of play list informations includes a plurality of play item informations and (ii-2) each of the plurality of play list informations indicates (ii-2-1) the number of the play item information, (ii-2-2) the number of sub path information and (ii-2-3) type of sub path which indicates presentation type of sub Path, (iii-1) each of the plurality of play item informations defining a reproduction sequence of one part of the plurality of content informations by a unit of an item, (iii-2) each of the plurality of play item informations is only control information for controlling the reproduction of the entity information and (iii-3) each of the plurality of play item information indicates start time and end time of the one part of the plurality of content informations by a unit of the item, (iv) each of the plurality of sub path informations defines the sub-picture information which is reproduced with the content information defined by the play item information, (v) one content information can be shared by the plurality of play item informations;
a third record device for recording object information which is not multiplexed by the packet unit, wherein (i) the object information includes a relationship definition information, defining a relationship between an ID of each of the transport packets to be multiplexed and address information of each of the plurality of partial streams which construct the content information and (ii) the object information stores therein a plurality of records each of which includes a combination of the ID and the address information; and
a fourth recording device for recording a disc information file for storing title information, wherein (i) the title information is control information so as to reproduce the plurality of content informations as a title which is the logically united information unit, (ii) the title information specifies one or a plurality of the first information and (iii) the title information acts as a part of reproduction control information to control the reproduction of the content information, wherein some of the plurality of content informations are different from each other in reproduction functions required for an information reproduction system to reproduce the plurality of content informations and are adapted to at least partially construct title which is a logically united information unit, a reproduction sequence of said some of the plurality of content informations are defined by the plurality of play list informations indicated by one of the first informations, each play item information specifies each of a plurality of object information, all of the plurality of content informations are packetized and are stored in one object data file, all of the object informations are not packetized and are stored in one object information file, all of the plurality of play list informations are not packetized and are stored in one play list information file.

18. The information record apparatus according to claim 17, wherein said apparatus further comprises a fifth record device for further recording required function information indicating the reproduction function for each of the plurality of play list informations.

19. An information record method, which is performed by an information record apparatus, comprising:

a first record process of recording a plurality of content informations, wherein (i) the plurality of content informations being made of a transport stream, (ii-1) the transport stream includes a plurality of partial streams and (ii-2) the transport stream is multiplexed by an aligned unit, (iii-1) the aligned unit comprises a plurality of source packets, (iii-2) a head portion of the aligned unit corresponds to a head portion of the source packets and (iii-3) the aligned unit does not start from a management information packet, (iv) one source packet includes one transport packet, (v) one of the plurality of partial streams is one of a video stream, an audio stream or a sub-picture stream, (vi), each of the plurality of partial streams being multiplexed by the source a packet, (vii) the source packet being a physically accessible source packet and (viii) each transport packet stores pieces of one of video information in the video stream, audio information in the audio stream or sub-picture information in the sub-picture stream;

a second record process of recording a plurality of first informations, wherein (i-1) each of the plurality of first informations is not multiplexed by the packet and (i-2) each of the plurality of first information indicates a plurality of play list informations, (ii-1) each of the plurality of play list informations includes a plurality of play item informations and (ii-2) each of the plurality of play list informations indicates (ii-2-1) a number of the play item information, (ii-2-2) a number of sub path information and (ii-2-3) a type of sub path which indicates presentation type of sub Path, (iii-1) each of the plurality of play item informations defining a reproduction sequence of one part of the plurality of content informations by a unit of an item, (iii-2) each of the plurality of play item informations is only control information for controlling the reproduction of the entity information and (iii-3) each of the plurality of play item informations indicates start time and end time of one part of the plurality of content informations by a unit of the item, (iv) each of the plurality of sub path informations defines sub-picture information which is reproduced with the content information defined by the play item information, (v) one content information can be shared by the plurality of play item informations;

a third record process of recording object information which is not multiplexed by the packet unit, wherein (i) the object information includes a relationship definition information, defining a relationship between an ID of each of the transport packets to be multiplexed and address information of each of the plurality of partial streams which construct the content information and (ii) the object information stores therein a plurality of records each of which includes a combination of the ID and the address information; and a fourth recording process of recording a disc information file for storing title information, wherein (i) the title information is control information so as to reproduce the plurality of content informations as a title which is the logically united information unit, (ii) the title information specifies one or a plurality of the first informations and (iii) the title information acts as a part of reproduction control information to control the reproduction of the content information, wherein some of the plurality of content informations are different from each other in reproduction functions required for an information reproduction system to reproduce the plurality of content informations and are adapted to at least partially construct title which is a logically united information unit, a reproduction sequence of said some of the plurality of content informations are defined by the plurality of play list informations indicated by one of the first informations, each play item information specifies each of a plurality of object information, all of the plurality of content informations are packetized and are stored in one object data file, all of the object informations are not packetized and are stored in one object information file, all of the plurality of play list informations are not packetized and are stored in one play list information file.

20. The information record method according to claim 19, wherein said method further comprises a fifth record process of further recording required function information indicating the reproduction function for each of the plurality of play list informations.

21. A computer readable recording medium recording thereon a computer program, in a non-transitory state, for a record control to control a computer disposed at the information record apparatus according to claim 17, said program making the computer function as at least a part of the first record device, the second record device, the third record device and the fourth recording device.

* * * * *

UNITED STATES PATENT AND TRADEMARK OFFICE
CERTIFICATE OF CORRECTION

PATENT NO.         : 8,577,206 B2                                                          Page 1 of 1
APPLICATION NO. : 10/530039
DATED              : November 5, 2013
INVENTOR(S)        : Kanegae et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2313 days.

Signed and Sealed this
Twenty-second Day of September, 2015

Michelle K. Lee
*Director of the United States Patent and Trademark Office*